(12) United States Patent
Yoshikawa et al.

(10) Patent No.: US 7,658,864 B2
(45) Date of Patent: Feb. 9, 2010

(54) LIQUID CRYSTAL COMPOSITION, OPTICAL COMPENSATION FILM AND LIQUID CRYSTAL DISPLAY DEVICE

(75) Inventors: Masaru Yoshikawa, Minami-ashigara (JP); Hiroshi Takeuchi, Minami-ashigara (JP); Mitsuyoshi Ichihashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/662,145

(22) PCT Filed: Sep. 8, 2005

(86) PCT No.: PCT/JP2005/016551

§ 371 (c)(1),
(2), (4) Date: Jun. 20, 2008

(87) PCT Pub. No.: WO2006/028187

PCT Pub. Date: Mar. 16, 2006

(65) Prior Publication Data

US 2009/0009693 A1    Jan. 8, 2009

(30) Foreign Application Priority Data

Sep. 9, 2004  (JP)  ............... 2004-261898
Feb. 25, 2005 (JP)  ............... 2005-051076

(51) Int. Cl.
*C09K 19/00*  (2006.01)
*C09K 19/06*  (2006.01)
*C09K 19/52*  (2006.01)

(52) U.S. Cl. ............... 252/299.01; 252/299.1; 252/299.6; 430/20; 430/270.1; 428/1.1

(58) Field of Classification Search ............ 252/299.01, 252/299.1, 299.6; 430/20, 270.1; 428/1.1
See application file for complete search history.

(56) References Cited

U.S. PATENT DOCUMENTS 7,311,950 B2 * 12/2007 Morishima et al. ........... 428/1.1

2003/0122991 A1  7/2003  Itakura et al.
2003/0223026 A1  12/2003 Morishima et al.

FOREIGN PATENT DOCUMENTS

| EP | 1 156 349 A1 | 11/2001 |
|---|---|---|
| EP | 1 170 353 A2 | 1/2002 |
| JP | 06-331826 A | 12/1994 |
| JP | 9-80424 A | 3/1997 |
| JP | 09-292522 A | 11/1997 |
| JP | 10-054982 A | 2/1998 |
| JP | 10-307291 A | 11/1998 |
| JP | 10-319408 A | 12/1998 |
| JP | 11-133408 A | 5/1999 |
| JP | 11-202323 A | 7/1999 |
| JP | 11-305217 A | 11/1999 |
| JP | 2000-514202 A | 10/2000 |
| JP | 2000-304932 A | 11/2000 |
| JP | 2001-330725 A | 11/2001 |
| JP | 2002-038158 A | 2/2002 |
| JP | 2002-129162 A | 5/2002 |
| JP | 2003-195310 A | 7/2003 |
| JP | 2004-004688 A | 1/2004 |
| JP | 2004-157523 A | 6/2004 |
| WO | WO 98/00475 A1 | 1/1998 |
| WO | WO 2004/036273 A1 | 4/2004 |

OTHER PUBLICATIONS

International Search Report.
Written Opinion of the International Searching Authority.

* cited by examiner

*Primary Examiner*—Geraldina Visconti
(74) *Attorney, Agent, or Firm*—Buchanan Ingersoll & Rooney PC

(57) ABSTRACT

An optical compensation film capable of contributing to improvement in a viewing angle characteristic of a liquid crystal display device, especially an IPS mode liquid crystal display device is proposed. A composition comprises at least one onium salt, at least one rod-like liquid crystalline compound, and at least one additive capable of promoting a vertical alignment of molecules of the rod-like liquid crystalline compound at an air interface; and an optical compensation film comprising an optically anisotropic layer formed of the composition are disclosed.

19 Claims, 3 Drawing Sheets

LIQUID CRYSTAL COMPOSITION, OPTICAL COMPENSATION FILM AND LIQUID CRYSTAL DISPLAY DEVICE

TECHNICAL FIELD OF THE INVENTION

The present invention relates to a liquid crystal display device, and, in particular, to a liquid crystal display device, employing in-plane switching mode, which displays under being applied an electric field of the transversal direction to liquid crystal molecules to be aligned in the horizontal direction. Also, the invention relates to an optical compensation film capable of contributing to increasing a viewing angle of a liquid crystal display device, and a liquid crystal composition which is useful for the preparation of the film.

BACKGROUND ART

A liquid crystal display employing a mode in which a liquid crystal layer having a twisted nematic liquid crystal therein is interposed between two sheets of polarizing plates orthogonal to each other and an electric field is applied in the vertical direction to a substrate, a so-called TN mode, has been widely known. According to this mode, since the liquid crystal rises up against the substrate in a black state, when observed obliquely, birefringence due to the liquid crystal molecule is generated so that light leakage generates. In order to solve this problem, a mode for preventing this light leakage by using a film comprising liquid crystalline molecules hybrid aligned therein to optically compensate a liquid crystal cell is put into practical use. However, even by using such a film, it is very difficult to completely optically compensate the liquid crystal cell without causing any problem, thereby causing a problem that grayscale inversion in the lower direction of the screen cannot be entirely suppressed.

For the purpose of solving such a problem, there have been proposed and put into practical use a liquid crystal display device employing a so-called in-plane switching (IPS) mode, in which the transversal field are applied to liquid-crystal molecules; a so-called fringe field switching (FFS) mode; or a vertically aligned (VA) mode, having multi domains divided by projections formed in a panel or slit electrodes. Recently, such liquid-crystal displays have been developed as a panel employed not only in monitors but also in TV, and the brightness thereof has been improved remarkably. Consequently, small light leakage generating at opposing corners in a black state while being observed in an oblique direction has come to the surface as a cause of lowering displaying-quality.

In order to improve color tones or viewing angles in a black state, it has been also tried that an optical compensatory material exhibiting a birefringence property is disposed between a liquid-crystal layer and a polarizing plate in an IPS mode display. For example, it is disclosed that a birefringent medium capable of compensating increased or decreased retardation of a tilted liquid crystal layer, having optical axes orthogonal to each other, and disposed between a liquid crystal cell substrate and a polarizing plate, can reduce the coloration in an oblique direction in a white or halftone state (TOKKAI No. hei 9-80424).

There have been proposed a method employing a film formed of a styrene based polymer having an intrinsic negative birefringence or a discotic liquid crystal compound (TOKKAI No. hei 10-54982, TOKKAI No. hei 11-202323 or TOKKAI No. hei 9-292522); a method employing a combination, as an optical compensation film, of a positive birefringent film having an optical axis in a plane and a negative birefringent film having an optical axis in a normal direction (TOKKAI No. hei 11-133408); a method employing a biaxial optical compensation sheet having a λ/2 retardation (TOKKAI No. hei 11-305217); and a method employing a combination of a negative retardation film, as a protective film of a polarizer, and a positive retardation film, as an optical compensation layer disposed on the surface of the protective film (TOKKAI No. hei 10-307291).

Many of the proposed methods are methods to improve viewing angles by counteracting the birefringence of liquid crystal in the cell, and cannot sufficiently prevent light leakage generating while the liquid-crystal displays are observed in oblique direction, or, in other words, the polarizing axes are out of orthogonal alignment. Some of the proposed methods are for reducing such light leakage and, however, even if such methods are employed, it is extremely difficult to optically compensate the liquid-crystal cell perfectly. Known optical compensatory sheets used for an IPS mode liquid-crystal cell are thick since they consists of plural films, and this is disadvantageous for thinning of liquid-crystal displays. Some of the optical compensatory sheets are prepared by stacking stretched films with adhesion layers. The adhesion layers shrink depending on variation of temperature or humidity, and, thus, film peel or warpage is sometimes occurred.

There has been also proposed a method for achieving optical compensation of IPS by employing a combination of retardation films having positive birefringence whose optical axis is present in the normal direction thereof. As a method for preparing such a retardation film, there is known a method for vertically aligning a liquid crystal material and immobilizing the alignment state (see, for example, JPT 2000-514202, TOKKAI No. hei 10-319408, and TOKKAI No. hei 6-331826).

Furthermore, as a method for vertically aligning a rod-like liquid crystalline compound, there are proposed a method for using a vertical alignment layer as an alignment layer; and a method employing a layer of a vertically aligning agent (for example, a quaternary ammonium-substituted silane coupling agent), which is formed on a substrate to be a layer under a layer of a liquid crystalline compound (for example, Koji OKANO, et al., *Ekisho: Oyo-hen* (Liquid Crystals: Applied Edition), published by Baifukan Co. Ltd. (1985), page 61; and Shohei NAEMURA, *Appl. Phys. Lett., Vol.* 33, No. 1 (1978), pages 1 to 3). However, in recent years, demands for display characteristics of a monitor have become severe. Conventionally known anisotropic materials as immobilized in the vertical alignment state are not sufficient with respect to microscopic homogeneity, and improvements thereof have been demanded.

SUMMARY OF THE INVENTION

Problems to be Resolved by the Invention

An object of the invention is to provide an IPS mode liquid crystal display device which is improved in not only display quality but also a viewing angle characteristic employing a simple construction. Another object of the invention is to provide an optical compensation film capable of contributing to improvement in a viewing angle characteristic of a liquid crystal display device, especially an IPS mode liquid crystal display device; and a composition which is useful for preparation of the subject optical compensation film. A still another object of the invention is to provide a retardation film in which molecules of a rod-like liquid crystalline compound are vertically aligned uniformly without generating defects.

Means of Solving the Problems

The compositions (1) to (5), the optical compensation films (6) and (7) and the liquid crystal display devices (8) to (13) achieved the objects of the invention respectively.

(1) A liquid crystal composition comprising:
at least one onium salt,
at least one rod-like liquid crystalline compound, and
at least one additive capable of promoting a vertical alignment of molecules of the rod-like liquid crystalline compound at an air interface.

(2) The liquid crystal composition of (1), wherein the additive is a compound having a fluoroaliphatic group and at least one hydrophilic group selected from the group consisting of a carboxyl group (—COOH), a sulfo group (—SO$_3$H), a sulfate group (—OSO$_3$H), a phosphonoxy group {—OP(=O)(OH)$_2$}, and salts thereof.

(3) The liquid crystal composition of (1) or (2), wherein the additive is a copolymer comprising at least one repeating unit derived from a fluoro-aliphatic group-containing monomer and at least one repeating unit represented by the following formula (1):

[Formula 1]

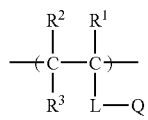

Formula (1)

wherein $R^1$, $R^2$, and $R^3$ each independently represents a hydrogen atom or a substituent; L represents a divalent linking group selected from Linking Group shown below or a divalent linking group consisting of two or more selected from Linking Group shown below;

(Linking Group)
a single bond, —O—, —CO—, —NR$^4$— (where R$^4$ represents a hydrogen atom, an alkyl group, an aryl group or an aralkyl group), —S—, —SO$_2$—, —P(=O)(OR$^5$)— (where R$^5$ represents an alkyl group, an aryl group or an aralkyl group), an alkylene group and arylene group; and Q represents a carboxyl group (—COOH) or a salt thereof, a sulfo group (—SO$_3$H) or a salt thereof, or a phosphonoxy group {—OP(=O)(OH)$_2$} or a salt thereof.

(4) The liquid crystal composition of (1) or (2), wherein the additive is a compound represented by the following formula (2):

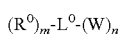       Formula (2)

wherein R$^0$ represents an alkyl group, an alkyl group having a terminal CF$_3$ group or an alkyl group having a terminal CF$_2$H group; m represents an integer of 1 or more; plural R$^0$s may be the same or different, provided that at least one R$^0$ represents an alkyl group having a terminal CF$_3$ group or a terminal CF$_2$H group; L$^0$ represents a linking group having a valence of (m+n); W represents a carboxyl group (—COOH) or a salt thereof, a sulfo group (—SO$_3$H) or a salt thereof, a sulfate group (—OSO$_3$H) group or a salt thereof, or a phosphonoxy group {—OP(=O)(OH)$_2$} or a salt thereof; and n represents an integer of 1 or more.

(5) The liquid crystal composition of any one of (1) to (4), wherein the onium salt is a quaternary ammonium salt.

(6) The liquid crystal composition of any one of (1) to (5), wherein the onium salt is a compound represented by the following formula (3a) or (3b):

[Formula 2]

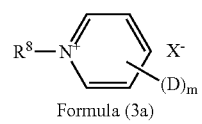

Formula (3a)

wherein R$^8$ represents a substituted or non-substituted alkyl, alkenyl, alkynyl, aralkyl, aryl or heterocyclic group; D represents a group capable of hydrogen bonding; m represents an integer of from 1 to 3; and X$^-$ represents an anion;

[Formula 3]

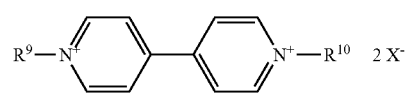

Formula (3b)

wherein R$^9$ and R$^{10}$ each represents a substituted or non-substituted alkyl, alkenyl, alkynyl, aralkyl, aryl or heterocyclic group; and X$^-$ represents an anion.

(7) The liquid crystal composition of any one of (1) to (6), wherein the onium salt is a compound represented by the following formula (4):

[Formula 4]

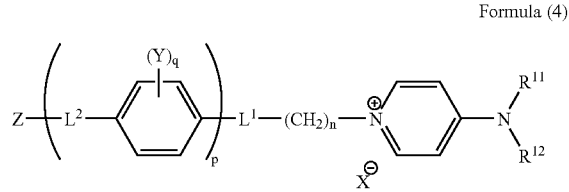

Formula (4)

wherein L$^1$ and L$^2$ respectively represent a divalent linking group or a single bond; Y represents a substituent capable of binding to phenyl other than a hydrogen atom; Z represents a hydrogen atom, a substituted or non-substituted aliphatic hydrocarbon group or a substitute or non-substituted aryl group; R$^{11}$ and R$^{12}$ respectively represent a hydrogen atom, an alkyl group, an aryl group, an acyl group, a carboamyl group, a hydroxyl group or an amino group, and R$^{11}$ and R$^{12}$ may bind to each other to from a ring; n and p respectively represent an integer from 1 to 10, q is an integer from 0 to 4, provided that when p is 2 or more, L$^2$s, Ys and qs in the respective repeating units may be the same or different; and X$^-$ represents an anion.

(8) An optical compensation film comprising an optically anisotropic layer formed of a liquid crystal composition of any one of (1) to (7).

(9) The optical compensation film of (8), wherein molecules of the rod-like liquid crystalline compound are aligned substantially vertically in the optically anisotropic layer.

(10) An optical compensation film comprising:

an alignment layer comprising at least one polymer and at least one onium salt and an optically anisotropic layer formed of a composition comprising at least one rod-like liquid crystalline compound and at least one compound selected from compounds represented by a following formula (1) or a following formula (2):

[Formula 5]

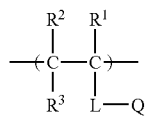

Formula (1)

wherein $R^1$, $R^2$, and $R^3$ each independently represents a hydrogen atom or a substituent; L represents a divalent linking group selected from Linking Group shown below or a divalent linking group consisting of two or more selected from Linking Group shown below;

(Linking Group)

a single bond, —O—, —CO—, —NR$^4$— (where $R^4$ represents a hydrogen atom, an alkyl group, an aryl group or an aralkyl group), —S—, —SO$_2$—, —P(=O)(OR$^5$)— (where $R^5$ represents an alkyl group, an aryl group or an aralkyl group), an alkylene group and arylene group; and Q represents a carboxyl group (—COOH) or a salt thereof, a sulfo group (—SO$_3$H) or a salt thereof, or a phosphonoxy group {—OP(=O)(OH)$_2$} or a salt thereof;

$(R^0)_m$-L$^0$-(W)$_n$    Formula (2)

wherein $R^0$ represents an alkyl group, an alkyl group having a terminal CF$_3$ group or an alkyl group having a terminal CF$_2$H group; m represents an integer of 1 or more; plural $R^0$s may be the same or different, provided that at least one $R^0$ represents an alkyl group having a terminal CF$_3$ group or a terminal CF$_2$H group; $L^0$ represents a linking group having a valence of (m+n); W represents a carboxyl group (—COOH) or a salt thereof, a sulfo group (—SO$_3$H) or a salt thereof, a sulfate group (—OSO$_3$H) group or a salt thereof, or a phosphonoxy group {—OP(=O)(OH)$_2$} or a salt thereof; and n represents an integer of 1 or more.

(11) The optical compensation film of (10), wherein the onium salt is at least one compound selected from compounds represented by a following formula (3a) or a following formula (3b):

[Formula 6]

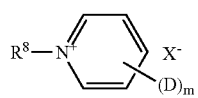

Formula (3a)

wherein $R^8$ represents a substituted or non-substituted alkyl, alkenyl, alkynyl, aralkyl, aryl or heterocyclic group; D represents a group capable of hydrogen bonding; m represents an integer of from 1 to 3; and X$^-$ represents an anion;

[Formula 7]

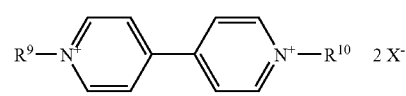

Formula (3b)

wherein $R^9$ and $R^{10}$ each represents a substituted or non-substituted alkyl, alkenyl, alkynyl, aralkyl, aryl or heterocyclic group; and X$^-$ represents an anion.

(12) The optical compensation film of (10) or (11), wherein the onium salt is a compound represented by the following formula (4):

[Formula 8]

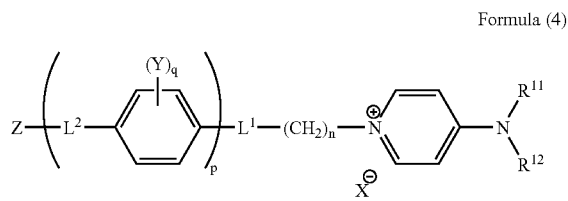

Formula (4)

wherein $L^1$ and $L^2$ respectively represent a divalent linking group or a single bond; Y represents a substituent capable of binding to phenyl other than a hydrogen atom; Z represents a hydrogen atom, a substituted or non-substituted aliphatic hydrocarbon group or a substitute or non-substituted aryl group; $R^{11}$ and $R^{12}$ respectively represent a hydrogen atom, an alkyl group, an aryl group, an acyl group, a carboamyl group, a hydroxyl group or an amino group, and $R^{11}$ and $R^{12}$ may bind to each other to from a ring; n and p respectively represent an integer from 1 to 10, q is an integer from 0 to 4, provided that when p is 2 or more, $L^2$s, Ys and qs in the respective repeating units may be the same or different; and X$^-$ represents an anion.

(13) The optical compensation film of any one of (10) to (12), wherein molecules of the rod-like liquid crystalline compound are aligned substantially vertically with respect to a film plane of the optically anisotropic layer.

(14) The optical compensation film of any one of (10) to (13), wherein the alignment layer comprises a polyvinyl alcohol derivative as a major component.

(15) A liquid crystal display device comprising at least:
a first polarizing film, a first retardation region, a second retardation region, and a liquid crystal cell comprising a liquid crystal layer interposed between a pair of substrates, in which liquid crystal molecules are aligned substantially parallel to the surfaces of the pair of substrates in a black state, wherein retardation Re (λ) of the first retardation region at a wavelength of λ nm is from 20 nm to 150 nm; and an Nz value of the first retardation region, as defined according to {Nz=(nx−nz)/(nx−ny)} by using in-plane refractive indexes nx and ny (nx>ny) and a refractive index nz in the thickness direction, is from 1.5 to 7, in-plane refractive indexes nx and ny of the second retardation region are substantially equal to each other; nx is smaller than nz; retardation Rth (λ) of the second retardation region in the thickness direction at a wavelength of λ nm is from −80 nm to −400 nm; the second retardation region comprises an optically anisotropic layer formed of a liquid crystal composition of any one of claims 1 to 7; and molecules of the rod-like liquid crystalline compound are aligned substantially vertically in the optically anisotropic layer, and a transmission axis of the first polarizing film is parallel to the slow axis direction of the liquid crystal molecules of the liquid crystal layer in a black state.

(16) The liquid crystal display of (15), wherein the first polarizing film, the first retardation region, the second retardation region, and the liquid crystal cell are disposed in this order; and the slow axis of the first retardation region is substantially parallel to the transmission axis of the first polarizing film.

(17) The liquid crystal display device of (15), wherein the first polarizing film, the second retardation region, the first retardation region, and the liquid crystal cell are disposed in this order, and the slow axis of the first retardation region substantially orthogonal to the transmission axis of the first polarizing film.

(18) The liquid crystal display device of any one of (15) to (17), further comprising a second polarizing film having a transmission axis orthogonal to the transmission axis of the first polarizing film, wherein the first and second polarizing films are disposed so as to interpose the first retardation region, the second retardation region, and the liquid crystal cell therebetween.

(19) The liquid crystal display device of any one of (15) to (18), further comprising a pair of protective films disposed so as to interpose the first polarizing film and/or the second polarizing film therebetween, wherein one of the pair of protective films, which is disposed closer to the liquid crystal layer, has retardation Rth in the thickness direction of not greater than 40 nm.

(20) The liquid crystal display device of any one of (15) to (19), further comprising a pair of protective films disposed so as to interpose the first polarizing film and/or the second polarizing film therebetween, wherein one of the pair of protective films, which is disposed closer to the liquid crystal layer, is a cellulose acylate film or a norbornene based film.

EFFECT OF THE INVENTION

According to the invention, there is provided a liquid crystal display device comprising at least a first polarizing film, a first retardation region, a second retardation region, and a liquid crystal cell having a liquid crystal layer made of a liquid crystal material interposed between a pair of substrates, in which a liquid crystal molecule of the subject nematic liquid crystal material is aligned substantially parallel to the surfaces of the pair of substrates in a black state, wherein retardation Re of the first retardation region is from 20 nm to 150 nm; an Nz1 value of the first retardation region, as defined according to $\{Nz=(nx-nz)/(nx-ny)\}$ by using in-plane refractive indexes nx and ny (nx>ny) and a refractive index nz in the thickness direction, is from 1.5 to 7; in-plane refractive indexes nx and ny of the second retardation region are substantially equal to each other; nx is smaller than nz; retardation Rth ($\lambda$) of the second retardation region in the thickness direction is from −80 nm to −400 nm; and a transmission axis of the first polarizing film is made parallel to the slow axis direction of the liquid crystal molecules in a black state; and, therefore, when observed in an oblique angle direction, a lowering of the contrast as generated due to deviation of absorption axes of the two sheets of polarizing films from 90°, especially a lowering of the contrast in an oblique direction at 45° is improved without causing any change of the characteristics of the front direction. In addition, by regulating the Rth of the protective film of the polarizing film at not more than 40 nm, it is possible to further enhance the contrast. Furthermore, by using the liquid crystal composition of the invention, it is possible to simply prepare the foregoing second retardation region without using a special vertical alignment layer. In addition, according to the invention, by aligning the molecule of a rod-like liquid crystalline compound on an onium salt-containing alignment layer in the presence of a specific compound, it is possible to vertically aligning molecules of a rod-like liquid crystalline compound stably.

EMBODIMENTS OF THE INVENTION

Hereafter, the present invention will be explained in detail. In the description, ranges indicated with "to" mean ranges including the numerical values before and after "to" as the minimum and maximum values.

In the description, Re($\lambda$) and Rth($\lambda$) respectively mean an in-plane retardation and retardation in a thickness-direction at wavelength $\lambda$. The Re($\lambda$) is measured by using KOBRA-21ADH (manufactured by Oji Scientific Instruments) for an incoming light of a wavelength $\lambda$ nm in a direction normal to a film-surface. The Rth($\lambda$) is calculated by using KOBRA-21ADH based on three retardation values; first one of which is the Re($\lambda$) obtained above, second one of which is retardation which is measured for an incoming light of a wavelength $\lambda$ nm in a direction rotated by +40° with respect to the normal direction of the film around an in-plane slow axis, which is decided by KOBRA 21ADH, as an a tilt axis (a rotation axis), and third one of which is retardation which is measured for an incoming light of a wavelength $\lambda$nm in a direction rotated by −40° with respect to the normal direction of the film around an in-plane slow axis as an a inclining axis (a rotation axis); a hypothetical mean refractive index and an entered thickness value of the film. The wavelength $\lambda$ generally falls within the range from 450 to 750 nm. According to the present invention, the wavelength $\lambda$ is 589 nm. The mean refractive indexes of various materials are described in published documents such as "POLYMER HANDBOOK" (JOHN WILEY&SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

In the description, the term of "A is parallel to B" or the term of "A is orthogonal to B" means that the angle between A and B falls within a range of an exact angle ±10°. The angle desirably falls within a range of an exact angle ±5°, and more desirably within a range of an exact angle ±2°. The term of "A is perpendicular to B" means that the angle between A and B falls within a range of an exact angle ±20°. The angle desirably falls within a range of an exact angle ±15°, and more desirably within a range of an exact angle ±10°. The term of "slow axis" means a direction giving a maximum refractive index. As long as written specifically, refractive indexes are measured at 550 nm.

In the description, the terms of "polarizing plate" means not only polarizing plates having a proper size to be employed in a liquid-crystal but also long polarizing plates before being cut. And in the description, the terms of "polarizing film" is distinct from the term "polarizing plate", and the term of "polarizing plate" is used for any laminated body comprising a "polarizing film" and at least one protective film thereon.

Embodiments of the invention will be hereunder described in detail with reference to the accompanying drawings. FIG. 1 is a schematic view to show an example of a pixel region of a liquid crystal display device of the invention. FIGS. 2 and 3 are each a schematic view of one embodiment of a liquid crystal display device of the invention.

[Liquid Crystal Display Device]

A liquid crystal display device as shown in FIG. 2 comprises polarizing films 8 and 20, a first retardation region 10, a second retardation region 12, substrates 13 and 17, and a liquid crystal layer 15 as interposed between the subject substrates. The polarizing films 8 and 20 are interposed between protective films 7a and 7b and protective films 19a and 19b, respectively.

In the liquid crystal display device of FIG. 2, a liquid crystal cell comprises the substrates 13 and 17 and the liquid crystal layer 15 as interposed between these substrates. With respect to the product Δn·d of a thickness d (μm) and a refractive index anisotropy Δn of the liquid crystal layer, in the transmission mode, the range of from 0.2 to 0.4 μm is an optimum value in the IPS type not having a twist structure. Within this range, the white state luminance is high and the black state luminance is low, and therefore, a bright display device with high contrast is obtained. An alignment layer (not illustrated) is formed on the surface of each of the substrates 13 and 17 coming into contact with the liquid crystal layer 15, whereby a liquid crystal molecule is aligned approximately parallel to the surface of the substrate, and the alignment direction of the liquid crystal molecules in the state that no voltage is applied or a low voltage is applied is controlled by rubbing treatment directions 14 and 18 as applied on the alignment layer, etc. Furthermore, electrodes (not illustrated in FIG. 2) capable of applying a voltage to the liquid crystal molecules are formed on the internal surface of the substrate 13 or 17.

FIG. 1 schematically shows the alignment of the liquid crystal molecules in one pixel region of the liquid crystal layer 15. FIG. 1 is a schematic view to show the alignment of the liquid crystal molecules in a region having an extremely small area to an extent corresponding to one pixel of the liquid crystal layer 15 along with a rubbing direction 4 of the alignment layer formed on the internal surface of each of the substrates 13 and 17 and electrodes 2 and 3 capable of applying a voltage to the liquid crystal molecules as formed on the internal surface of each of the substrates 13 and 17. In the case of performing active drive using a nematic liquid crystal having positive dielectric anisotropy as a field effect type liquid crystal, the alignment direction of the liquid crystal molecules in the state that no voltage is applied or a low voltage is applied is 5a and 5b, and at this time, black state is obtained. When a voltage is applied between the electrodes 2 and 3, the alignment direction of the liquid crystal molecules is changed to directions 6a and 6b corresponding to the voltage. Usually, bright display is carried out in this state.

Again, in FIG. 2, a transmission axis 9 of the polarizing film 8 and a transmission axis 21 of the polarizing film 20 are disposed orthogonal to each other. A slow axis 11 of the first retardation region 10 is parallel to the transmission axis 9 of the polarizing film 8 and a slow axis direction 16 of the liquid crystal molecules in the liquid crystal layer 15 in a black state.

In the liquid crystal display device as shown in FIG. 2, the construction in which the polarizing film 8 is interposed between two sheets of the protective films 7a and 7b, but the protective film 7b may be omitted. In the case where the protective film 7b is omitted, it is preferable that a part or the whole of the first retardation region 10 has a characteristic such that it can also function as the protective film 7b of the polarizing film. Furthermore, the polarizing film 20 is interposed between two sheets of the protective films 19a and 19b, too. However, the protective film 19a in the side close to the liquid crystal layer 15 may be omitted. Incidentally, in the embodiment of FIG. 2, the first retardation region 10 and the second retardation region 12 may be disposed between the liquid crystal cell and the polarizing film in the viewing side or may be disposed between the liquid crystal cell and the polarizing film in the back face side on the basis of the position of the liquid crystal cell. In this embodiment, in all of these constructions, the second retardation region is disposed closer to the liquid crystal cell.

Another embodiment of the invention is shown in FIG. 3. In a liquid crystal display device of FIG. 3, the second retardation region 12 is disposed between the polarizing film 8 and the first retardation region 10. In the liquid crystal display device of FIG. 3, the protective film 7b may be omitted. In the case where the protective film 7b is omitted, it is preferable that a part or the whole of the second retardation region 12 has a characteristic such that it can also function as the protective film 7b of the polarizing film. Furthermore, the polarizing film 20 is interposed between two sheets of the protective films 19a and 19b, too. However, the protective film 19a in the side close to the liquid crystal layer 15 may be omitted. In the embodiment as shown in FIG. 3, the first retardation region 10 is disposed such that its slow axis 11 is orthogonal to the transmission axis 9 of the polarizing film 8 and the slow axis direction 16 of the liquid crystal molecules in the liquid crystal layer 15 in a black state. Incidentally, in the embodiment of FIG. 3, the first retardation region 10 and the second retardation region 12 may be disposed between the liquid crystal cell and the polarizing film in the viewing side or may be disposed between the liquid crystal cell and the polarizing film in the back face side on the basis of the position of the liquid crystal cell. In this embodiment, in all of these constructions, the first retardation region is disposed closer to the liquid crystal cell.

Incidentally, in FIG. 3 and FIG. 2, while an embodiment of a display device of a transmission mode in which an upper polarizing plate and a lower polarizing plate are provided has been shown, the invention may be concerned with an embodiment of a reflection mode in which only one polarizing plate is provided, too. In such case, since the optical path in the liquid crystal cell becomes twice, an optimum value of Δn·d becomes a value of approximately ½ of the foregoing value. Furthermore, the liquid crystal cell which is used in the invention is not limited to the IPS mode, but it can be suitably applied to any liquid crystal display device so far as the liquid crystal molecules are aligned substantially parallel to the surfaces of the foregoing pair of substrates in a black state. Examples of such a liquid crystal display device include a ferroelectric liquid crystal display device, an antiferroelectric liquid crystal display device, and an ECB type liquid crystal display device.

The liquid crystal display device of the invention is not limited to the constructions as shown in FIGS. 1 to 3 but may contain other members. For example, a color filter may be disposed between the liquid crystal layer and the polarizing film. Also, an antireflection treatment may be applied to or a hard coat may be provided on the surface of the protective film of the polarizing film. Also, a material to which electric conductivity has been imparted may be used as the constructing member. Also, when used as a transmission type, a coldcathode or hot-cathode fluorescent tube or a backlight using, as a light source, a light emitting diode, a field emission element or an electroluminescent element can be disposed on the back face. In this case, the backlight may be disposed in the upper side or lower side in each of FIG. 2 and FIG. 3. Also, a reflection type polarizing plate or a diffusion plate, or a prism sheet or a light guide plate can be disposed between the liquid crystal layer and the backlight. Also, as described previously, the liquid crystal display device of the invention may be of a reflection type. In such case, only one polarizing plate may be disposed in the observation side, and a reflection film is disposed on the back face of the liquid crystal cell or on the internal surface of the lower substrate of the liquid crystal cell. As a matter of course, it is also possible to provide a frontlight using the foregoing light source in the observation side of the liquid crystal cell.

Embodiments of the liquid crystal display device of the invention include an image direct-view type, an image projection type, and a light modulation type devices. The invention is especially efficient for an embodiment for applying to an active matrix liquid crystal display device using a three-terminal or two-terminal semiconductor elements such as TFT and MIM. As a matter of course, the invention is also efficient for an embodiment for applying to a passive matrix liquid crystal display device as called "time sharing drive".

Preferred optical characteristics of a variety of members which can be used in the liquid crystal display device of the invention and materials to be used for the members, production methods thereof, and the like will be hereunder described in detail.

[First Retardation Region]

The first retardation region to be employed in the liquid crystal display device of the invention comprises retardation Re ($\lambda$) of from 20 nm to 150 nm. In order to effectively reduce light leakage in an oblique direction, the Re ($\lambda$) of the first retardation region is more preferably from 40 nm to 115 nm, and further preferably from 60 nm to 95 nm. Furthermore, the first retardation region has Nz, as defined according to {Nz=(nx−nz)/(nx−ny)} by using in-plane refractive indexes nx and ny (nx>ny) and a refractive index nz in the thickness direction, of from 1.5 to 7. In order to effectively reduce light leakage in an oblique direction, the Nz of the first retardation region is more preferably from 2.0 to 5.5, and further preferably from 2.5 to 4.5.

Basically, the foregoing first retardation region is not particularly limited with respect to the materials and form thereof so far as it has the foregoing optical characteristics. For example, all of a retardation film made of a birefringent polymer film, a film as prepared by coating a high molecular compound on a transparent support and then heating, and a retardation film having a retardation layer as formed by coating or transferring a low molecular or high molecular liquid crystalline compound on a transparent support can be used. A laminate of these films can also be used.

As the birefringent polymer film, ones having excellent controlling properties of the birefringence characteristic, transparency and heat resistance are preferable. In this case, the high molecular material to be used is not particularly limited so far as it can achieve uniform biaxial alignment. Conventionally known high molecular materials which can be subjected to film formation by the solution casting method or extrusion molding system are preferable, and examples thereof include norbornene based high molecular materials, polycarbonate based high molecular materials, polyallylate based high molecular materials, polyester based high molecular materials, aromatic high molecular materials such as polysulfone, cellulose acylates, and mixed polymers of two or three or more kinds of these polymers.

The biaxial alignment of the film can be achieved by stretching a film made of the subject thermoplastic resin as produced by an appropriate system such as an extrusion molding system and a cast film formation system by, for example, a longitudinal stretching system by rolls, a transversal stretching system by a tenter, or a biaxial stretching system. In the foregoing longitudinal stretching system by rolls, an appropriate heating method such as a method of using heat rolls, a method of heating the atmosphere, and a combination thereof can be employed. Furthermore, in the biaxial stretching system by a tenter, an appropriate method such as a simultaneous biaxial stretching method by an entire tenter system and a sequent biaxially stretching method by the roll tenter method can be employed.

Furthermore, polymer films which are less in alignment unevenness or retardation unevenness are preferable. Though the film thickness can be properly determined by retardation and the like, it is generally from 1 to 300 µm, preferably from 10 to 200 µm, and especially preferably from 20 to 150 µm in terms of thinning of the thickness.

Examples of the norbornene based high molecular materials include polymers of a monomer containing, as the major component, a norbornene based monomer (for example, norbornene and derivatives thereof, tetracyclododecene and derivatives thereof, dicyclopentadiene and derivatives thereof, methanotetrahydrofluorenone and derivatives thereof) such as ring opening polymers of a norbornene based monomer, ring opening copolymers of a norbornene based monomer and other monomer which is ring opening copolymerizable therewith, addition polymers of a norbornene based monomer, addition copolymers of a norbornene based monomer and other monomer which is ring opening copolymerizable therewith, and hydrogenation products thereof. Of these, ring opening polymer hydrides of a norbornene based monomer are the most preferable from the viewpoints of heat resistance and mechanical strength and so on. The molecular mass of the norbornene based polymer, monocyclic olefin polymer or cyclic conjugated diene polymer is properly chosen depending upon the intended object for use. When a weight average molecular weight, as reduced into polyisoprene or polystyrene by the gel permeation chromatography with respect to a cyclohexane solution thereof (a toluene solution thereof when, however, the polymer resin is not dissolved), is usually in the range of from 5,000, to 500,000, preferably from 8,000 to 200,000, and more preferably from 10,000 to 100,000, the film is highly balanced between mechanical strength and molding processability and therefore, is suitable. Examples of representative polymers include polymers as described in TOKKAI No. 2003-327800 and TOKKAI No. 2004-233604.

In the cellulose acylates, the acyl group may be an aliphatic group or an aromatic group and is not particularly limited. Examples of the cellulose acylates include alkyl-carbonyl esters, alkenylcarbonyl esters, aromatic carbonyl esters, and aromatic alkylcarbonyl esters of cellulose. These cellulose esters may further have a substituted group, and ester groups having not more than 22 carbon atoms in total are preferable. Preferred examples of these cellulose acylates include ones in which the ester moiety thereof has not more than 22 carbon atoms in total, such as an acyl group (for example, acetyl, propionyl, butyroyl, valeryl, heptanoyl, octanoyl, decanoyl, dodecanoyl, tridecanoyl, hexadecanoyl, and octadecanoyl), an allylcarbonyl group (for example, acryl and methacryl), an arylcarbonyl group (for example, benzoyl and naphthaloyl), and a cinnamoyl group. Specific examples thereof include cellulose acetate, cellulose acetate propionate, cellulose acetate butyrate, cellulose acetate stearate, and cellulose acetate benzoate. In the case of a mixed ester, while its mixing ratio is not particularly limited, it is preferable that the acetate accounts for 30% by mole or more of the whole ester.

Of these, cellulose acylates are preferable, and those of a photographic grade are especially preferable. Commercially available cellulose acylates of a photographic grade are satisfactory with respect to qualities such as viscosity average polymerization degree and substitution degree. Examples of manufacturers of cellulose triacetate of a photographic grade include Daicel Chemical Industries, Ltd. (for example, LT-20, LT-30, LT-40, LT-50, LT-70, LT-35, LT-55, and LT-105), Eastman Chemical Company (for example, CAB-551-0.01, CAB-551-0.02, CAB-500-5, CAB-381-0.5, CAB-381-02, CAB-381-20, CAB-321-0.2, CAP-504-0.2, CAP-482-20, and CA-398-3), Courtaulds Chemicals, and Hoechst AG. All of cellulose acylates of a photographic grade available from these manufacturers can be used. Furthermore, for the purpose of controlling the mechanical characteristic or optical characteristics of the film, it is possible to mix a plasticizer, a surfactant, a retardation regulator, a UV absorber, or the like. Details of these additives are described in, for example, TOKKAI No. 2002-277632 and TOKKAI No. 2002-182215.

As a method for molding a transparent resin into a sheet or film-like form, for example, all of a heat melt molding method and a solution casting method can be employed. In more detail, the heat melt molding can be classified into an extrusion molding method, a press molding method, an inflation molding method, an injection molding method, a blow molding method, a stretching molding method, and the like. Above all, in order to obtain a film which is excellent in mechanical strength, surface precision, etc., an extrusion molding method, an inflation molding method, and a press molding method are preferable, and an extrusion molding method is the most preferable. The molding condition is properly chosen depending upon the intended object for use and the molding method. In the case of the heat melt molding method, the cylinder temperature is properly chosen within the range of preferably from 100 to 400° C., and more preferably from 150 to 350° C. The thickness of the foregoing sheet or film is preferably from 11 to 300 μm, and more preferably from 30 to 200 μm.

Stretching of the foregoing sheet or film is preferably carried out in at least one direction in a stretching ratio of from 1.01 to 2 times at a temperature preferably in the range of from (Tg−30° C.) to (Tg+60° C.), and more preferably in the range of from (Tg−10° C.) to (Tg+50° C.) wherein Tg represents a glass transition temperature of the subject transparent resin. The stretching direction may be at least one direction. In the case where the sheet is obtained by extrusion molding, it is preferable that the subject direction is the mechanical flow direction (extrusion direction) of the resin. As the stretching method, a free contraction uniaxial stretching method, a width-fixing uniaxial stretching method, a biaxial stretching method, and the like are preferable. Control of the optical characteristics can be carried out by controlling this stretching ratio and the heating temperature.

[Second Retardation Region]

The second retardation region to be employed in the liquid crystal display device of the invention has in-plane refractive indexes nx and ny, which are substantially equal to each other, and a refractive index nz in the thickness direction satisfying the relationship of nx<nz. In addition, retardation Rth (X) of the second retardation region in the thickness direction is from −80 nm to −400 nm.

A more preferred range of Rth (λ) of the foregoing second retardation region varies depending on the optical characteristics of other optical members and especially, varies depending on the Rth (λ) of a protective film (for example, a triacetyl cellulose film) of the polarizing film as positioned more closely. In order to effectively reduce light leakage in an oblique direction, the Rth (λ) of the second retardation region is preferably from −100 nm to −340 nm, and more preferably from −120 nm to −270 nm. On the other hand, nx and ny of the second retardation region are substantially equal to each other as described previously, and the Re (λ) becomes a value in the vicinity of 0. Specifically, the in-plane retardation Re (λ) is preferably from 0 to 50 nm, and more preferably from 0 to 20 nm.

The foregoing second retardation region comprises an optically anisotropic layer formed of a composition of the invention as described later. The foregoing composition comprises a rod-like liquid crystalline compound, and in the subject optically anisotropic layer, molecules of the rod-like liquid crystalline compound is immobilized in the state that they are vertically aligned. The foregoing second retardation region may be formed of only the foregoing optically anisotropic layer or may be formed of a plural number of optically anisotropic layers. Also, the second retardation region may be constructed so as to satisfy the foregoing optical characteristics by the whole of a laminate of the support and the optically anisotropic layer. As the rod-like liquid crystalline compound to be used, ones which take the state of a nematic liquid crystal phase, a smectic liquid crystal phase or a lyotropic liquid crystal phase within the temperature range at which alignment and immobilization are carried out can be suitably used. In order to obtain the uniform alignment state, a liquid crystal exhibiting a nematic phase is preferable. In particular, with respect to the rod-like liquid crystalline compound which becomes in the foregoing liquid crystal state within an adequate alignment temperature range in the presence of an additive, it is also preferred to form a layer by using a composition containing the subject additive and the rod-like liquid crystalline compound.

The term "substantially vertical (or vertically)" means that an angle between the film surface and a director of the rod-like liquid crystalline compound falls within the range of from 70° to 90°. Such a liquid crystalline compound may be tilt aligned or may be subjected to hybrid alignment such that a tilt angle gradually changes. Even in the case of the tilt alignment or hybrid alignment, a mean tile angle is preferably from 70° to 90, more preferably from 80° to 90°, and most preferably from 85° to 90°.

The liquid crystal composition of the present invention will be described in detail. The liquid crystal composition of the present invention may be used for producing the second retardation region employed in the liquid crystal display of the present invention.

(Liquid Crystal Composition of the Invention)

The liquid crystal composition of the present invention comprises at least one onium salt, at least one rod-like liquid crystal compound and at least one additive capable of promoting vertical alignment of molecules of the rod-like liquid crystal compound at an air-interface.

《Onium Salt》

The composition of the present invention comprises at least one onium salt. The onium salt may contribute to promoting vertical alignment of molecules of a rod-like liquid crystal compound at an alignment-layer-interface in the composition. Examples of the onium salt include ammonium salts, sulfonium salts and phosphonium salts. The onium salt is desirably selected from quaternary onium salts, and more desirably selected from quaternary ammonium salts.

The quaternary ammonium salts are usually prepared by alkylation (Menshutkin reaction), alkenylation, alkynylation or arylation of tertiary ammonium salts such as trimethylamine, triethylamine, tributylamine, triethanolamine, N-methylpyrrolidine, N-methylpiperidine, N,N-dimethylpiperazine, triethylenediamine or N,N,N',N'-tetramethyl ethylenediamine; or nitrogen-containing hetero-rings such as pyridine ring, picoline ring, 2,2'-bipyridine ring, 4,4'-bipyridile ring, 1,10-pnenanthoroline ring, quinoline ring, oxazole ring, thiazole ring, N-methylimidazole ring, pyrazine ring or tetrazole ring.

The quaternary ammonium salt is desirably selected from quaternary ammonium salts of nitrogen-containing hetero-rings, and more desirably selected from quaternary pyridinium salts.

The quaternary ammonium salt is desirably selected from the group represented by a formula (3a) or a formula (3b).

[Formula 9]

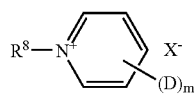

Formula (3a)

In the formula (3a), $R^8$ represents a substituted or non-substituted, alkyl group, alkenyl group, alkynyl group, aralkyl group, aryl group or heterocyclic group; D represents a group capable of hydrogen bonding; m represents an integer from 1 to 3; and $X^-$ represents an anion.

First, the formula (3a) will be explained.

The alkyl group represented by $R^8$ is desirably selected from substituted or non-substituted $C_{1-18}$ alkyl groups, and more desirably selected from substituted or non-substituted $C_{1-8}$ alkyl groups. The alkyl group may have a linear chain, branched chain or cyclic structure. Examples of the alkyl group include methyl, ethyl, n-propyl, isopropyl, n-butyl, isobutyl, t-butyl, n-hexyl, n-octyl, neopentyl, cyclohexyl, adamantyl and cyclopropyl.

Examples of the substituent of the alkyl group include a substituted or non-substituted $C_{2-18}$, desirably $C_{2-8}$, alkenyl group such as vinyl; a substituted or non-substituted $C_{2-18}$, desirably $C_{2-8}$, alkynyl group such as ethynyl; a substituted or non-substituted $C_{6-10}$ aryl group such as phenyl or naphthyl; a halogen atom such as F, Cl or Br; substituted or non-substituted $C_{1-18}$, desirably $C_{1-8}$, alkoxy group such as methoxy or ethoxy; a substituted or non-substituted $C_{6-10}$ aryloxy group such as phenoxy, biphenyloxy or p-methoxyphenoxy; a substituted or non-substituted $C_{1-18}$, desirably $C_{1-8}$, alkylthio group such as methylthio or ethylthio; a substituted or non-substituted $C_{6-10}$ arylthio group such as phenylthio; a substituted or non-substituted $C_{2-18}$, desirably $C_{2-8}$, acyl group such as acetyl or propionyl;

a substituted or non-substituted $C_{1-18}$, desirably $C_{1-8}$, alkylsulfonyl or arylsulfonyl group such as methanesulfonyl or p-toluene sulfonyl; a substituted or non-substituted $C_{2-18}$, desirably $C_{2-8}$, acyloxy group such as acetoxy or propionyl oxy; a substituted or non-substituted $C_{2-18}$, desirably $C_{2-8}$, alkoxycarbonyl group such as methoxycarbonyl or ethoxycarbonyl; a substituted or non-substituted $C_{7-11}$ aryloxycarbonyl group such as naphthoxy carbonyl; a non-substituted amino group; a substituted $C_{1-18}$, desirably $C_{1-8}$, amino group such as methylamino, dimethylamino, diethylamino, anilino, methoxyphenyl amino, chlorophenyl amino, pyridyl amino, methoxycarbonylamino, n-butoxycarbonyl amino, phenoxycarbonyl amino, methylcarbamoyl amino, ethylthiocarbamoyl, amino, phenylcarbamoyl amino, acetylamino, ethylcarbonyl amino, ethylcarbamoyl amino, cyclohexylcarbonyl amino, benzoylamino, chloro acetylamino or methylsulfonyl amino;

a substituted or non-substituted $C_{1-18}$, desirably $C_{1-8}$, carbamoyl group such as non-substituted carbamoyl, methylcarbamoyl, ethylcarbamoyl, n-butylcarbamoyl, t-butylcarbamoyl, dimethylcarbamoyl, morpholino carbamoyl or pyrrolidino carbamoyl; a non-substituted sulfamoyl group; a substituted $C_{1-18}$, desirably $C_{1-8}$, sulfamoyl group such as methylsulfamoyl or phenylsulfamoyl; a cyano group, a nitro group, a carboxyl group, a hydroxy group, a heterocyclic group such as an oxazole ring, benzoxazole ring, thiazole ring, benzothiazole ring, imidazole ring, benzoimidazole ring, indolenine ring, pyridine ring, piperidine ring, pyrrolidine ring, morpholine ring, sulfolane ring, furan ring, thiophene ring, pyrazole ring, pyrrole ring, chroman ring or coumarin ring. The substituent for the alkyl group is much desirably selected from aryloxy groups, arylthio groups, arylsulfonyl group and aryloxycarbonyl groups.

The alkenyl group represented by $R^8$ is desirably selected from substituted or non-substituted $C_{2-18}$ alkenyl groups, and more desirably selected from substituted or non-substituted $C_{2-8}$ alkenyl groups. Examples of the alkenyl group include vinyl, allyl, 1-propenyl and 1,3-butadiene. Examples of the substituent for the alkenyl group are same as those for the alkyl group.

The alkynyl group represented by $R^8$ is desirably selected from substituted or non-substituted $C_{2-18}$ alkynyl groups, and more desirably selected from substituted or non-substituted $C_{2-8}$ alkynyl groups. Examples of the alkynyl group include ethynyl and 2-propynyl. Examples of the substituent for the alkynyl group are same as those for the alkyl group.

The aralkyl group represented by $R^8$ is desirably selected from substituted or non-substituted $C_{7-18}$ aralkyl groups. Examples of the aralkyl group include benzyl, methylbenzyl, biphenyl methyl and naphthyl methyl. Examples of the substituent for the aralkyl group are same as those for the alkyl group.

The aryl group represented by $R^8$ is desirably selected from substituted or non-substituted $C_{6-18}$ aryl groups. Examples of the aryl group include phenyl, naphthyl or fluorenyl. Examples of the substituent for the aryl group are same as those for the alkyl group. Other preferred examples of the substituent for the aryl group include alkyl groups such as methyl or ethyl, alkynyl groups and benzoyl groups.

The heterocyclic group represented by $R^8$ is desirably selected from saturated or non-saturated 5- or 6-members heterocyclic groups, composed of a carbon, nitrogen, oxygen or sulfur atom. Examples of the heterocyclic group include an oxazole ring, a benzoxazole ring, thiazole ring, benzothiazole ring, imidazole ring, benzoimidazole ring, indolenine ring, pyridine ring, piperidine ring, pyrrolidine ring, morpholine ring, sulfolane ring, furan ring, thiophene ring, pyrazole ring, pyrrole ring, chroman ring or coumarin ring. Examples of the substituent of the heterocyclic group are same as those for the alkyl group. The heterocyclic group is more desirably a benzoxazole ring or a benzothiazole ring.

It is preferred that $R^8$ is a substituted or non-substituted alkyl group, aralkyl group, aryl group or heterocyclic group.

D represents a group capable of hydrogen-bonding. Hydrogen bonds occur in molecules that have hydrogen atoms bound to electronic negative atoms such as O, N, F and Cl. For example, theoretical explanation of hydrogen bond is described in "Journal of American Chemical Society, vol. 99, p. 1316~1332 (1977), H. Uneyama and K. Morokuma". The specific types of hydrogen bonds are described in FIG. 17 on page 98 of "Intermolecular and Surface Forces" written by Israelachvili, translated by T. Kondo and H. Ohshima and published by McGraw-Hill. Specific examples of hydrogen bonds are described in "Angewante Chemistry International Edition English, vol. 34, p. 2311 (1995), G. R. Desiraju" and the like.

Preferred examples of the function group capable of hydrogen bonding include mercapto, hydroxy, amino, carboxamide, sulfonamide, acid amide, ureido, carbamoyl, carboxyl, sulfo and N-containing heterocyclic group such as imidazolyl, benzimidazolyl, pyrazolyl, pyridyl, 1,3,5,-triazyl, pyrimidyl, pyridazil, quinolyl, benzimidazolyl, benzothiazolyl, succinimido, phthalimido, maleimide, uracil, thiouracil, barbituric acid, hydantoin, maleic acid hydrazide, isatine and uramil. More preferred examples of the function group capable of hydrogen bonding include amino, carboxamide, sulfonamide, ureido, carbamoyl, carboxyl, sulfo and pyridyl, and much more preferred examples include amino, carbamoyl and pyridyl.

The anion represented by $X^-$ may be selected from inorganic or organic anions. Examples of the anion include halogen anions such as fluorine ion, chlorine ion, bromine ion or iodine ion; sulfonate ions such as methanesulfonic acid ion, trifluoromethanesulfonic acid ion, methylsulfuric acid ion, p-toluene sulfonic acid ion, p-chloro benzenesulfonic acid ion, 1,3-benzenedisulfonic acid ion, 1,5-naphthalenedisulfonic acid ion or 2,6-nephthalenedisulfonic acid ion; sulfate ion, thiocyanic acid ion, perchloric acid ion, tetrafluoro boric acid, picric acid ion, acetic acid ion, phosphoric acid ion such as hexafluoro phosphoric acid ion and hydroxy ion. $X^-$ is desirably selected from a halogen anion, sulfonate ion and hydroxy ion. It is noted that $X^-$ is not required to be a monovalent anion. Thus, $X^-$ may be selected from two or more valent anions, and in such case, it is not required that the cation-to-anion ratio is 1.

In the formula (3a), m is desirably 1.

The quaternary ammonium salt is more desirably selected from the group represented by a formula (4).

[Formula 10]

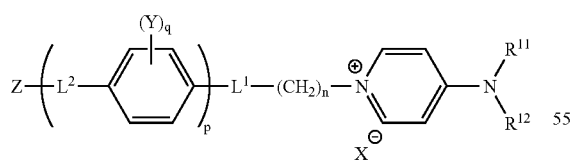

Formula (4)

In the formula (4), $L^1$ and $L^1$ respectively represent a divalent linking group or a single bond. The divalent linking group is desirably selected from a group consisting of a substituted or non-substituted $C_{1-10}$ alkylene group such as methylene, ethylene or 1,4-butylene, —O—, —C(=O)—, —C(=O)O—, —OC(=O)O—, —S—, —NR'—, —C(=O)NR'—, —S(=O)$_2$— and any combinations of at least two thereof. R' and R" respectively represent a hydrogen atom or a substituted or non-substituted alkyl group. When right-left asymmetric divalent linking groups such as —C(=O)O— are selected, such divalent linking groups may bind to the two sites in both directions (for example —C(=O)O— and —OC (=O)—).

In the formula, Y represents a substituent capable of binding to phenyl other than a hydrogen atom. Examples of the substituent represented by Y include a halogen atom, an alkyl group, whose meaning includes a cycloalkyl group or bicycloalkyl group, an alkenyl group, whose meaning includes a cycloalkenyl group or bicycloalkenyl group, an alkynyl group, an aryl group, a heterocyclic group, a cyano group, a hydroxyl group, a nitro group, an alkoxy group, an aryloxy group, an acyloxy group, a carbamoyl group, an amino group, whose meaning includes an anylino group, an acylamino group, a sulfamoyl amino group, a mercapto group, an alkylthio group, an arylthio group, an acyl group, an aryloxycarbonyl group, alkoxycarbonyl group and a carbamoyl group.

In the formula, $R^{11}$ and $R^{12}$ respectively represent a hydrogen atom, an alkyl group, an aryl group, an acyl group, a carboamyl group, a hydroxyl group or an amino group. And $R^{11}$ and $R^{12}$ may bind to each other to from a ring.

In the formula, Z represents a hydrogen atom, a substituted or non-substituted aliphatic hydrocarbon group such as a $C_{1-30}$ alkyl group and $C_{2-30}$ alkenyl group; or a substitute or non-substituted aryl group such as $C_{6-30}$ phenyl group. In the formula, n and p respectively represent an integer from 1 to 10, q is an integer from 0 to 4. When p is 2 or more, $L^2$, Y or q included in each repeating unit may be same or different each other.

The preferred embodiment of the formula (4) will be described in detail hereinafter.

In the formula, $L^1$ desirably represents —O— or a single bond; and $L^2$ desirably represents —O—, —C(=O)O—, —OC(=O)O— or a single bond.

In the formula, Y desirably represents a halogen atom; a substituted or non-substituted alkyl group, having a linear or branched chain structure or a ring structure; an alkoxy group or a cyano group; and more desirably represents a halogen atom such as a fluorine atom, a chlorine atom or a bromine atom; a substituted or non-substituted $C_{1-30}$ alkyl group such as methyl, ethyl, n-propyl, isopropyl, t-butyl, n-octyl, 2-chloroethyl, 2-cyanoethyl and 2-ethyl hexyl; an alkoxy group such as methoxy or ethoxy; or a cyano group.

In the formula (4), $R^{11}$ and $R^{12}$ desirably represent a substituted or non-substituted alkyl group; and most desirably methyl.

In the formula (4), p is desirably an integer from 1 to 5 and more desirably from 2 to 4; n is desirably an integer from 1 to 4 and more desirably 1 or 2; q is desirably 0 or 1. When p is 2 or more, q in at least one unit is desirably 1 or more.

Next, the formula (3b) will be described in detail.

[Formula 11]

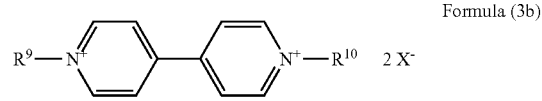

Formula (3b)

In the formula (3b), $R^9$ and $R^{10}$ respectively represent a substituted or non-substitute, alkyl group, alkenyl group, alkynyl group, aralkyl group, aryl group or heterocyclic group; and $X^-$ represents an anion.

The substituted or non-substituted, alkyl group, alkenyl group, alkynyl group, aralkyl group, aryl group or heterocyclic group is identically defined with those in the formula (3a)

respectively, and their preferred scopes are also same. The anion represented by X⁻ is identically defined with that in the formula (3a), and the preferred scope is also same. AS described above, X⁻ is not required to be a monovalent anion. Thus, X⁻ may be selected from two or more valent anions, and in such case, it is not required that the cation-to-anion ratio is ½.

Specific examples of the onium salt, which can be used in the present invention, are shown below, and, however, onium salts that can be employed in the present invention are not limited to these. Among the examples, Example No. II-1~12 are examples of the onium salt represented by the formula (3b); and Examples No. II-13~32 are examples of the onium salt represented by the formula (3a).

[Formula 12]

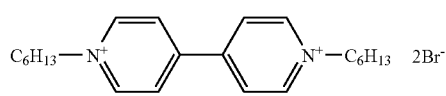

II-1

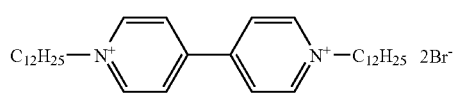

II-2

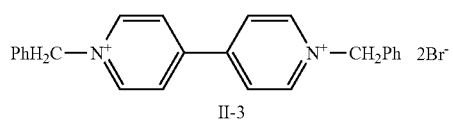

II-3

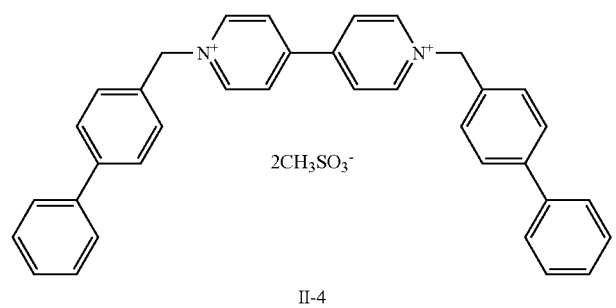

II-4

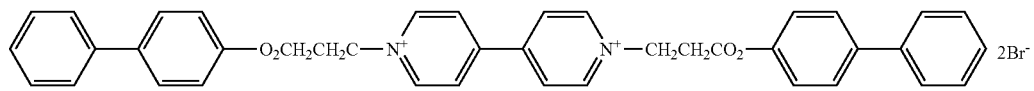

II-5

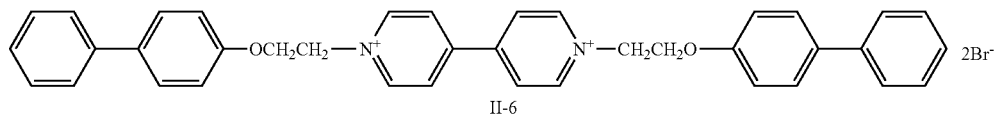

II-6

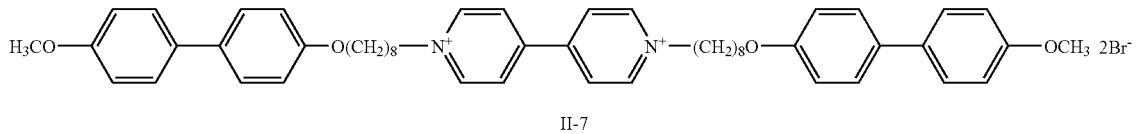

II-7

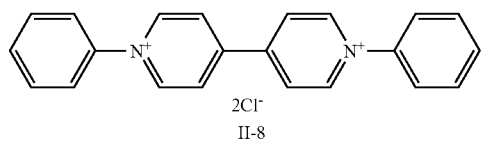

II-8

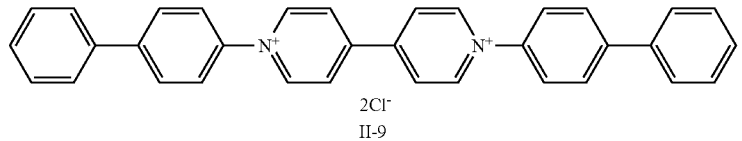

II-9

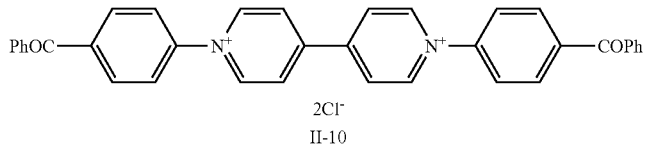

II-10

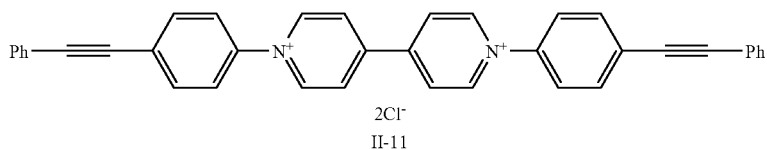

II-11

-continued
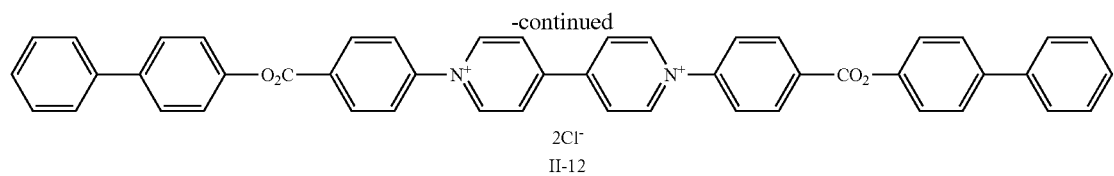
II-12
[Formula 13]
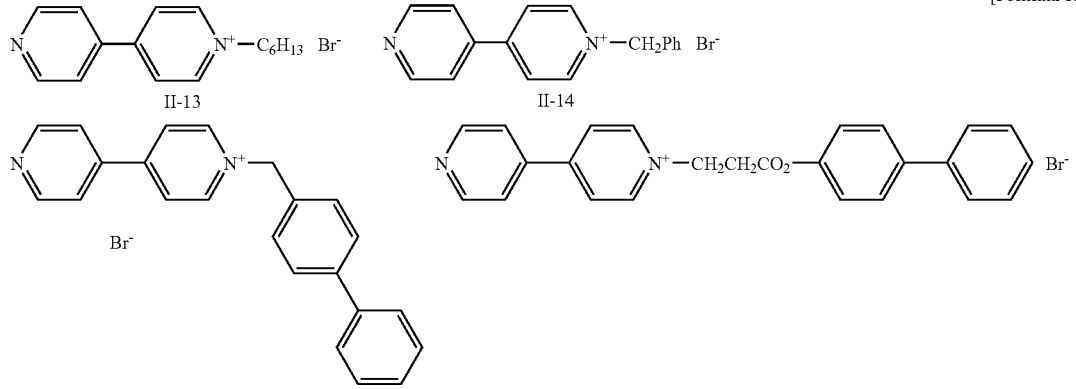
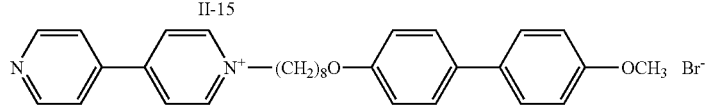
II-18
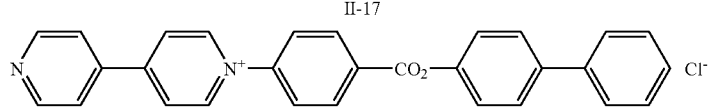
II-19
[Formula 14]
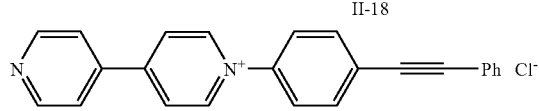
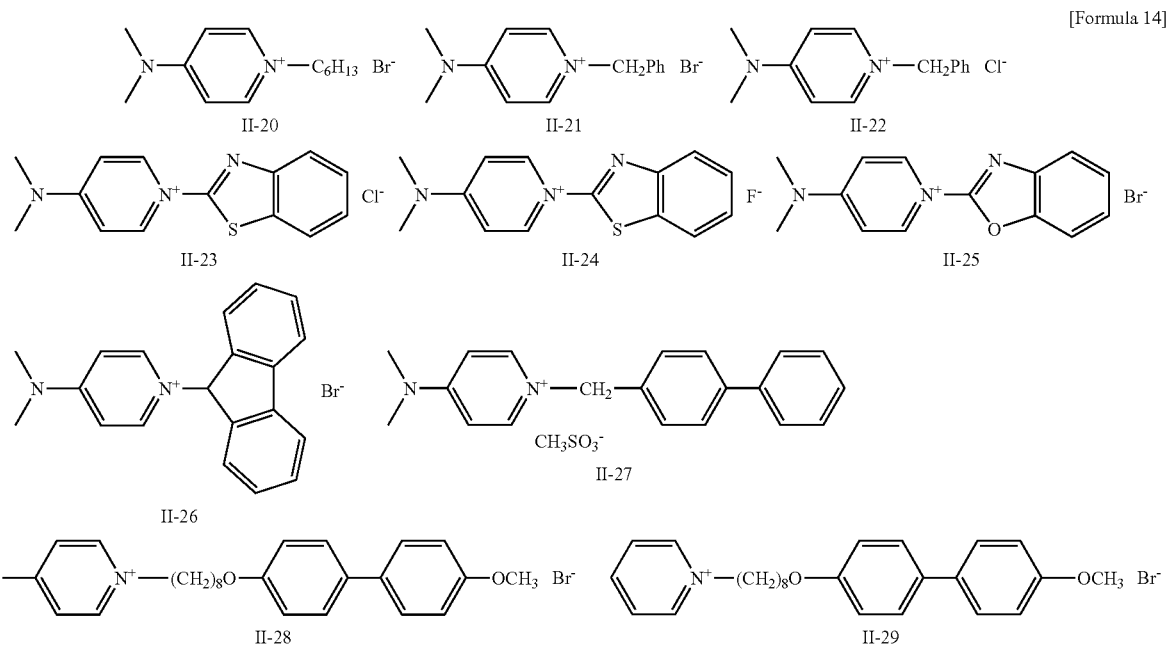

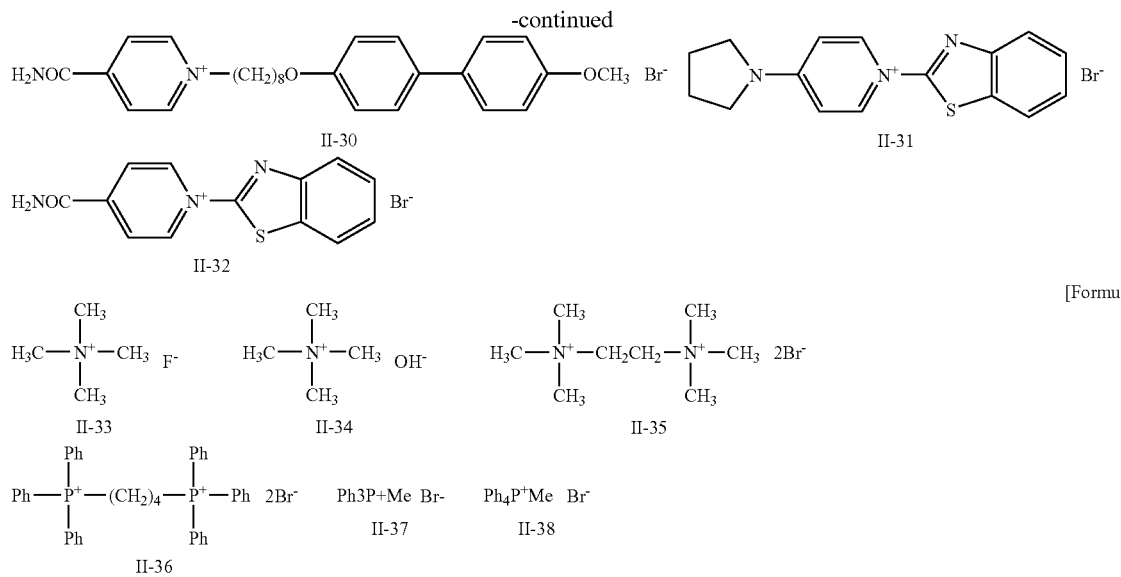
Quandary ammonium salts (1) to (60) shown below are also preferred.
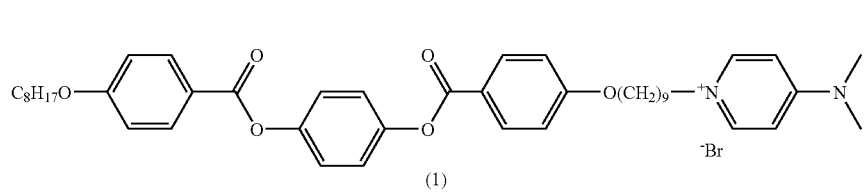
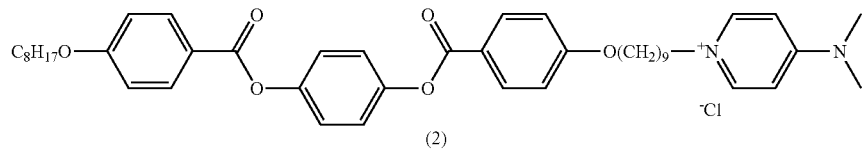
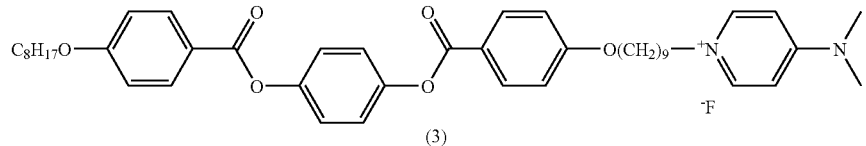
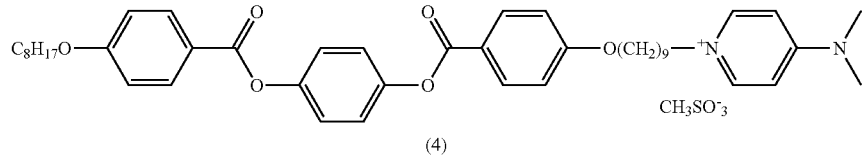
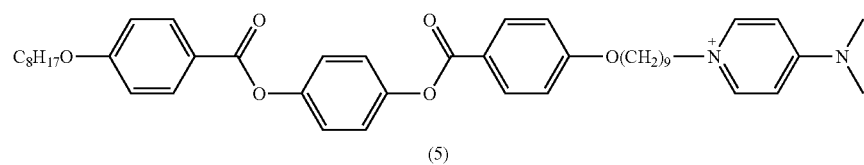

[Formula 21]
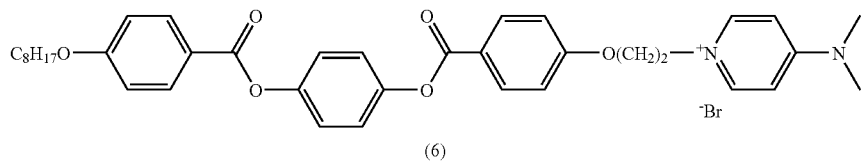
(6)
[Formula 22]
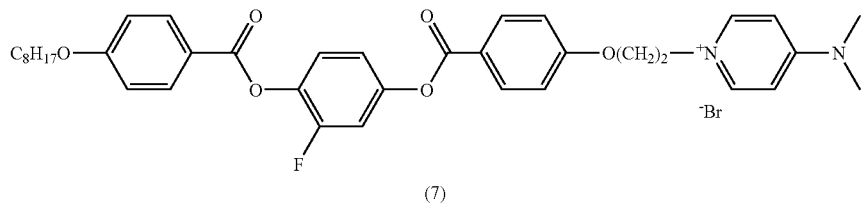
(7)
[Formula 23]
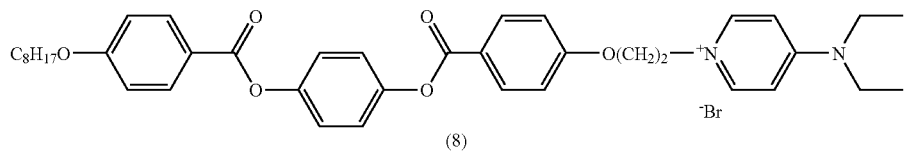
(8)
[Formula 24]
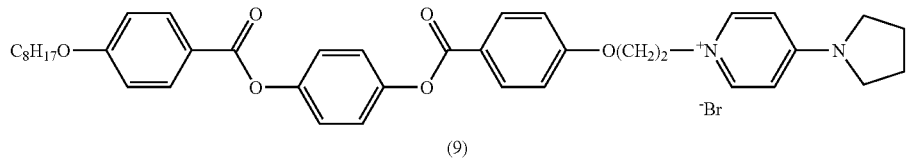
(9)
[Formula 25]
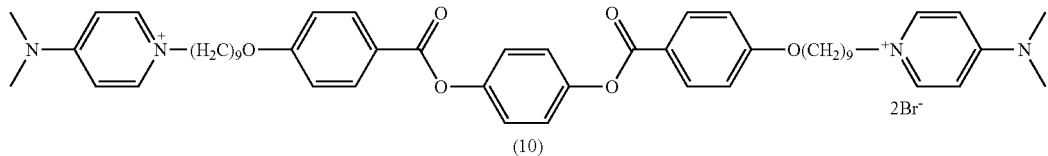
(10)
[Formula 26]
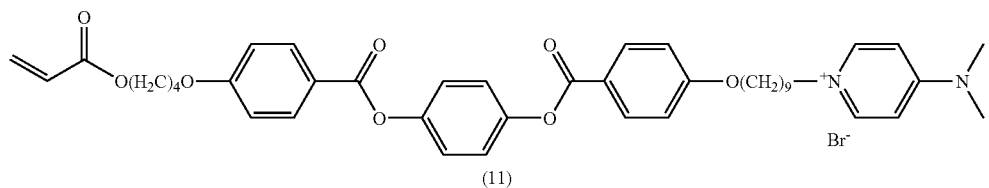
(11)
[Formula 27]
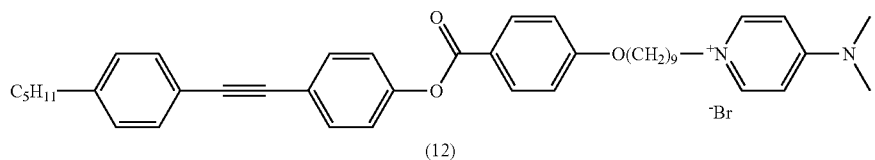
(12)
[Formula 28]
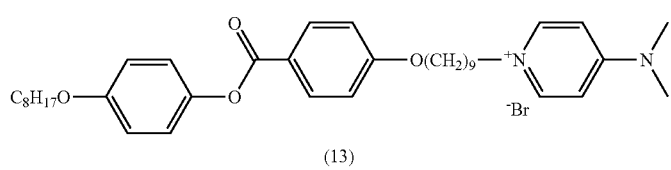
(13)

-continued
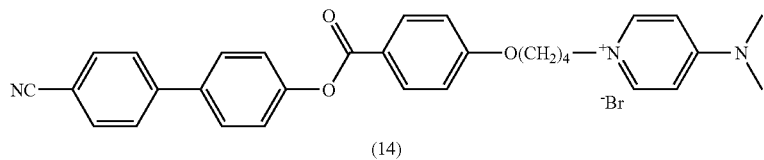
(14)
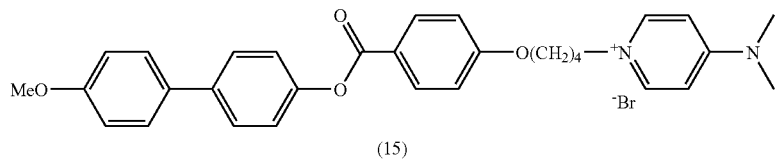
(15)
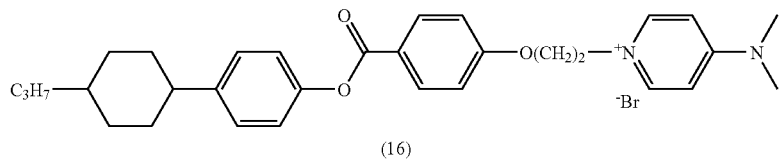
(16)
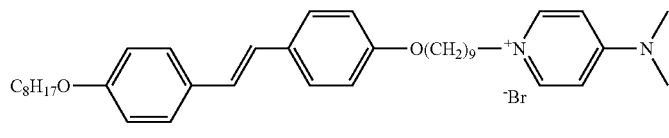
(17)
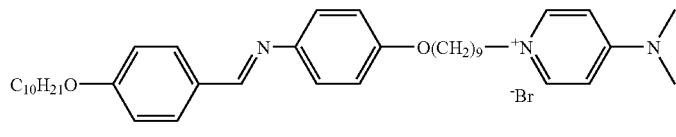
(18)
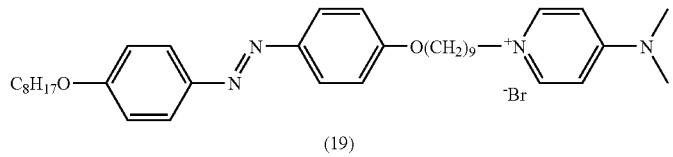
(19)
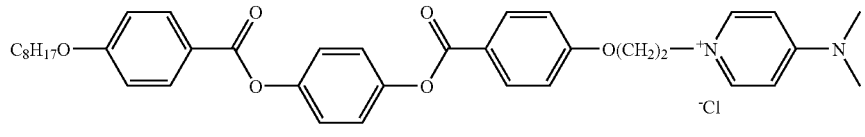
(20)
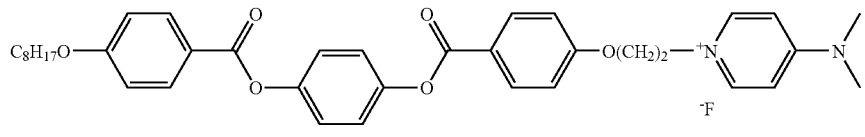
(21)
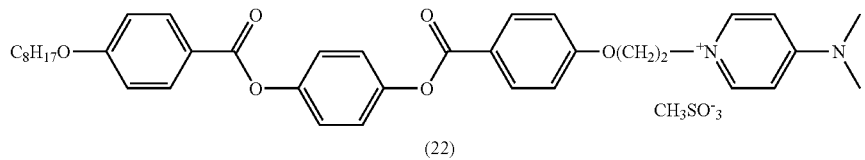
(22)

-continued
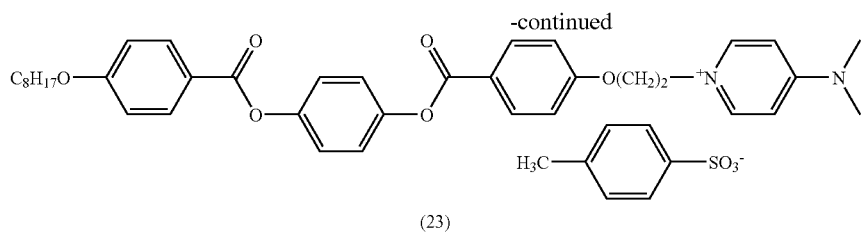
(23)
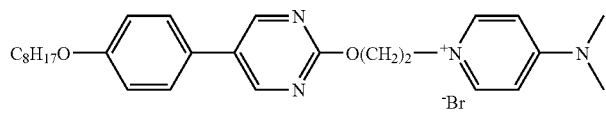
(24)
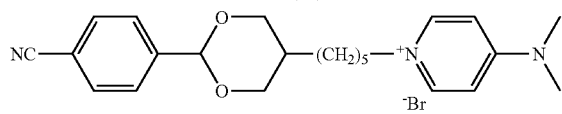
(25)
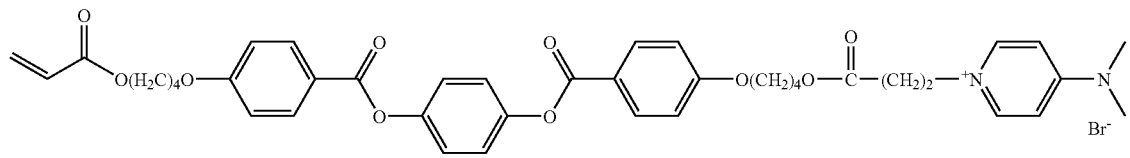
(26)
[Formula 36]
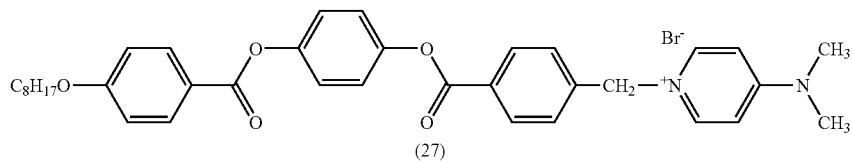
(27)
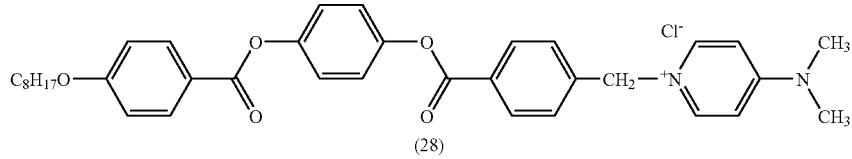
(28)
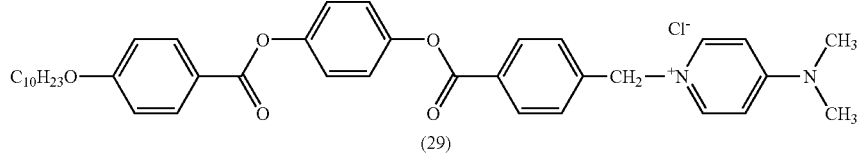
(29)
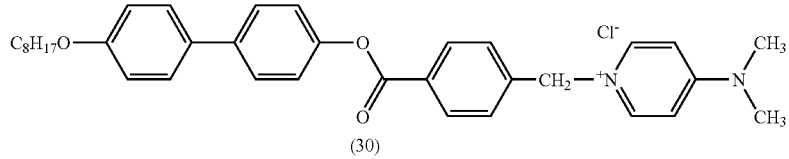
(30)
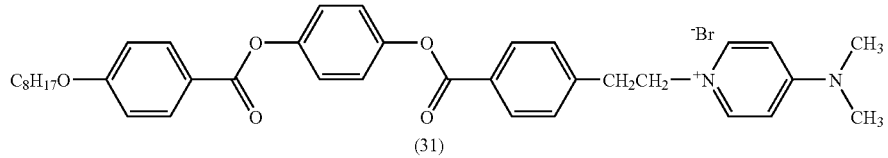
(31)
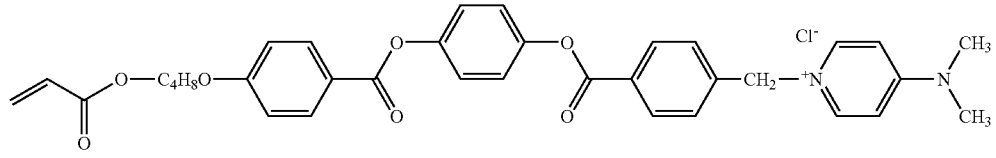
(32)

-continued
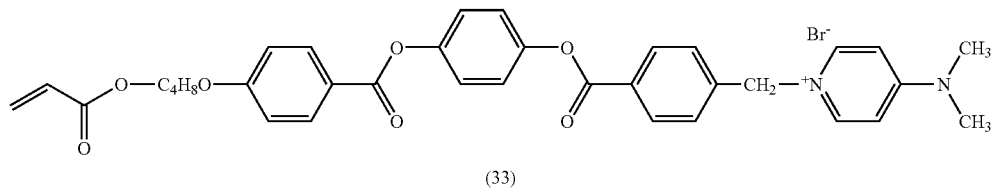
(33)
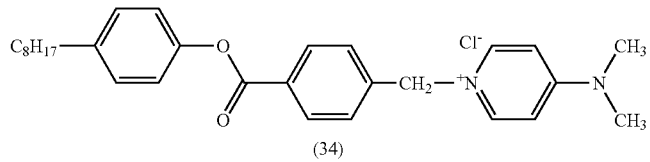
(34)
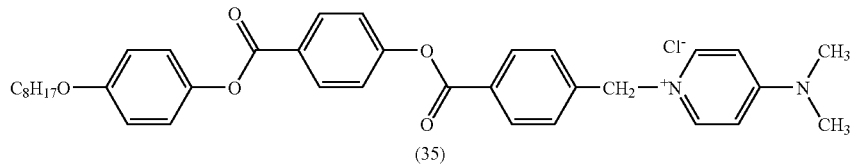
(35)
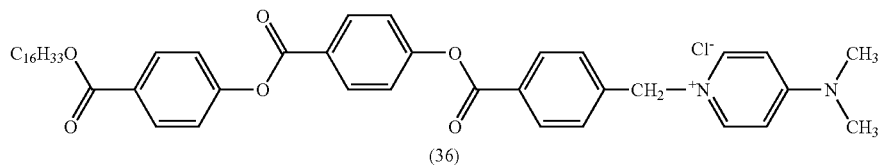
(36)
[Formula 37]
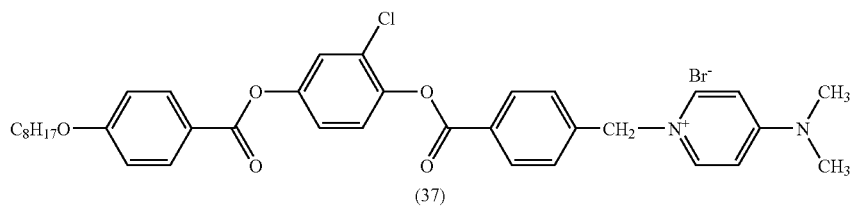
(37)
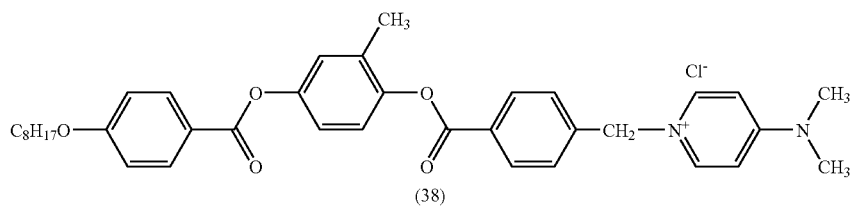
(38)
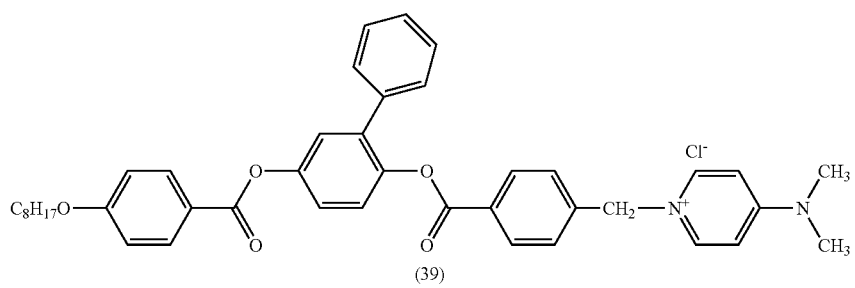
(39)
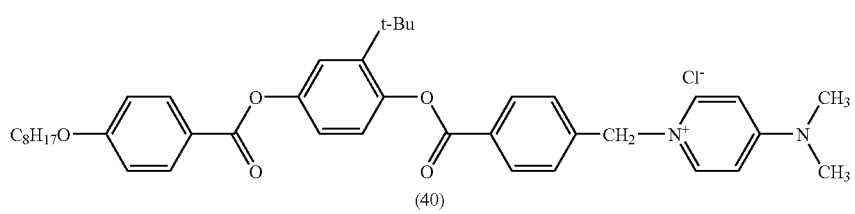
(40)

-continued
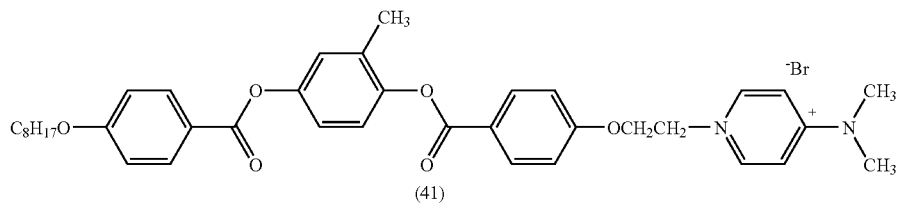
(41)
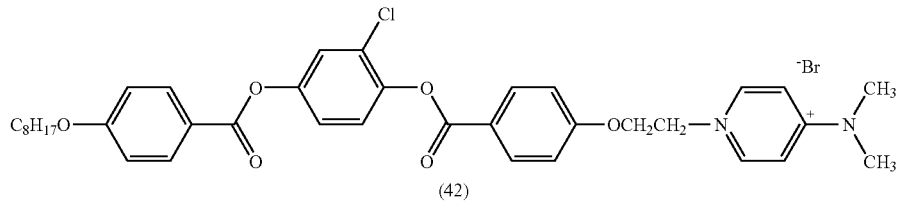
(42)
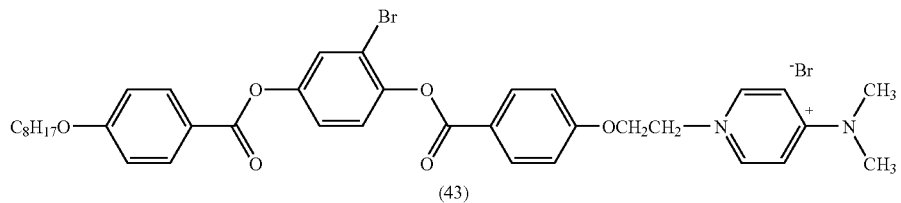
(43)
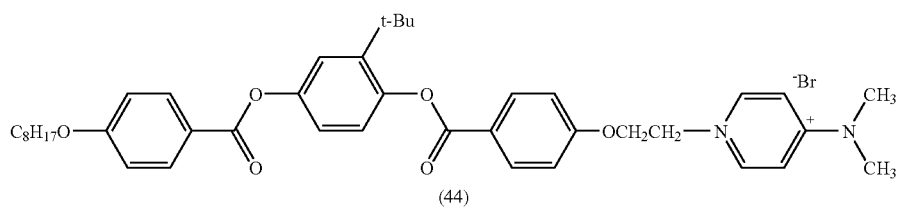
(44)
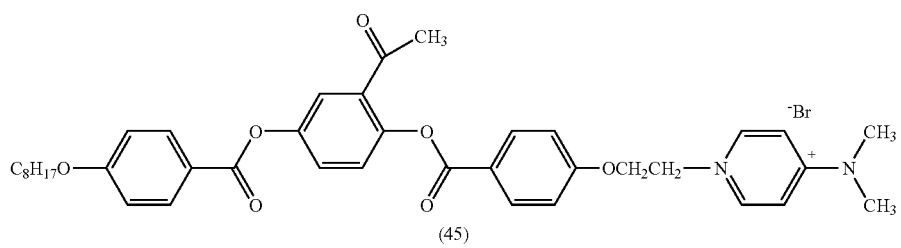
(45)
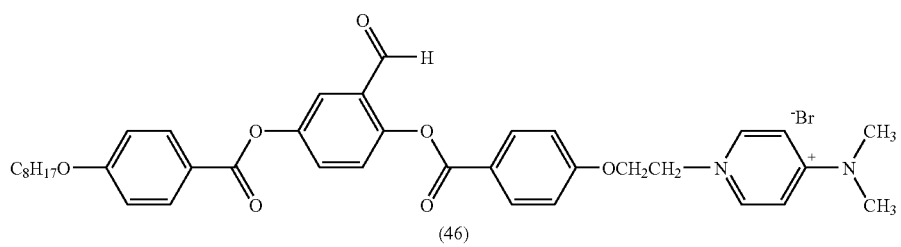
(46)
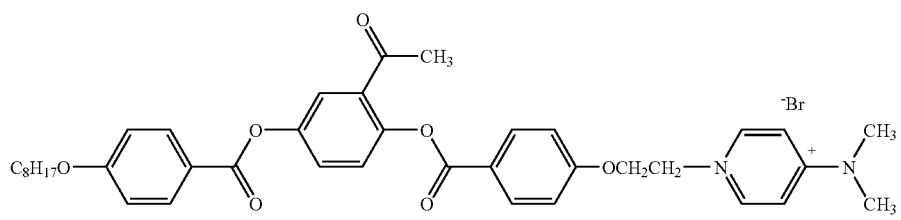
(47)
[Formula 38]

-continued
[Formula 39]
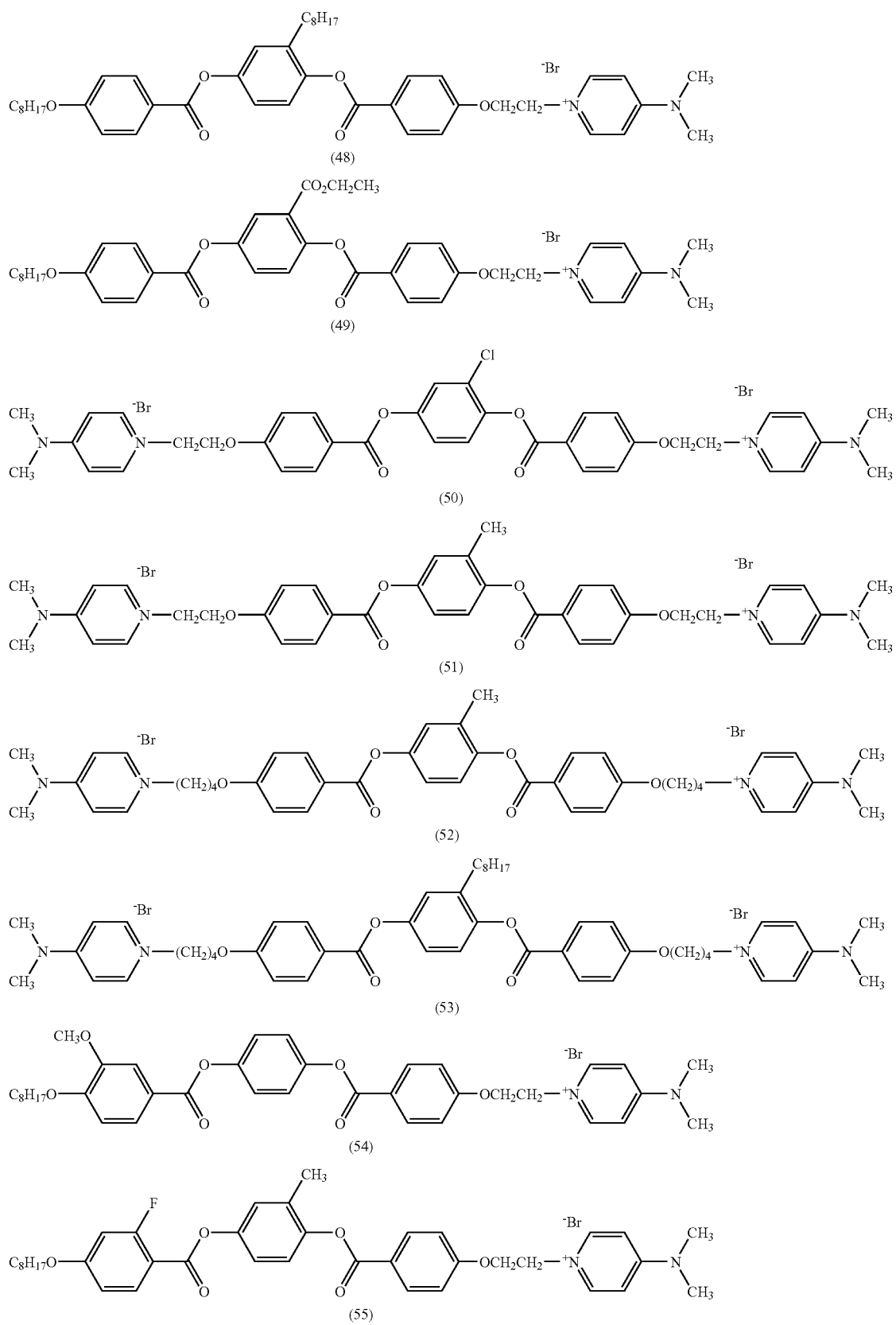

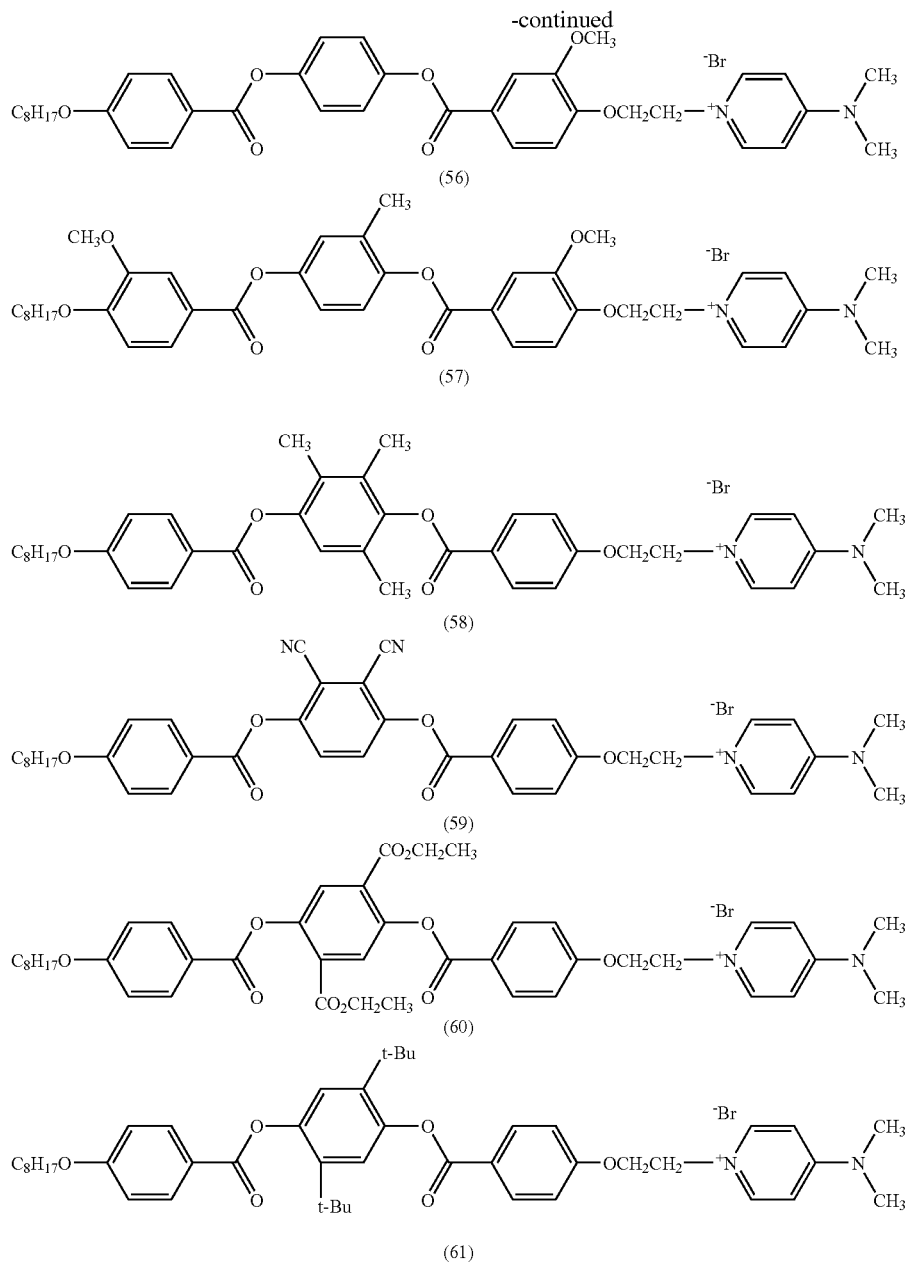

The pyridinium derivatives may be prepared by alkylation (Menshutkin reaction) of pyridine rings.

The preferred range of the amount of the onium salt in the composition of the present invention may vary with the types of the onium salts, and, generally, the amount of the onium salt is desirably from 0.01 to 10 mass %, more desirably from 0.05 to 7 mass %, and much more desirably from 0.05 to 5 mass % with respect to the total mass of the composition (when the composition is a solution, the solvent is excluded). Two or more types of onium salts may be used, and, in such a case, the total amount of plural types of onium salts desirably falls within the above range.

《Rod-Like Liquid Crystal Compound》

The composition of the present invention comprises at least one rod-like liquid crystalline compound. The rod-like crystalline compound exhibits a positive birefringence. The rod-like crystalline molecules are not required to exhibit liquid crystallinity when they are fixed in an alignment state in an optically anisotropic layer. Preferred examples of the rod-like liquid crystal compound, which can be used in the retardation layer, include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include liquid-crystal polymers. The rod-like compound may be selected from low-molecular or high molecular weight compounds. The liquid crystalline compounds having a moiety capable of polymerization or crosslinking reaction induced by irradiation of active light ray, electron ray or heat are desirably used. The number of the moiety in a liquid-crystalline molecule is desirably from 1 to 6, and more desirably from 1 to 3. Rod-like crystalline compounds having a polymerizable group for being fixed in an alignment state are desirably used in the present invention. Examples of the polymerizable group include radical polymerizable unsaturated group and cation polymerizable group. In particular, the polymerizable groups or polymerizable liquid crystalline compounds described in paragraphs [0064] to [0086] of TOKKAI No. 2002-62427.

《Additive for Vertical Alignment at Air Interface》

The composition of the present invention comprises at least one additive capable of promoting molecules of the rod-like crystalline compound at an air-interface, hereinafter occasionally referred to as "air-interface vertical alignment promoter". Generally, rod-like liquid crystalline molecules tend to be tilted at an air-interface, and in order to be vertically aligned uniformly, rod-like liquid crystalline molecules are should be controlled to be aligned vertically at air-interface. It is preferred to add a compound, capable of locating at an air interface and giving volume-excluding effect, an electrostatic effect or the like on the rod-like liquid crystalline molecules so as to align them vertically, to the composition.

Examples of the air-interface vertical alignment promoter include compounds described in TOKKAI No. 2002-20363 and No. 2002-129162. And the factors described in paragraphs of 0072 to 0075 in TOKKAI No. 2004-53981, paragraphs of 0071 to 0078 in TOKKAI No. 2004-4688, paragraphs of 0052 to 0054, 0065 to 0066 and 0092 to 0094 in TOKKAI No. 2004-139015 can be applied to the present invention. And examples of the air-interface vertical alignment promoter include Compound Nos. B-1 to B-33 and Compound Nos. C-1 to C-45.

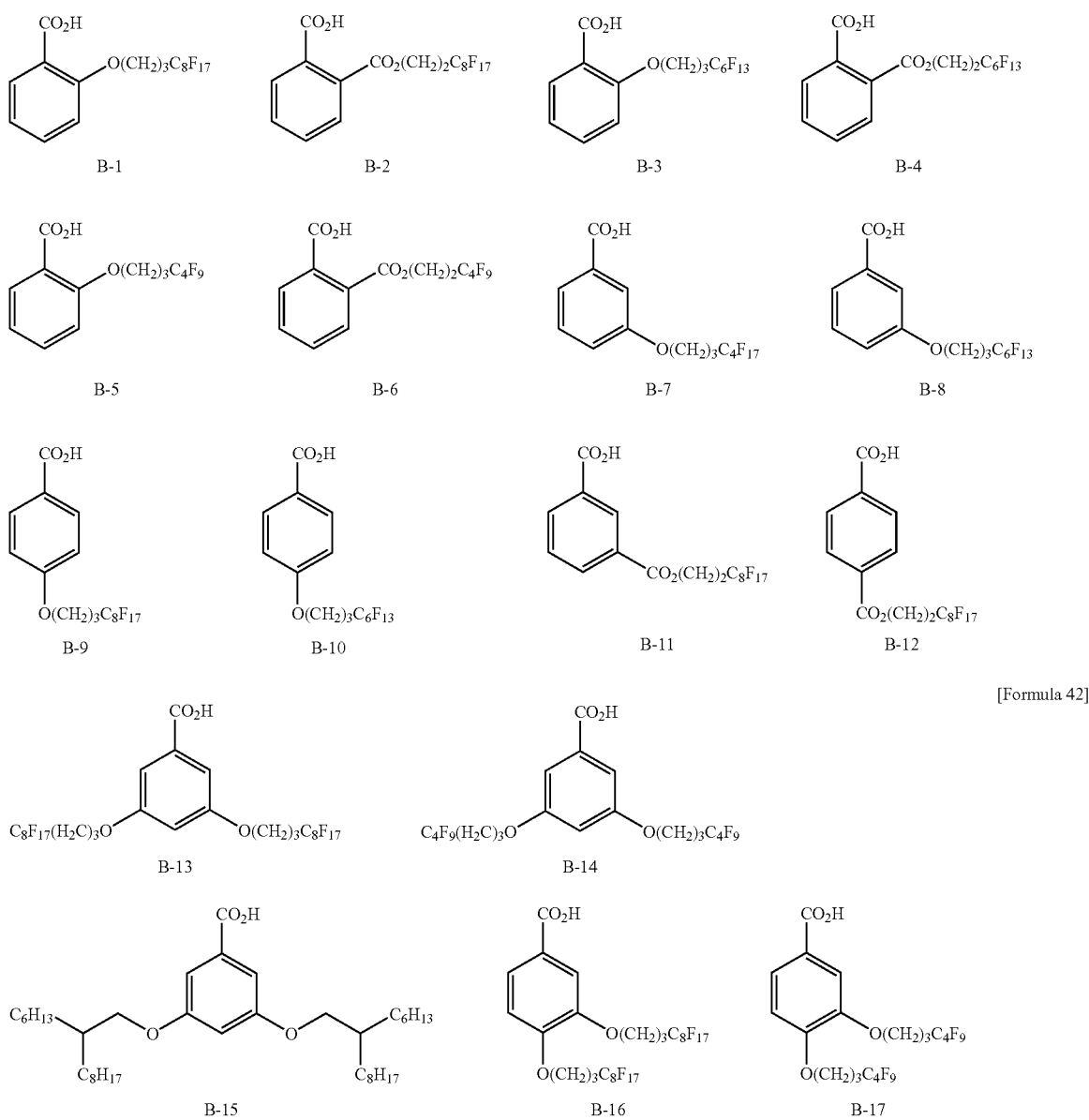

-continued
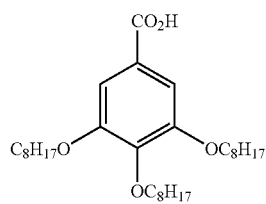
B-18
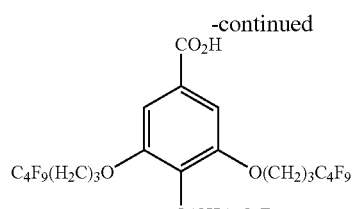
B-19
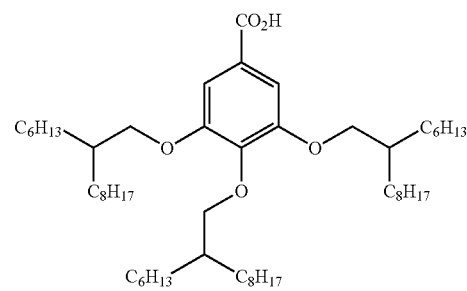
B-20
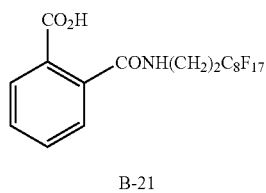
B-21
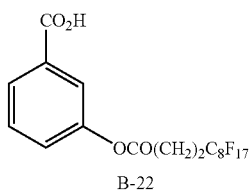
B-22
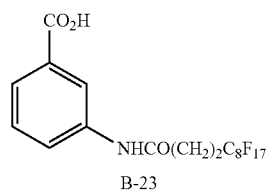
B-23
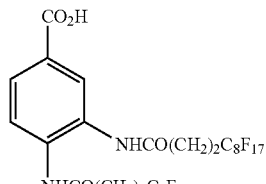
B-24
[Formula 43]
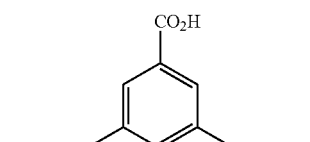
B-25
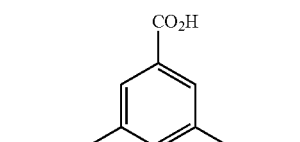
B-26
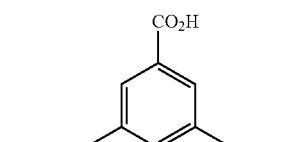
B-27
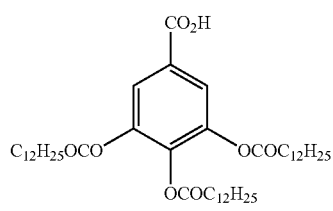
B-28
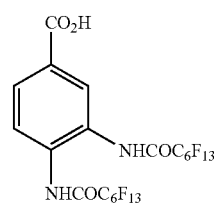
B-29
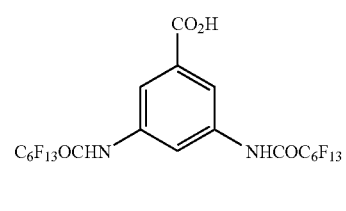
B-30
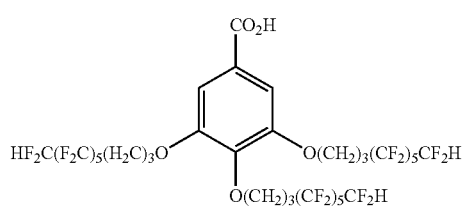
B-31
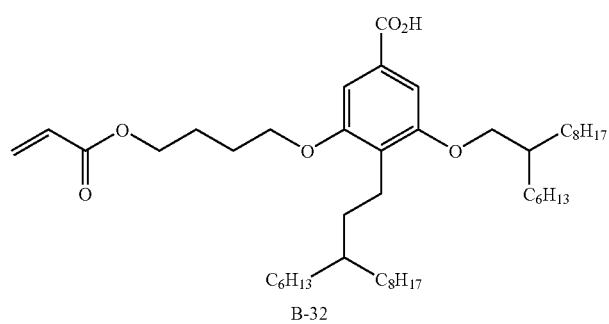
B-32

-continued
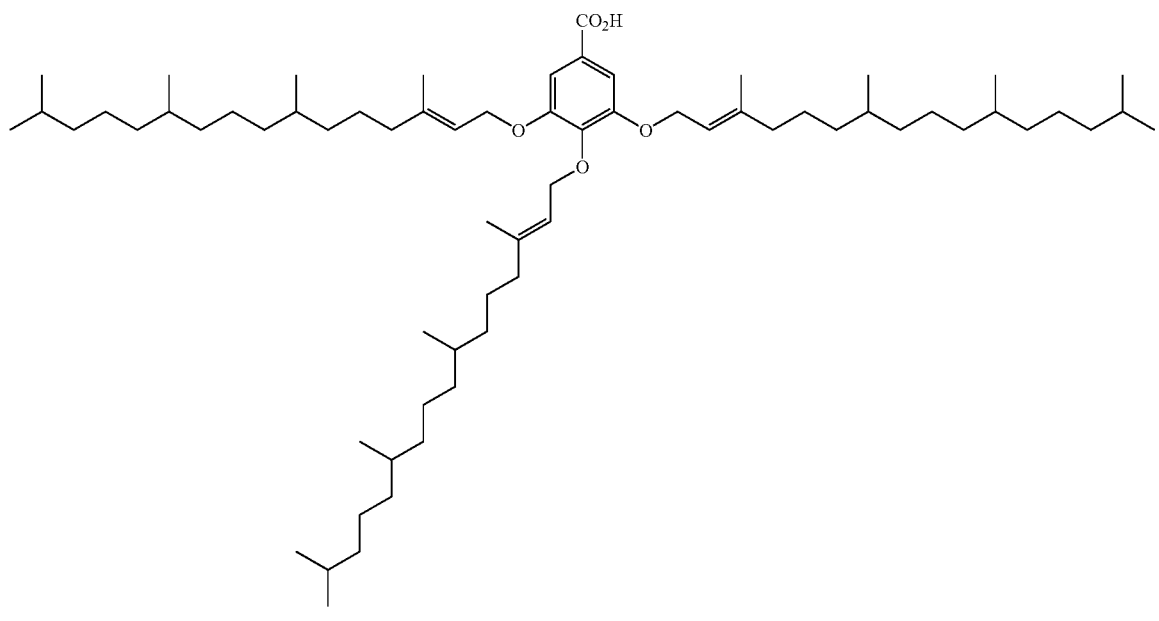
B-33
[Formula 44]
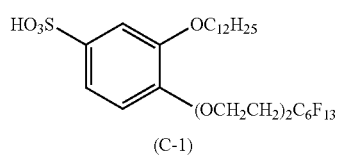 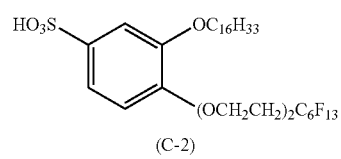 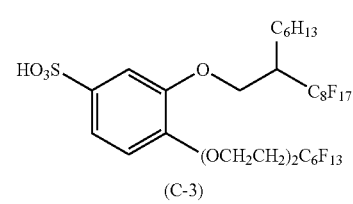
(C-1) (C-2) (C-3)
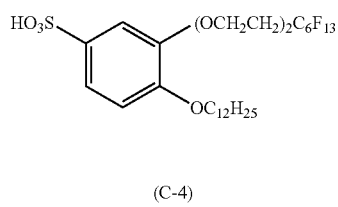 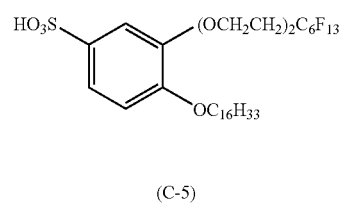 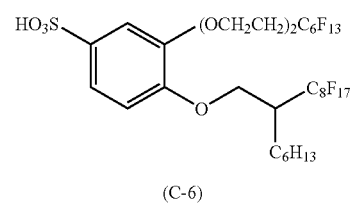
(C-4) (C-5) (C-6)
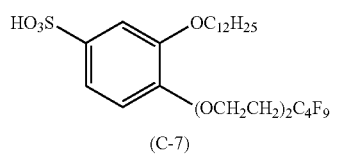 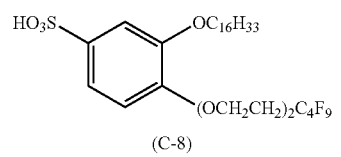 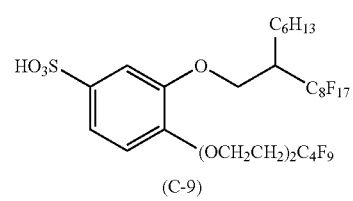
(C-7) (C-8) (C-9)
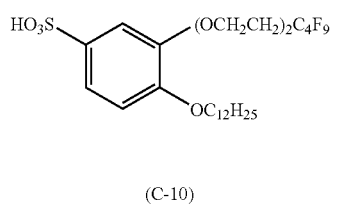 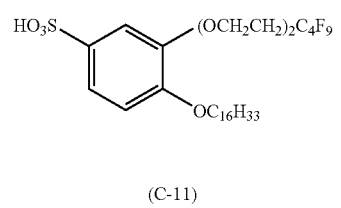 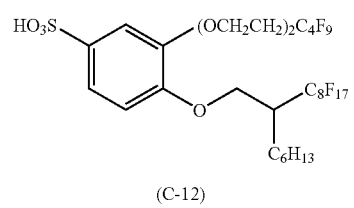
(C-10) (C-11) (C-12)
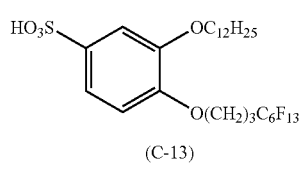 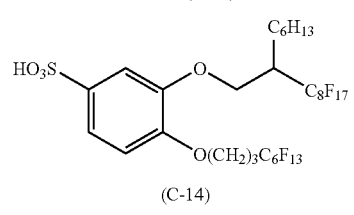 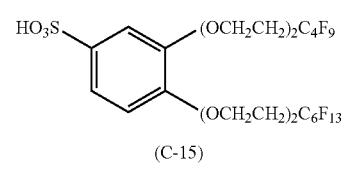
(C-13) (C-14) (C-15)

-continued

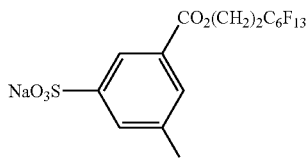
(C-42)

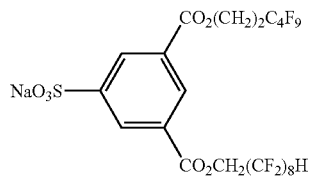
(C-43)

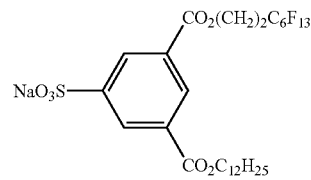
(C-44)

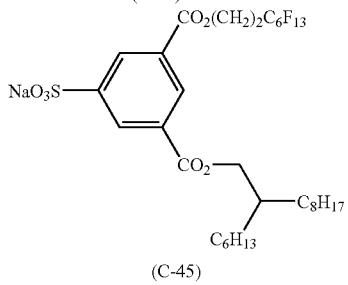
(C-45)

The air-interface vertical alignment promoter is desirably selected from compounds having a fluoroaliphatic group and at least one hydrophilic group selected from the group consisting of a carboxyl group (—COOH), a sulfo group (—SO$_3$H), a sulfate group (—OSO$_3$H), a phosphonoxy group {—OP(=O)(OH)$_2$}, and salts thereof. Such compounds contribute to increasing tilt angles of directors of rod-like liquid crystalline molecules at an air-interface and to improving coating property of the composition and, thus, to reduction of unevenness. The compound having at least one fluoro-aliphatic group and at least one hydrophilic group may be selected from low-molecular weight or high molecular weight compounds. The compound may have a polymerizable group, and in such a case, the compound also contributes to fixing the rod-like molecules in an alignment state.

The air-interface vertical alignment promoter is desirably selected from polymers having at least one fluoroaliphatic group and at least one hydrophilic group, hereinafter occasionally referred to as "fluoro-polymer", or the compounds represented by the formula (2).

First, the fluoro-polymer, which can be used in the present invention, will be described in detail.

《Fluoro-Polymer》

The composition of the present invention may comprise a fluoro-polymer having a fluoroaliphatic group and at least one hydrophilic group selected from the group consisting of a carboxyl group (—COOH), a sulfo group (—SO$_3$H), a sulfate group (—OSO$_3$H), a phosphonoxy group {—OP(=O)(OH)$_2$}, and salts thereof, as an air-interface vertical alignment promoter. Various polymer types are described on pages 1 to 4 in "Revision Chemistry of Polymer Synthesis (Kaitei Porimar Gousei no Kagaku)" written by OHTSU TAKAYUKI and published by Kagaku-Dojin Publishing Company, Inc in 1968, and the fluoro-polymer may be selected the described polymer types such as polyolefins, polyesters, polyamides, polyimides, polyurethanes, polycarbonates, polysulfones, polyethers, polyacetals, polyketones, polyphenylene-oxides, polyphenylene-sulfides, polyarylates, PTFEs, polyvinylidene-fluorides or cellulose derivatives. The fluoro-polymer is desirably selected from polyolefins.

The fluoro-polymer to be employed in the present invention has a fluoro-aliphatic group in side chain. The carbon number of the fluoro-aliphatic group is desirably from 1 to 12 and more desirably from 6 to 10. The aliphatic group may have a chain or cyclic structure, and the chain structure may be linear or branched. Among those, linear C$_{6-10}$ fluoro-aliphatic groups are preferred. The fluorine-substitution degree of the fluoro-aliphatic group is desirably decided, however not to be limited to, such that not less than 50%, more desirably not less than 60%, of all carbon atoms in the corresponding aliphatic group are replaced with fluorine atoms. The fluoro-aliphatic group in side chain may bind to a main chain through a linking group such as an ester linkage, amide linkage, imido linkage, urethane linkage, urea linkage, ether linkage, thioether linkage or aromatic ring. The fluoro-aliphatic group may be derived from a fluoro aliphatic compound prepared by a telomerization method, occasionally referred to as telomer method, or an oligomemerization, occasionally referred to as oligomer method. Examples of preparation of the fluoride-aliphatic compound are described on pages 117 to 118 in "Synthesis and Function of Fluoride Compounds (Fussokagoubutsu no Gousei to Kinou)" overseen by ISHIKAWA NOBUO and published by CMC Publishing Co., Ltd in 1987; and on pages 747 to 752 in "Chemistry of Organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen.

One example is shown in Scheme-I:

[Formula 47]

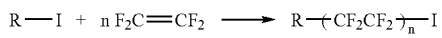

The obtained fluorine-terminated telomers are usually terminal-modified properly as shown in Scheme 2, to give fluoro aliphatic compounds. These compounds are, if necessary, transferred to a desired monomer structure, and then used for preparing fluoro-aliphatic containing polymers.

[Formula 48]
Scheme 2
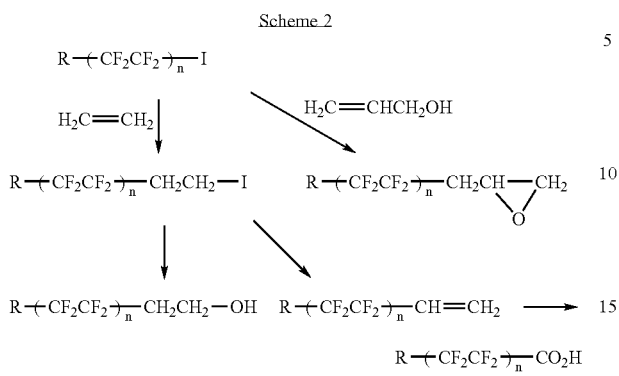
Examples of the fluoro-monomer which can be used for preparing the fluoro-polymer to be employed in the present invention include, however not to be limited to, compounds shown below.
[Formula 49]
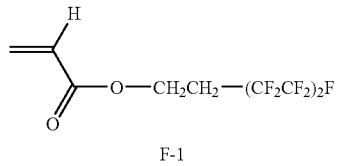
F-1
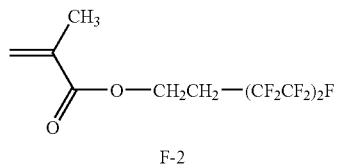
F-2
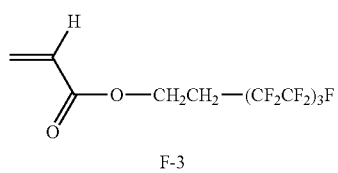
F-3
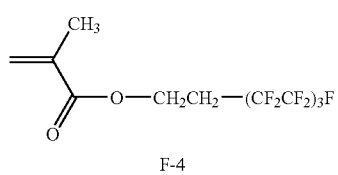
F-4
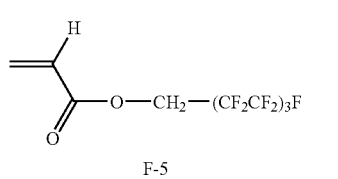
F-5
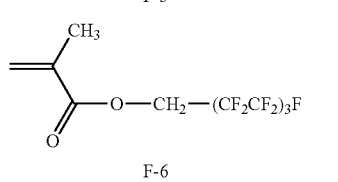
F-6
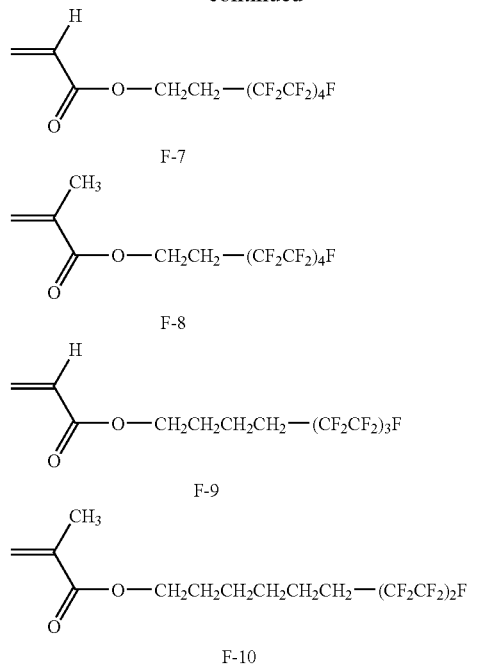
F-7
F-8
F-9
F-10
[Formula 50]
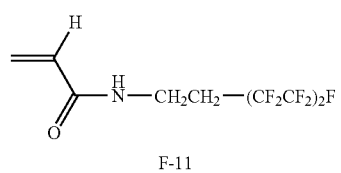
F-11
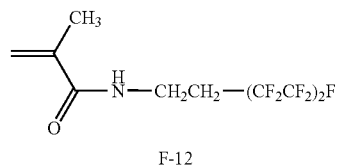
F-12
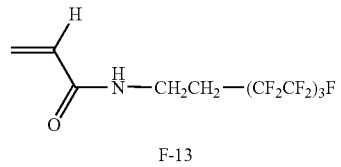
F-13
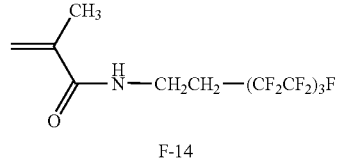
F-14
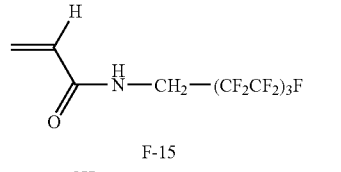
F-15
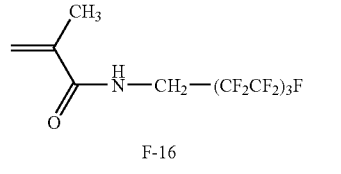
F-16

-continued
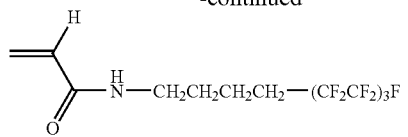
F-17
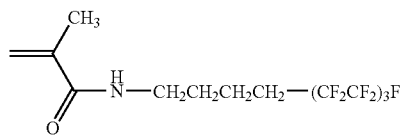
F-18
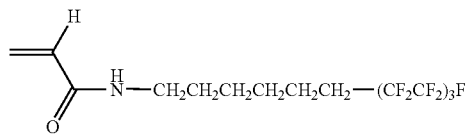
F-19
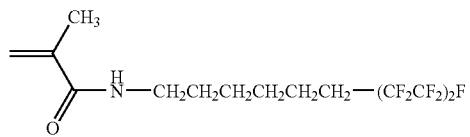
F-20
[Formula 51]
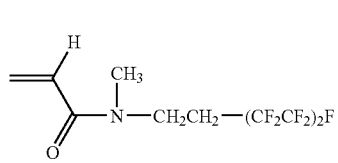
F-21
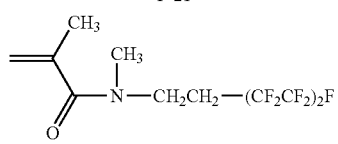
F-22
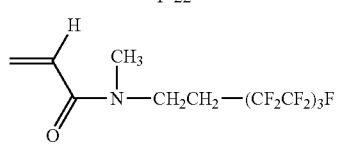
F-23
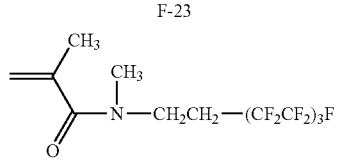
F-24
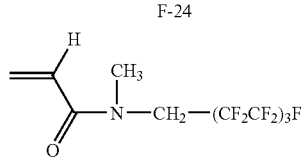
F-25
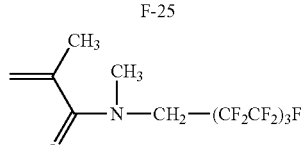
F-26
-continued
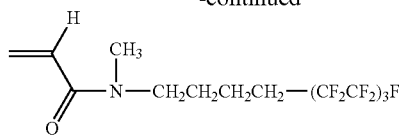
F-27
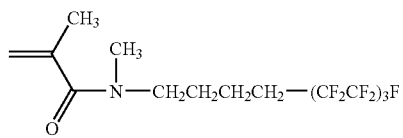
F-28
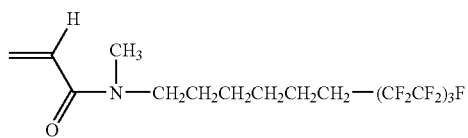
F-29
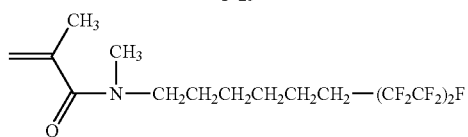
F-30
[Formula 52]
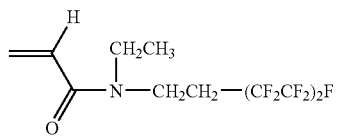
F-31
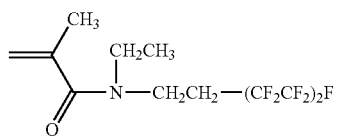
F-32
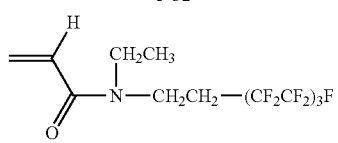
F-33
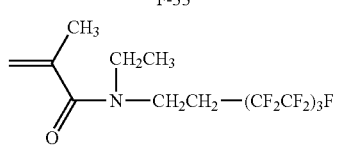
F-34
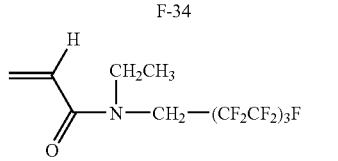
F-35
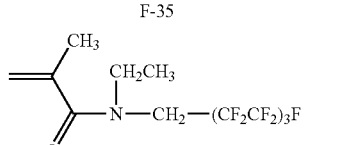
F-36

-continued
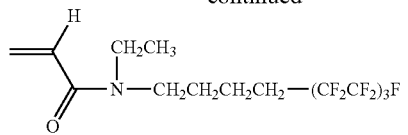
F37
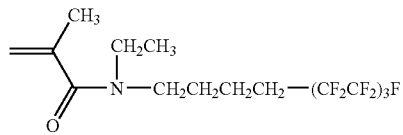
F38
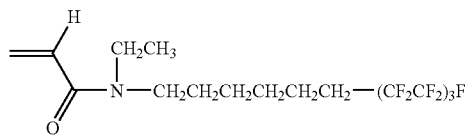
F-39
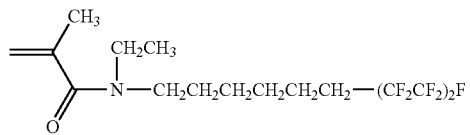
F-40
[Formula 53]
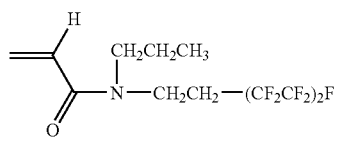
F-41
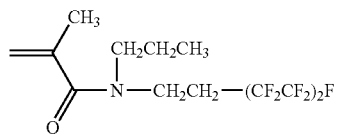
F-42
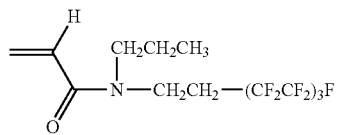
F-43
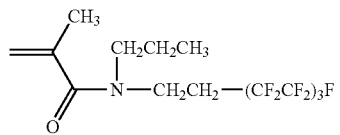
F-44
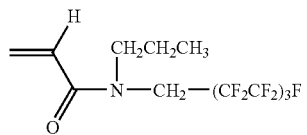
F-45
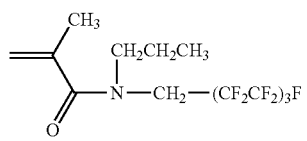
F-46
-continued
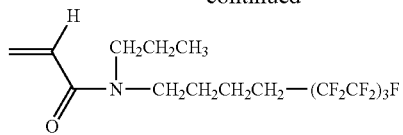
F-47
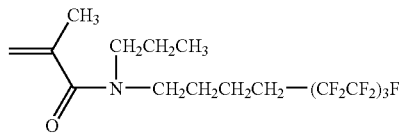
F-48
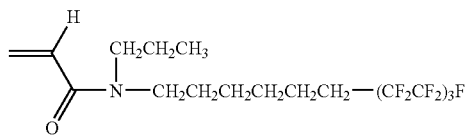
F-49
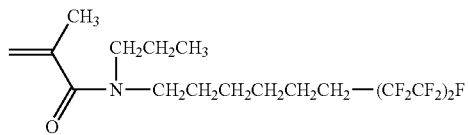
F-50
[Formula 54]
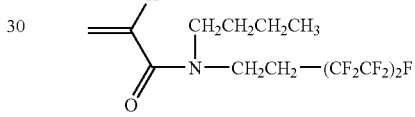
F-51
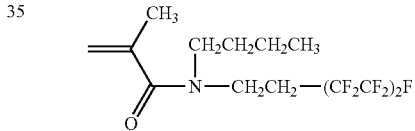
F-52
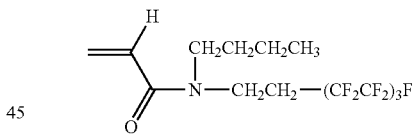
F-53
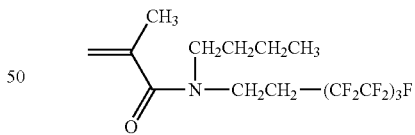
F-54
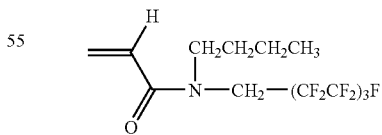
F-55
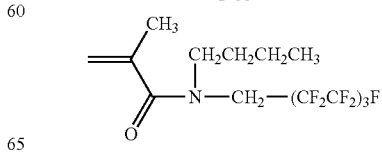
F-56

-continued

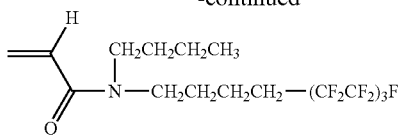

F-57

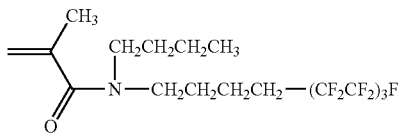

F-58

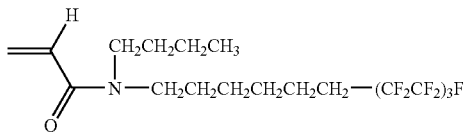

F-59

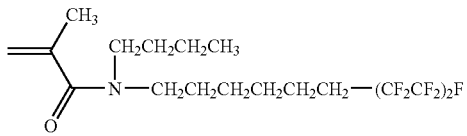

F-60

[Formula 55]

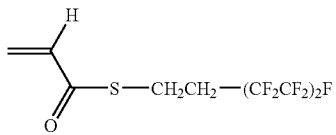

F-61

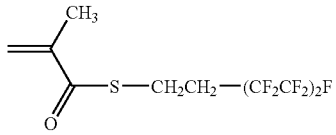

F-62

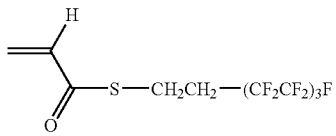

F-63

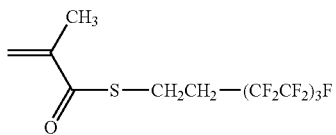

F-64

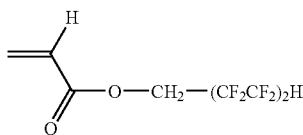

F-65

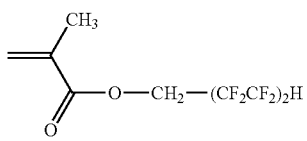

F-66

-continued

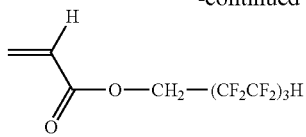

F-67

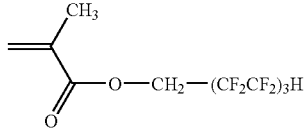

F-68

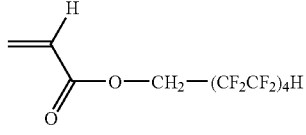

F-69

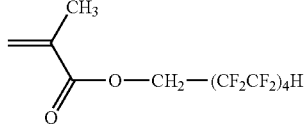

F-70

One example of the fluoro-polymer which can be employed in the present invention is selected from copolymers comprising a repeating unit derived from a monomer having a fluoro-aliphatic group and a repeating unit, having a hydrophilic group, represented by a formula (1).

[Formula 56]

Formula (1)

In the formula (1), $R^1$, $R^2$ and $R^3$ respectively represent a hydrogen atom or a substituent. Q is a carboxyl group (—COOH) or a salt thereof, a sulfo group (—SO$_3$H) or a salt thereof, a sulfate group (—OSO$_3$H) or a salt thereof, or a phoshonoxy group {—OP(=O)(OH)$_2$} or a salt thereof. L is a linking group selected from Linking Group I shown below or a divalent group consisting of two or more selected from Linking Group I shown below:

(Linking Group I)

a single bond, —O—, —CO—, —NR$^4$— (R$^4$ is a hydrogen atom, an alkyl group, an aryl group or an aralkyl group), —S—, —SO$_2$—, —P(=O)(OR$^5$)—(R$^5$ is an alkyl group, an aryl group or aralkyl group), an alkylene group and arylene group.

In the formula (1), $R^1$, $R^2$ and $R_3$ respectively represent a hydrogen atom or a substituent selected from Substituent Group Y shown below:

(Substituent Group Y)

an alkyl group (desirably C$_{1-20}$, more desirably C$_{1-12}$ and much more desirably C$_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino;

an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl;

an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl. These substituents may be substituted by at least one substitutent selected from these. When two substituents are selected, they may be same or different each other. Two or more may, if possible, bond each other to form a ring.

It is preferred that $R^1$, $R^2$ and $R^3$ respectively represent a hydrogen atom, an alkyl group, a halogen atom (such as fluorine, chlorine, bromine or iodine) or a group represented by -L-Q described later; more preferred that $R^1$, $R^2$ and $R^3$ respectively represent a hydrogen atom, a $C_{1-6}$ alkyl group, chlorine or a group represented by -L-Q described later; much more preferred that $R^1$, $R^2$ and $R^3$ respectively represent a hydrogen atom or a $C_{1-4}$ alkyl group; further much more preferred that $R^1$, $R^2$ and $R^3$ respectively represent a hydrogen atom or a $C_{1-2}$ alkyl group; and most preferred that $R^2$ and $R^3$ are hydrogen and $R^1$ is hydrogen or methyl. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulfonyl group and a carboxyl group. It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

L is a divalent linking group selected from the above defined group or any combination of two or more selected from the above identified group. The $R^4$ in —$NR^4$— described above represents a hydrogen atom, an alkyl group, an aryl group or an aralkyl group, and desirably a hydrogen atom or an alkyl group. And the $R^5$ in —$PO(OR^5)$— represents an alkyl group, an aryl group or an aralkyl group, and desirably an alkyl group. When $R^4$ or $R^5$ is an alkyl group, an aryl group or an aralkyl group, the desired carbon numbers of them are same as those described in Substituent Group Y. L desirably contains a single bond, —O—, —CO—, —$NR^4$—, —S—, —$SO_2$—, an alkylene group or arylene group; more desirably contains a single bond, —CO—, —O—, —$NR^4$—, an alkylene group or an arylene group; and much more desirably represents a single bond. When L contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetrabutylene and hexamethylene. When L contains an arylene group, the carbon atom number of the arylene group is desirably from 6 to 24, more desirably from 6 to 18 and much more desirably from 6 to 12. Preferred examples of the arylene group include phenylene and naphthalene. When L contains a divalent linking group consisting of a combination of an alkylene group and an arylene group, or in other words an aralkyl group, the carbon atom number in the aralkyl group is desirably from 7 to 34, more desirably from 7 to 26 and much more desirably from 7 to 16. Preferred examples of the aralkyl group include phenylene methylene, phenylene ethylene and methylene phenylene. L may have any substituent. Examples of the substituent are same as those exemplified for the substituent of $R^1$, $R^2$ or $R^3$.

Examples of L include, however not to be limited to, those shown below.

[Formula 57]

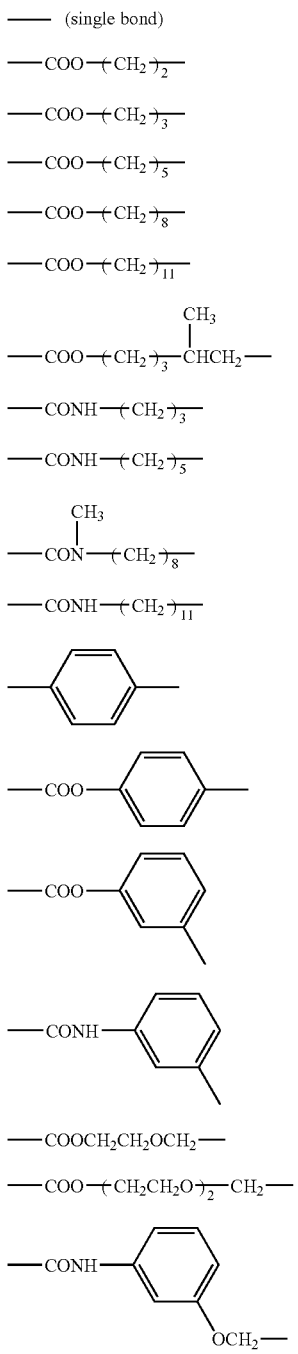

[Formula 58]

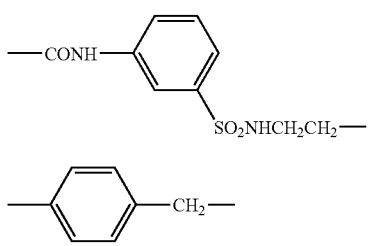

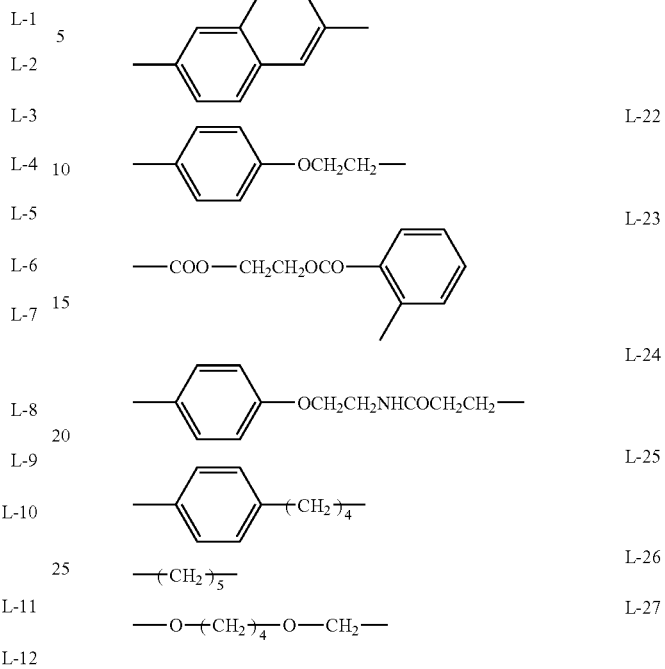

L-1 to L-27 (labels)

In the formula (1), Q represents a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammonium carboxylate, tetrabutylammonium carboxylate, trimethylbenzylammonium carboxylate or dimethylphanylammonium carboxylate) or pyridinium carboxylate; a sulfo group or a sulfate (examples of a counter cation are same as those exemplified for the carboxylate above); or a phosphonoxy group or a phosphonoxylate (examples of a counter cation are same as those exemplified for the carboxylate above). Q is desirably a carboxyl group, a sulfo group or a phosphonox group, and more desirably a carboxyl group or a sulfo group.

The fluoro-polymer may comprise one repeating unit selected from the formula (1), or plural repeating units selected from the group (1). The fluoro-polymer may further comprise at least one repeating unit other than those described above. The other repeating unit is not limited and is desirably selected from units derived from monomers capable of usual radical polymerization. Examples of the monomer which can give the other repeating unit include, however not to be limited to, those shown below. The fluoro-polymer may comprise one repeating unit or plural repeating units selected from those shown below.

(Monomer Group)

(1) Alkenes:

ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifluoropropylene, tetrafluoroethylene, vinyl chloride, vinylidene chloride or the like;

(2) Dienes:

1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;

(3) α,β-Unsaturated Carboxylic Acid Derivatives:

(3a) Alkyl Acrylates:

methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl Methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanate ethyl methacrylate or the like;

(3c) Diesters of Unsaturated Polycarboxylic Acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of α,β-Unsaturated Carboxylic Acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated Nitriles:

acrylonitrile, methacrylonitrile or the like;

(5) Styrene or Derivatives Thereof:

styrene, vinyltoluene, ethylstyrene, p-tert-butylstyrene, p-vinyl methyl benzoate, α-methyl styrene, p-chloromethyl styrene, vinyl naphthalene, p-methoxy styrene, p-hydroxy methyl styrene, p-acetoxy styrene or the like;

(6) Vinyl Esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other Monomers N-vinyl pyrrolidone, methyl vinyl ketone, phenyl vinyl ketone, methoxy ethyl vinyl ketone, 2-vinyl oxazoline, 2-isopropenyl oxazoline or the like.

The amount of the monomer containing a fluoro aliphatic group is desirably not less than 5 mass %, more desirably not less than 10 mass %, and much more desirably not less than 30 mass % with respect to the total amount of all monomers constituting the fluoro-polymer. The amount of the repeating unit represented by the formula (1) is desirably not less than 0.5 mass %, more desirably from 1 to 20 mass % and much more desirably from 1 to 10 mass % with respect to the total amount of all monomers constituting the fluoro-polymer. The preferred range of the mass percent may easily vary with a molecular weight of a monomer to be used, and thus, the preferred range of a molar number of a function group per unit weight may more properly define a preferred range of an amount of the repeating unit represented by the formula (1). Using the molar number, the preferred amount of a hydrophilic group (Q in the formula (1)) contained in the fluoro-polymer is from 0.1 μmol/g to 10 mmol/g and the more preferred amount is from 0.2 mmol/g to 8 mmol/g.

The weight-average molecular weight (Mw) of the fluoro-polymer to be used in the present invention is desirably not greater than 1,000,000, more desirably not greater than 500,000, much more desirably not greater than 100,000 and mot desirably not less than 2,000 and not greater than 50,000. The Mw can be measured as a polystyrene (PS) equivalent molecular weight with gel permeation chromatography (GPC).

Examples of the method for producing the fluoro-polymer include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoro-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 minutes to 30 hours. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoro-polymers having a proper molecular weight. Examples of the chain transfer agent include mercaptans such as octyl mercaptan, decyl mercaptan, dodecyl mercaptan, tert-dodecyl mercaptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as α-methyl styrene or α-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

As described above, in order to fix alignments of molecules liquid-crystal compounds, especially discotic liquid-crystal compounds, the fluoro-polymer desirably has a polymerizable group as a substituent.

Examples of the fluoro-polymer which can be used desirably in the present invention include, however not to be limited to, those shown below. Numerical values in formulae shown below mean mass % of each monomer, and Mw in formulae shown below mean PS-equivalent weight-average molecular weight measured by GPC. In the formulae, "a", "b", "c", "d" and the like mean weight ratios.

[Formula 59]

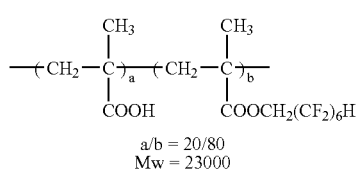
P-1

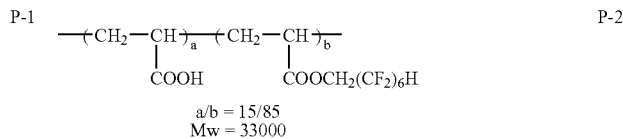
P-2

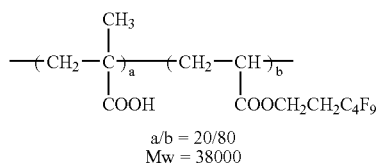
P-3

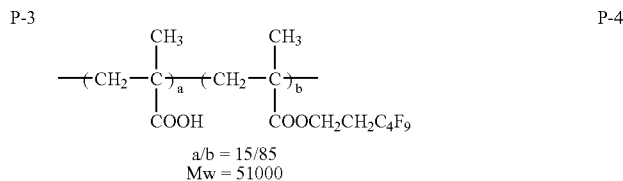
P-4

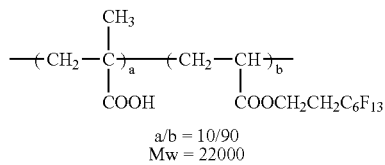
P-5

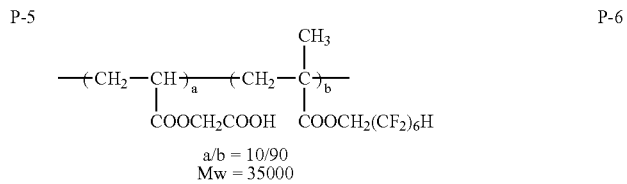
P-6

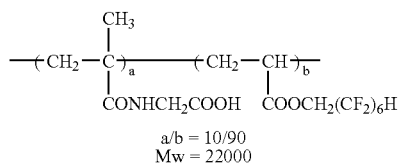
P-7

-continued
[Formula 60]
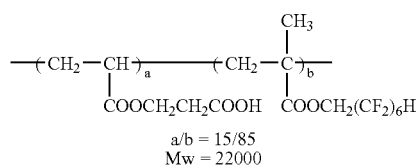
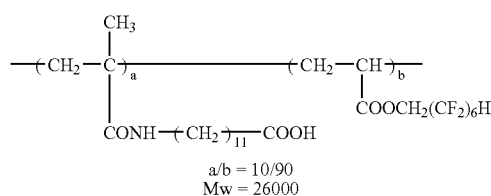
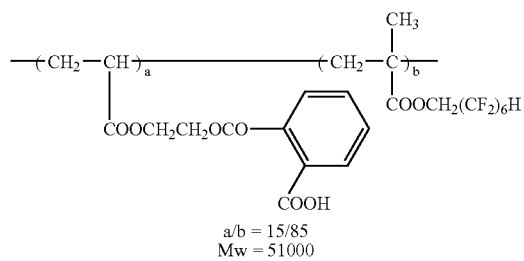
[Formula 61]
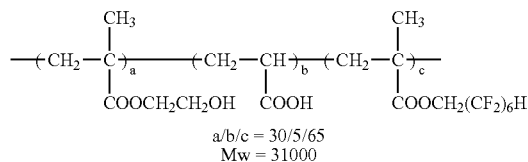
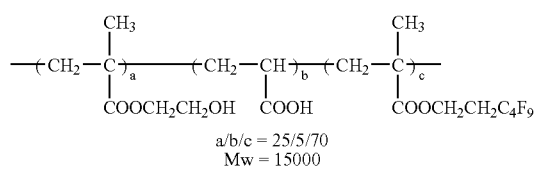
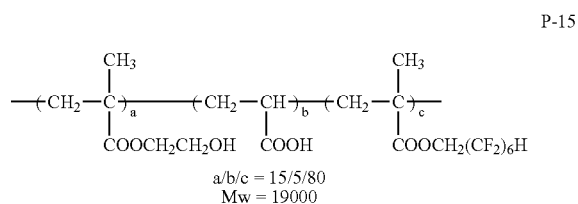
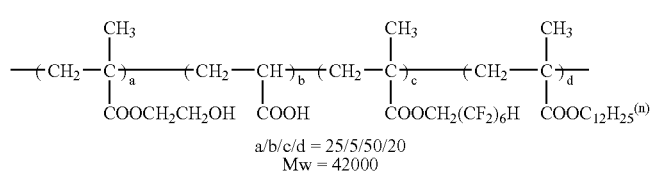
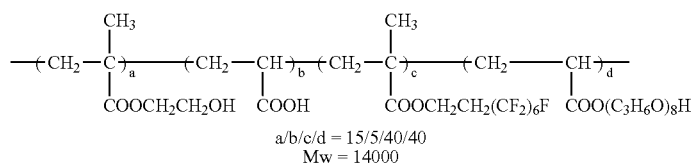
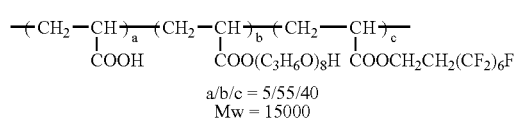

[Formula 62]

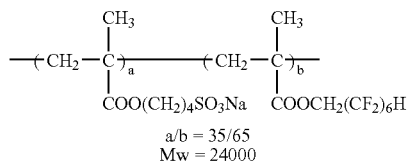

P-20

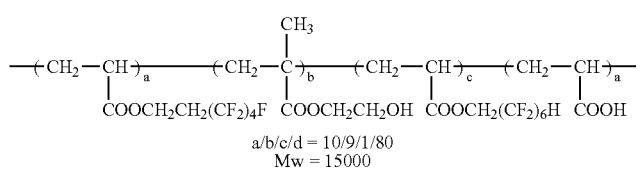

P-21

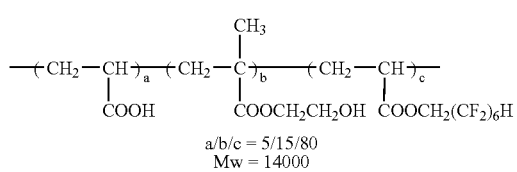

P-22

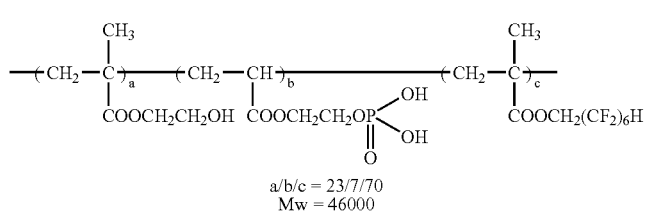

P-23

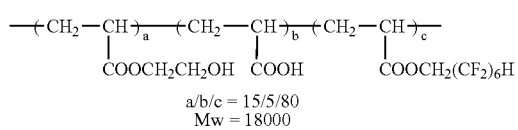

P-24

[Formula 63]

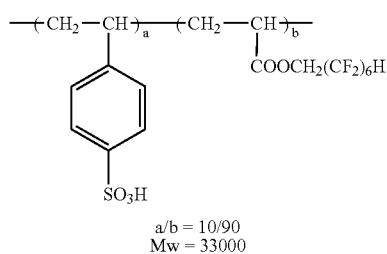

P-25

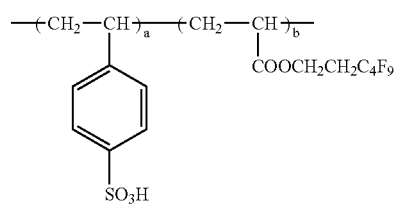

P-26

The preferred amount of the fluoro-polymer in the composition may vary with its application, when the composition is used for production of an optically anisotropic layer, the amount of the fluoro-polymer is desirably from 0.005 to 8 mass %, more desirably from 0.01 to 5 mass % and much more desirably from 0.05 to 1 mass % with respect to the total mass of the composition (when the composition is a solution, the solvent is excluded). When the amount of the fluoro-polymer falls within the above scope, substantial effects may be obtained without lowering a drying property of the coating layer, and, thus, an optical film having uniform optical properties such as retardation.

Next, the fluoride-compound represented by the formula (2) will be described in detail.

《Fluoride-compound Represented by Formula (2)》

$$(R^0)_m\text{-}L^1\text{-}(W)_n \qquad \text{Formula (2)}$$

wherein $R^0$ denotes an alkyl group, an alkyl group having a terminal $CF_3$ group, or an alkyl group having a terminal $CHF_2$ group; m denotes an integer greater than or equal to 1, where multiple occurrences of $R^0$ may be identical or different, with at least one denoting an alkyl group having a terminal $CF_3$ group or a terminal $CHF_2$ group; $L^0$ denotes a linking group of valence (m+n); W denotes a carboxyl group (—COOH) or a salt thereof, a sulfo group (—SO$_3$H) or a salt thereof, a sulfate group (—OSO$_3$H) or a salt thereof, or a phosphonoxy group {—OP(=O)(OH)$_2$} or a salt thereof; and n denotes an integer greater than or equal to 1.

In the formula (2), R$^0$ functions as the hydrophobic group. The alkyl group denoted by R$^0$ is optionally substituted, may have a straight chain or branching chain, desirably has from 1 to 20 carbon atoms, preferably has from 4 to 16 carbon atoms, and more preferably has from 6 to 16 carbon atoms. Any of the substituents given as examples for substituent selected from the Substituent Group D further below may be employed as substituents therein.

The alkyl group having a terminal CF$_3$ group denoted by R$^0$ desirably has from 1 to 20 carbon atoms, preferably from 4 to 16 carbon atoms, and more preferably from 4 to 8 carbon atoms. The alkyl group having a terminal CF$_3$ group is an alkyl group in which part or all of the hydrogen atoms have been substituted with fluorine atoms. At least 50 percent of the hydrogen atoms in the alkyl group are desirably substituted with fluorine atoms, with at least 60 percent substitution being preferred and at least 70 percent substitution being of even greater preference. The remaining hydrogen atoms may be further substituted with the substituents given as examples of substituent selected from the Substituent Group D further below. The alkyl group having a terminal CHF$_2$ group denoted by R$^0$ desirably has from 1 to 20 carbon atoms, preferably from 4 to 16 carbon atoms, and more preferably from 4 to 8 carbon atoms. In the alkyl group having a terminal CHF$_2$ group denoted by R$^0$, at least 50 percent of the hydrogen atoms in the alkyl group are desirably substituted with fluorine atoms, with 60 percent or more substitution being preferred and 70 percent or more substitution being of even greater preference. The remaining hydrogen atoms may be further substituted with the substituents given as examples of substituent selected from the Substituent Group D further below. Examples are given below of the alkyl group having a terminal CF$_3$ group and the alkyl group having a terminal CHF$_2$ denoted by R$^0$.

R0:n-C$_8$F$_{17}$—
R2:n-C$_6$F$_{13}$—
R3:n-C$_4$F$_9$—
R4:n-C$_8$F$_{17}$—(CH$_2$)$_2$—
R5:n-C$_6$F$_{13}$—(CH$_2$)$_2$—
R6:n-C$_4$F$_9$—(CH$_2$)$_2$—
R7:H—(CF$_2$)$_8$—
R8:H—(CF$_2$)$_6$—
R9:H—(CF$_2$)$_4$—
R10:H—(CF$_2$)$_8$—(CH$_2$)—
R11:H—(CF$_2$)$_6$—(CH$_2$)—
R12:H—(CF$_2$)$_4$—(CH$_2$)—

In the formula (2), the linking group of valence (m+n) denoted by L$^0$ is desirably a combination of at least two groups selected from the group consisting of alkylene groups, alkenylene groups, (m+n) valence aromatic groups, bivalent heterocyclic residues, —CO—, —NR— (where R denotes an alkyl group having from 1 to 5 carbon atoms or a hydrogen group), —O—, —S—, —SO—, and —SO$_2$—.

In formula (2), W denotes a carboxyl group (—COOH) or a salt thereof, a sulfo group (—SO$_3$H) or a salt thereof, a sulfate group (—OSO$_3$H) or a salt thereof, or a phosphonoxy group {—OP(=O)(OH)$_2$} or a salt thereof. The preferred scope of W is same as that of Q in the formula (1).

Among the compounds represented by the formula (2), the compounds represented by a formula (2a) or a formula (2b) described below are preferred.

[Formula 64]

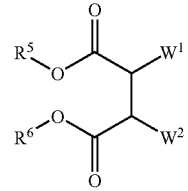

Formula (2a)

In the formula (2a), R$^5$ and R$^6$ respectively denote an alkyl group, an alkyl group having a terminal CF$_3$ group or an alkyl group having a terminal CF$_2$ group, and, however, they do not simultaneously denote alkyl groups. W$^1$ and W$^2$ respectively denote hydrogen atoms, a carboxyl group (—COOH) or a salt thereof, a sulfo group (—SO$_3$H) or a salt thereof, a sulfate group (—OSO$_3$H) or a salt thereof, a phosphonoxy group {—OP(=O)(OH)$_2$} or a salt thereof, or an alkyl group, an alkoxy group or an alkylamino group having a carboxyl group, a sulfo group, a sulfate group or a phosphonoxy group. However, W$^1$ and W$^2$ do not simultaneously denote hydrogen atoms.

R$^5$ and R$^6$ are identically defined with R$^0$ in the formula (2) above, and their preferred scopes are identical. The carboxyl group (—COOH) or the salt thereof, the sulfo group (—SO$_3$H) or the salt thereof, the sulfate group (—OSO$_3$H) or the salt thereof or the phosphonoxy group {—OP(=O)(OH)$_2$} or the salt thereof denoted by W$^1$ and W$^2$ are identically defined with the hydrophilic groups denoted by W in the formula (2) above, and their preferred scopes are identical. The alkyl groups having the hydrophilic group denoted by W$^1$ and W$^2$ may have straight or branching chains. They are desirably alkyl groups having from 1 to 20 carbon atoms, preferably alkyl groups having from 1 to 8 carbon atoms, and more preferably, alkyl groups having from 1 to 3 carbon atoms. The above-described alkyl group may have at least one hydrophilic group selected from a carboxyl group, a sulfo group, a sulfate group and a phosphonoxy group. The hydrophilic group is identically defined with the hydrophilic group denoted by W in the formula (2), and their preferred scopes are identical. The alkyl group having a hydrophilic group may be substituted with a substituent other than the hydrophilic group. Any of the substituents selected from the Substituent Group D further below may be employed as this substituent group. The alkoxyl groups having the hydrophilic group denoted by W$^1$ and W$^2$ may have straight or branching chains. They are desirably alkoxyl groups having from 1 to 20 carbon atoms, preferably alkoxyl groups having from 1 to 8 carbon atoms, and more preferably, alkoxyl groups having from 1 to 4 carbon atoms. The above-described alkoxyl group may have at least one hydrophilic group selected from a carboxyl group, a sulfo group, a sulfate group and a phosphonoxy group. The hydrophilic group is identically defined with the hydrophilic group denoted by W in the formula (2), and their preferred scopes are identical. The alkoxyl group having a hydrophilic group may be substituted with a substituent other than the hydrophilic group. Any of the substituents selected from the Substituent Group D further below may be employed as this substituent group. The alkylamino groups having the hydrophilic group denoted by W$^1$ and W$^2$ may have straight or branching chains. They are desirably alkylamino groups having from 1 to 20 carbon atoms, preferably alkylamino groups having from 1 to 8 carbon atoms, and more preferably, alkylamino groups having from 1 to 4 carbon atoms. The above-described alkylamino group may have at least one hydrophilic group selected from a carboxyl group, a sulfo group, a sulfate group and a phosphonoxy group. The hydrophilic group is identically defined with the hydrophilic group denoted by W in the formula (2), and their preferred scopes are identical. The alkylamino group having a hydrophilic group may be substituted with a substituent other than the hydrophilic group. Any of the substituents selected from the Substituent Group D further below may be employed as this substituent group.

It is particularly desirable for $W^1$ and $W^2$ to denote a hydrogen atom or $(CH_2)_n SO_3M$ (where n denotes 0 or 1). M denotes a cation, but when the charge in the molecule is 0, M may be absent. Examples of desirable cations denoted by M include protonium ion, alkali metal ions (lithium ions, sodium ions, potassium ions, and the like), alkaline earth metal ions (barium ions, calcium ions, and the like), and ammonium ions. Among these, protonium ion, lithium ion, sodium ion, potassium ion and ammonium ion are preferred.

Next, the formula (2b) will be described in detail.

$(R^7-L^1-)_{m2}(Ar^1)—W^3$  Formula (2b)

In the formula (2b), $R^7$ denotes an alkyl group, an alkyl group having a terminal $CF_3$ group or an alkyl group having a terminal $CF_2H$ group; m2 denotes an integer greater than or equal to 1, where multiple occurrences of $R^7$ may be identical or different, with at least one denoting an alkyl group having a terminal $CF_3$ group or a terminal $CHF_2$ group; $L^1$ denotes a divalent linking group selected from the group consisting an alkylene group, an aromatic group, —CO—, —NR— (R denotes a $C_{1-5}$ alkyl group or a hydrogen atom), —O—, —S—, —SO—, —SO$_2$— and any combination thereof, where multiple occurrences of $L^1$ may be identical or different; $Ar^1$ represents an aromatic hydrocarbon ring residue or an aromatic hetero-ring residue; and $W^3$ represents a carboxyl group (—COOH) or a salt thereof, a sulfo group (—SO$_3$H) or a salt thereof, a sulfate group (—OSO$_3$H) or a salt thereof, a phosphonoxy group {—OP(=O)(OH)$_2$} or a salt thereof, or an alkyl group, an alkoxy group or an alkylamino group having a carboxyl group, a sulfo group, a sulfate group or a phosphonoxy group.

The aromatic hydrocarbon ring residue represented by $Ar^1$ is desirably a $C_{6-12}$ aromatic hydrocarbon ring residue, and more desirably a benzene ring residue or a naphthalene ring residue. The aromatic hetero-ring residue represented by $Ar^1$ is desirably an aromatic hetero-ring residue, in which a carbon atom and at least one atom selected from nitrogen, oxygen and sulfur atoms are embedded, such as pyridine ring, thiophene ring, furan ring and pyrimidine ring residues. As $Ar^1$, the aromatic hydrocarbon ring residue is more preferred; among those, benzene or naphthalene ring residue is much more preferred, and benzene ring residue is further much more preferred.

$R^7$ is identically defined with $R^0$ in the formula (2) above, and their preferred scopes are identical. $L^1$ is desirably a $C_{0-40}$ linking group selected from the group consisting of a $C_{1-12}$ alkyl group, a $C_{6-12}$ aromatic group, —CO—, —NR—, —O—, —S—, —SO—, —SO$_2$— and any combination thereof; and more desirably a $C_{0-20}$ linking group selected from the group a $C_{1-8}$ alkyl group, a phenyl group, —CO—, —NR—, —O—, —S—, —SO$_2$— and any combination thereof. The carboxyl group (—COOH) or the salt thereof, the sulfo group (—SO$_3$H) or the salt thereof, the sulfate group (—OSO$_3$H) or the salt thereof or the phosphonoxy group {—OP(=O)(OH)$_2$} or the salt thereof denoted by $W^3$ are identically defined with the hydrophilic groups denoted by W in the formula (2) above, and their preferred scopes are identical. And the alkoxyl, alkoxy and alkylamino group having the hydrophilic group denoted by $W^3$ are identically defined with those denoted by $W^1$ or $W^2$; and their preferred scopes are identical.

$W^3$ is desirably selected from the group consisting of a carboxyl group (—COOH) and a salt thereof, a sulfo group (—SO$_3$H) and a salt thereof, an alkylamino group having a carboxyl group (—COOH) or a salt thereof and an alkylamino group having a sulfo group (—SO$_3$H) or a salt thereof, and more desirably selected from the group consisting of SO$_3$M and CO$_2$M. M represents a cation, but when the charge in the molecule is 0, M may be absent. Examples of the cation denoted by M include a protonium ion, alkali metal ions (lithium ion, sodium ion, potassium ion and the like), alkaline earth metal ions (barium ions, calcium ions, and the like), and ammonium ions; and preferred example include a protonium ion, lithium ion, sodium ion, potassium ion and ammonium ion.

In the present Description, Substituent Group D includes:
  alkyl groups (desirably alkyl groups having from 1 to 20 carbon atoms, preferably having from 1 to 12 carbon atoms, and more preferably having from 1 to 8 carbon atoms; examples are methyl, ethyl, isopropyl, tert-butyl, n-octyl, n-decyl, n-hexadecyl, cyclopropyl, cyclopentyl, and cyclohexyl); alkenyl groups (desirably alkenyl groups having from 2 to 20 carbon atoms, preferably from 2 to 12 carbon atoms, and more preferably having from 2 to 8 carbon atoms; examples are vinyl, allyl, 2-butenyl, and 3-pentenyl); alkinyl groups (desirably alkinyl groups having from 2 to 20 carbon atoms, preferably from 2 to 12 carbon atoms, and more preferably from 2 to 8 carbon atoms; examples are propargyl and 3-pentinyl); aryl groups (desirably aryl groups having from 6 to 30 carbon atoms, preferably having from 6 to 20 carbon atoms, and more preferably having from 6 to 12 carbon atoms; examples are phenyl, p-methylphenyl, and naphthyl); optionally substituted amino groups (desirably amino groups having from 0 to 20 carbon atoms, preferably having from 0 to 10 carbon atoms, and more preferably having from 0 to 6 carbon atoms; examples are unsubstituted amino, methylamino, dimethylamino, diethylamino and dibenzylamino);

alkoxy groups (desirably alkoxy groups having from 1 to 20 carbon atoms, preferably having from 1 to 12 carbon atoms, and more preferably having from 1 to 8 carbon atoms; examples are methoxy, ethoxy, and butoxy); aryloxy groups (desirably aryloxy groups having from 6 to 20 carbon atoms, preferably having from 6 to 16 carbon atoms, and more preferably having from 6 to 12 carbon atoms; examples are phenyloxy and 2-naphthyloxy), acyl groups (desirably acyl groups having from 1 to 20 carbon atoms, preferably having from 1 to 16 carbon atoms, and more preferably having from 1 to 12 carbon atoms; examples are acetyl, benzoyl, formyl, and pivaloyl); alkoxycarbonyl groups (desirably alkoxycarbonyl groups having from 2 to 20 carbon atoms, preferably having from 2 to 16 carbon atoms, and more preferably having from 2 to 12 carbon atoms; examples are methoxycarbonyl and ethoxy carbonyl); aryloxycarbonyl groups (desirably aryloxycarbonyl groups having from 7 to 20 carbon atoms, preferably having from 7 to 16 carbon atoms, and more preferably having from 7 to 10 carbon atoms; examples include phenyloxycarbonyl); acyloxy groups (desirably acyloxy groups having from 2 to 20 carbon atoms, preferably having from 2 to 16 carbon atoms, and more preferably having from 2 to 10 carbon atoms; examples are acetoxy and benzoyloxy); acylamino groups (desirably acylamino groups having from 2 to 20 carbon atoms, preferably having from 2 to 16 carbon atoms, and more preferably having from 2 to 10 carbon atoms; examples are acetylamino and benzoylamino); alkoxycarbonylamino groups (desirably alkoxycarbonylamino groups having from 2 to 20 carbon atoms, preferably having from 2 to 16 carbon atoms, and more preferably having from 2 to 12 carbon atoms; examples include methoxycarbonylamino); aryloxycarbonylamino groups (desirably aryloxycarbonylamino groups having from 7 to 20 carbon atoms, preferably having from 7 to 16 carbon atoms, and more preferably having from 7 to 12 carbon atoms; examples include phenyloxycarbonylamino); sulfonylamino groups (desirably sulfonylamino groups having from 1 to 20 carbon atoms, preferably having from 1 to 16 carbon atoms, and more preferably having from 1 to 12 carbon atoms; examples are methanesulfonylamino and benzenesulfonylamino), sulfamoyl groups (preferably sulfamoyl groups having from 0 to 20 carbon atoms, preferably having from 0 to 16 carbon atoms, and more preferably having from 0 to 12 carbon atoms; examples are sulfamoyl, methylsulfamoyl, dimethylsulfamoyl and phenylsulfamoyl); carbamoyl groups (desirably carbamoyl groups having from 1 to 20 carbon atoms, preferably having from 1 to 16 carbon atoms, and more preferably having from 1 to 12 carbon atoms; examples are unsubstituted carbamoyl, methylcarbamoyl, diethylcarbamoyl and phenylcarbamoyl);

alkylthio groups (desirably alkylthio groups having from 1 to 20 carbon atoms, preferably having from 1 to 16 carbon atoms, and more preferably having from 1 to 12 carbon atoms; examples are methylthio and ethylthio), arylthio groups (desirably arylthio groups having from 6 to 20 carbon atoms, preferably having from 6 to 16 carbon atoms, and more preferably having from 6 to 12 carbon atoms; examples include phenylthio); sulfonyl groups (desirably sulfonyl groups having from 1 to 20 carbon atoms, preferably having from 1 to 16 carbon atoms, and more preferably having from 1 to 12 carbon atoms; examples are mesyl and tosyl); sulfinyl groups (desirably sulfinyl groups having from 1 to 20 carbon atoms, preferably having from 1 to 16 carbon atoms, and more preferably having from 1 to 12 carbon atoms; examples are methanesulfinyl and benzenesulfinyl); ureido groups (desirably ureido groups having from 1 to 20 carbon atoms, preferably having from 1 to 16 carbon atoms, and more preferably having from 1 to 12 carbon atoms; examples are unsubstituted ureido, methylureido and phenylureido); phosphoramide groups (desirably phosphoramide groups having from 1 to 20 carbon atoms, preferably having from 1 to 16 carbon atoms, and more preferably having from 1 to 12 carbon atoms; examples are diethyl phosphoramide and phenyl phosphoramide); hydroxy, mercapto, halogen atoms (for example, fluorine, chlorine, bromine and iodine); cyano, sulfo, carboxyl, nitro, hydroxamic acid groups, sulfino, hydrazino, imino, heterocyclic groups (desirably heterocyclic groups having from 1 to 30 carbon atoms, preferably having from 1 to 12 carbon atoms; examples are heterocyclic groups having hetero atoms such as nitrogen, oxygen, and sulfur; examples are imidazolyl, pyridyl, quinolyl, furyl, piperidyl, morpholino, benzooxazolyl, benzimidazolyl, and benzthioazolyl); and silyl groups (desirably silyl groups having from 3 to 40 carbon atoms, preferably having from 3 to 30 carbon atoms, and more preferably having from 3 to 24 carbon atoms; examples are trimethylsilyl and triphenylsilyl). These substituents may be further substituted with these substituents. Further, when there are two or more substituents, they may be identical or different. When possible, they may be bonded together to form a ring.

As described above, in order to fix alignments of molecules liquid-crystal compounds, especially discotic liquid-crystal compounds, the fluoride-compound desirably has a polymerizable group as a substituent.

Specific examples of the fluoride-compound denoted by the formula (2) are given below. However, compounds that can be employed in the present invention are not limited to these compounds. Among the specific examples below, Nos. 1-1 to 38 are examples of compounds denoted by the formula (2a); and Nos. 1-39 to 62 are examples of compounds denoted by the formula (2b).

[Formula 65]

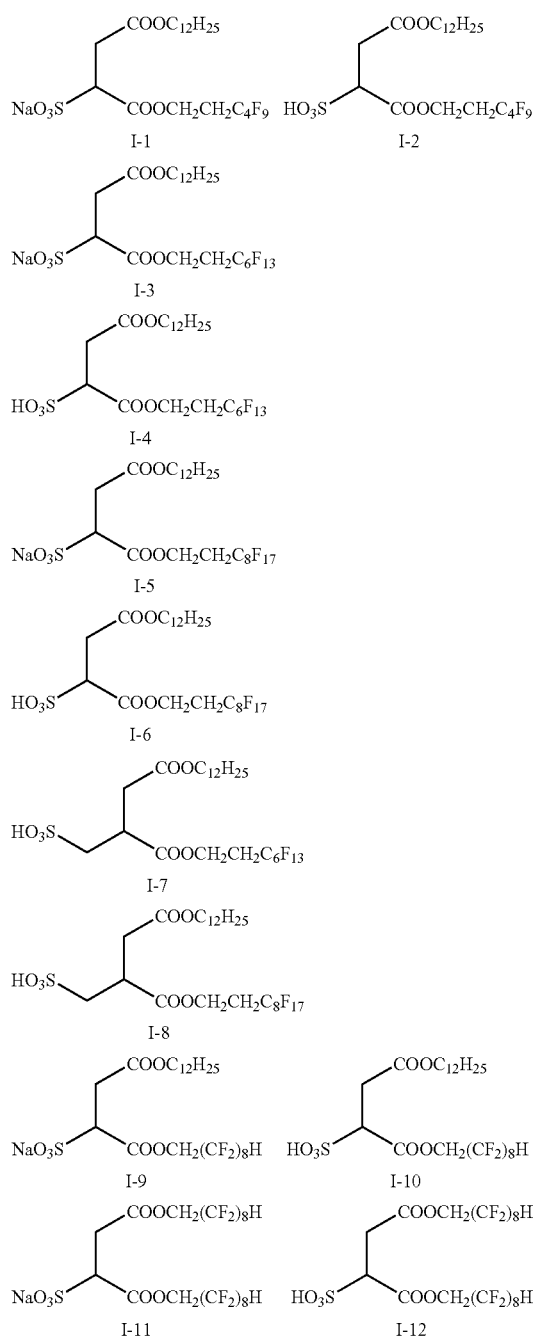

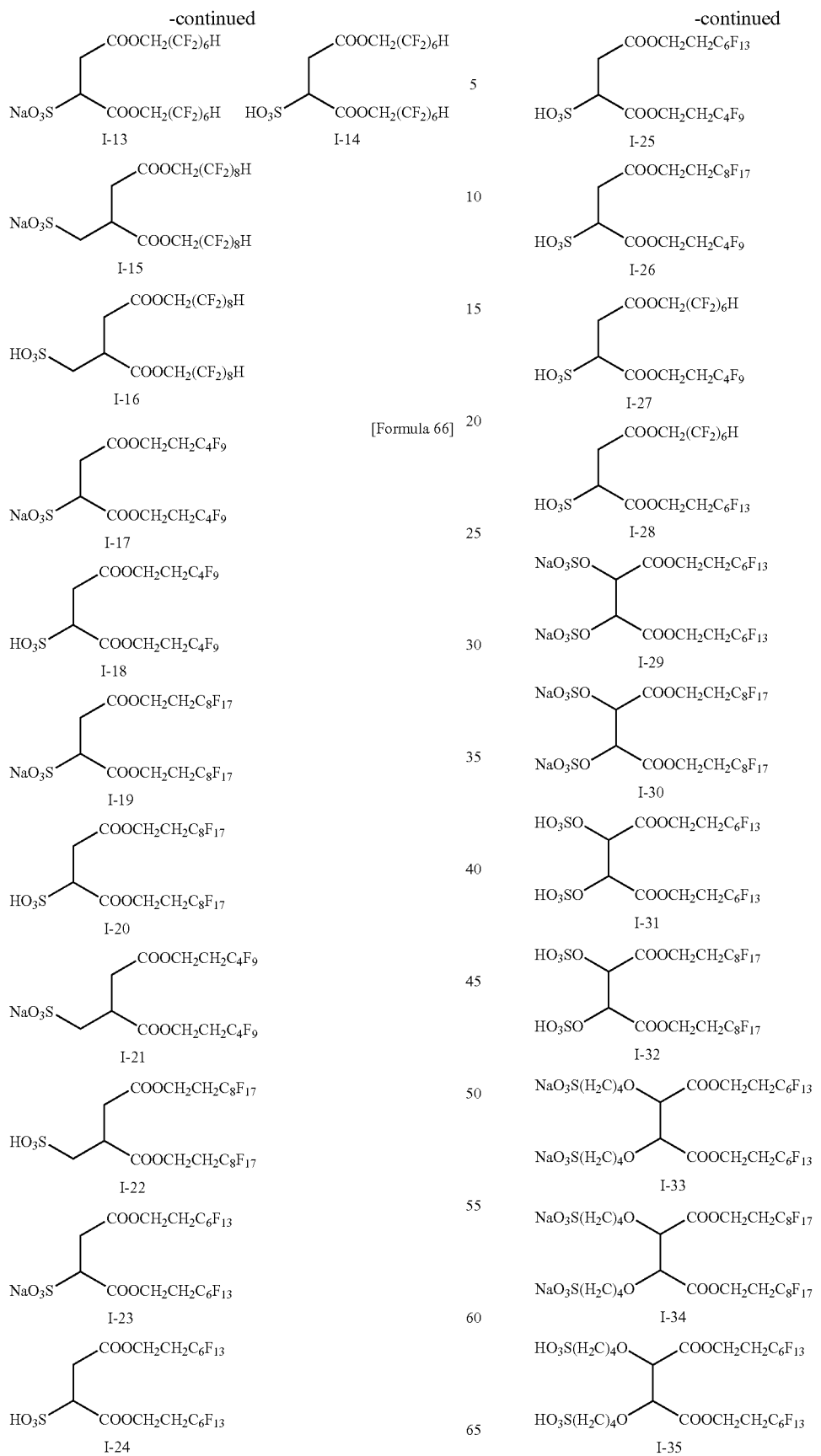

-continued
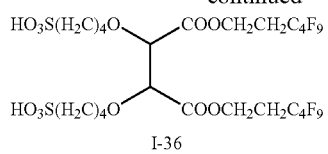
I-36
[Formula 67]
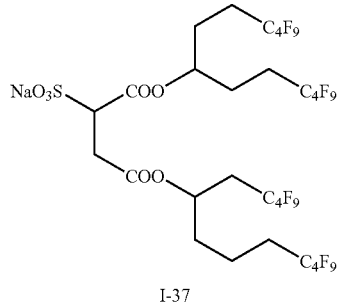
I-37
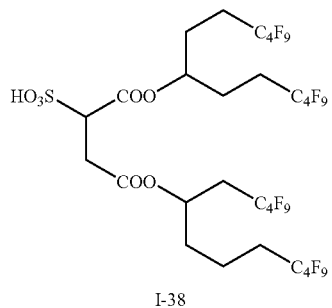
I-38
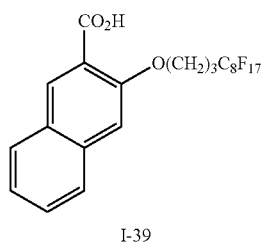
I-39
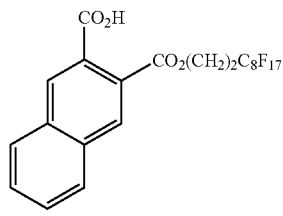
I-40
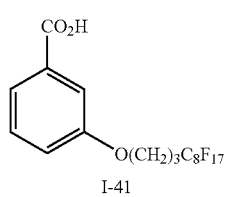
I-41
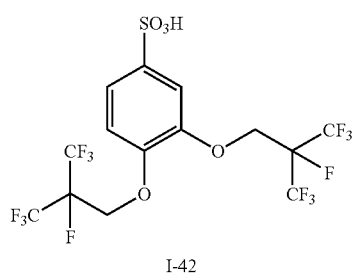
I-42
-continued
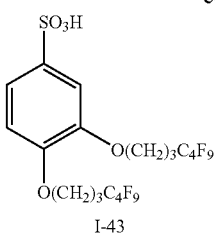
I-43    I-44
[Formula 68]
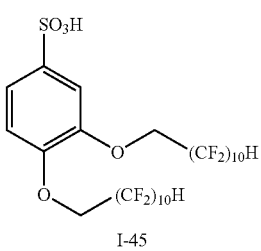
I-45
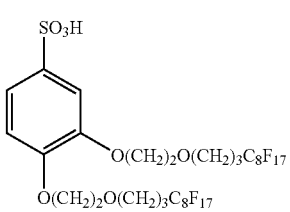
I-46
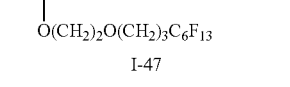
I-47
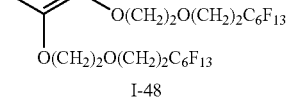
I-48
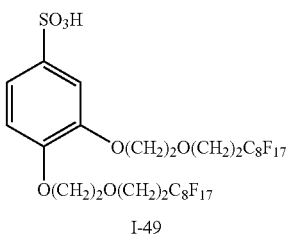
I-49
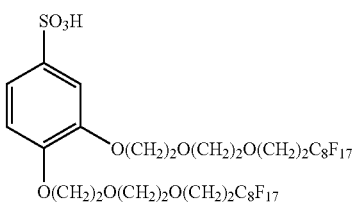
I-50

-continued

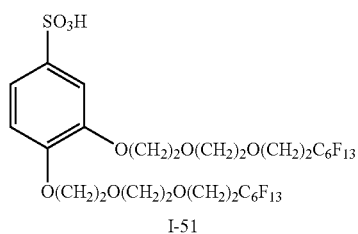
I-51

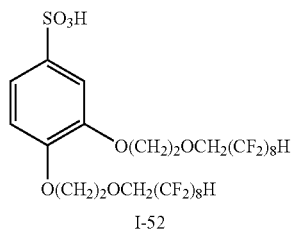
I-52

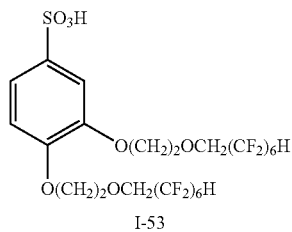
I-53

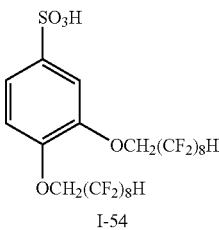
I-54

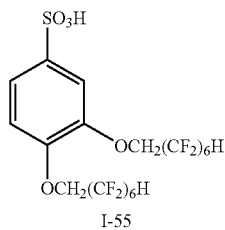
I-55

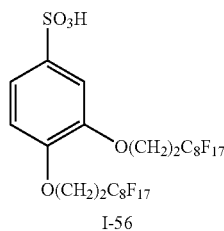
I-56

[Formula 69]

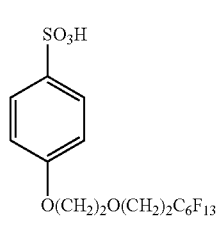
I-57

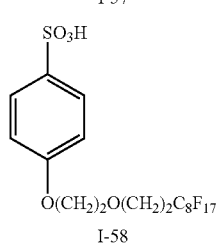
I-58

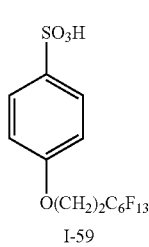
I-59

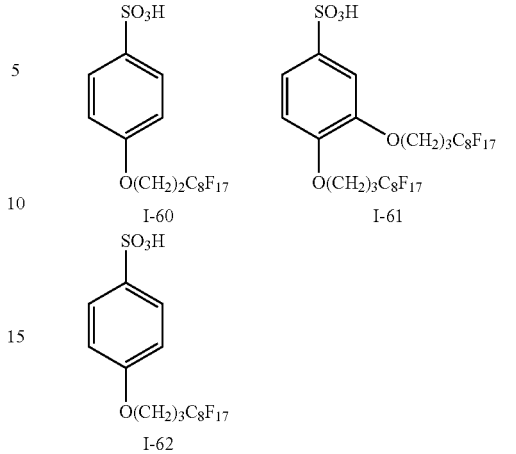
I-60  I-61

I-62

The preferred amount of the fluoride-compound in the composition may vary with its application, when the composition is used for production of an optically anisotropic layer, the amount of the fluoride-compound is desirably from 0.005 to 8 mass %, more desirably from 0.01 to 5 mass % and much more desirably from 0.05 to 1 mass % with respect to the total mass of the composition (when the composition is a solution, the solvent is excluded).

《Other Additives》

The composition of the present invention may comprise other additives such as polymerization initiators, plasticizers, surfactants or polymerizable monomers, with the rod-like liquid crystalline compound, the onium salt and the air-interface vertical alignment promoter. Such additives may contribute to improvement in uniformity of a coating layer, strength of a coating layer, alignment ability of liquid-crystal molecules or the like. Such additives are desirably selected from materials which can be mixed with the rod-like liquid crystalline compound compatibly and don't inhibit the alignment of the liquid-crystal compound.

The polymerization initiator may be selected from thermal polymerization initiators and photo-polymerization initiators. Photo-polymerization initiators are preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in TOKKAI No. sho 60-105667 and U.S. Pat. No. 4,239,850), and oxadiazole compounds (described in U.S. Pat. No. 4,212,970).

The amount of photo-polymerization initiator employed is desirably from 0.01 to 20 mass percent, preferably from 0.5 to 5 mass percent, of the solid portion of the coating liquid.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of [0018] to [0020] in TOKKAI No. 2002-296423. In usual, the amount of the polymerizable monomer is desirably from 1 to 50 mass %, and more desirably from 5 to 30 mass %, with respect to the total mass of a single or plural liquid crystal compounds.

The surfactant may be selected from any known surfactants, and is desirably selected from fluoride-surfactants. More specifically, the compounds, described in the columns of [0028] to [0056] in TOKKAI No. 2001-330725 are preferred. And Polymer Nos. P-1 to P-71 are also preferred.

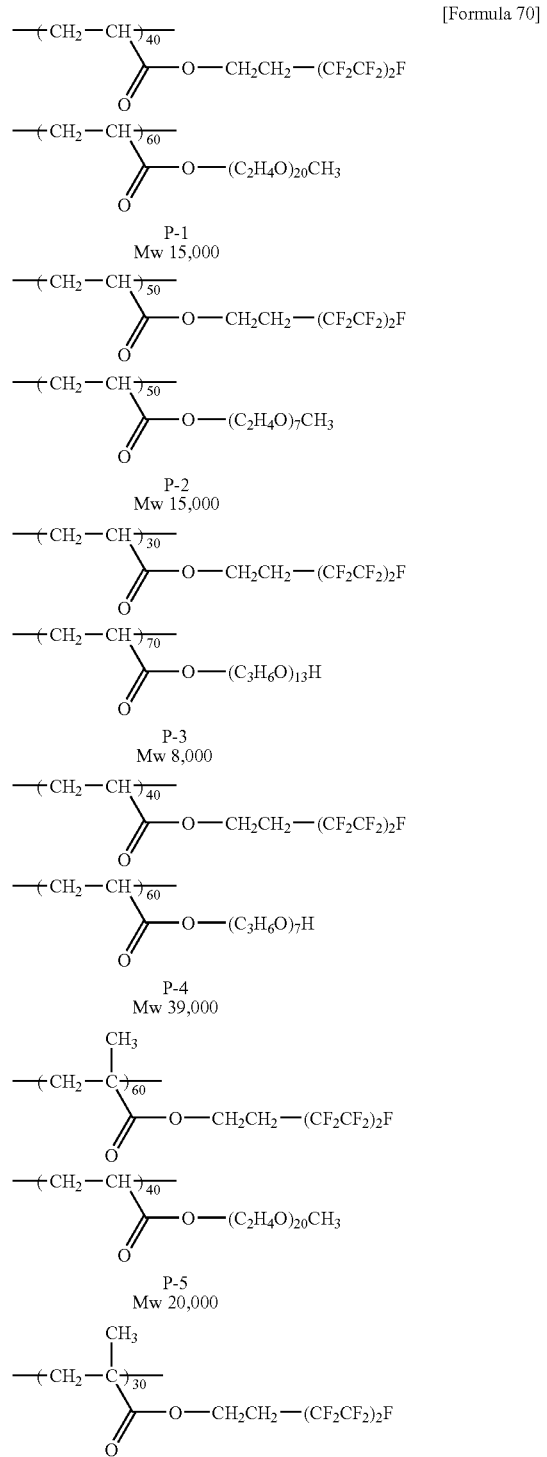

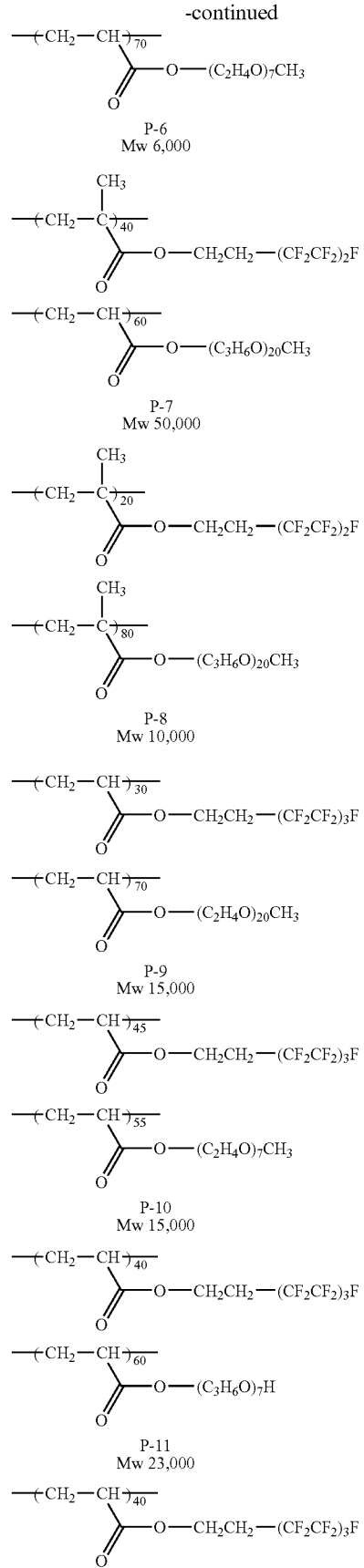

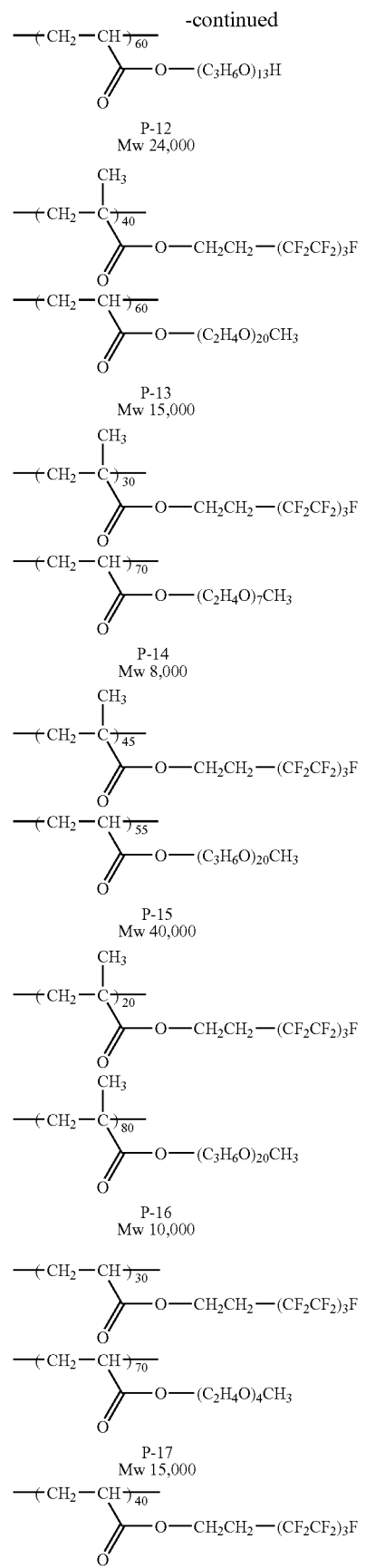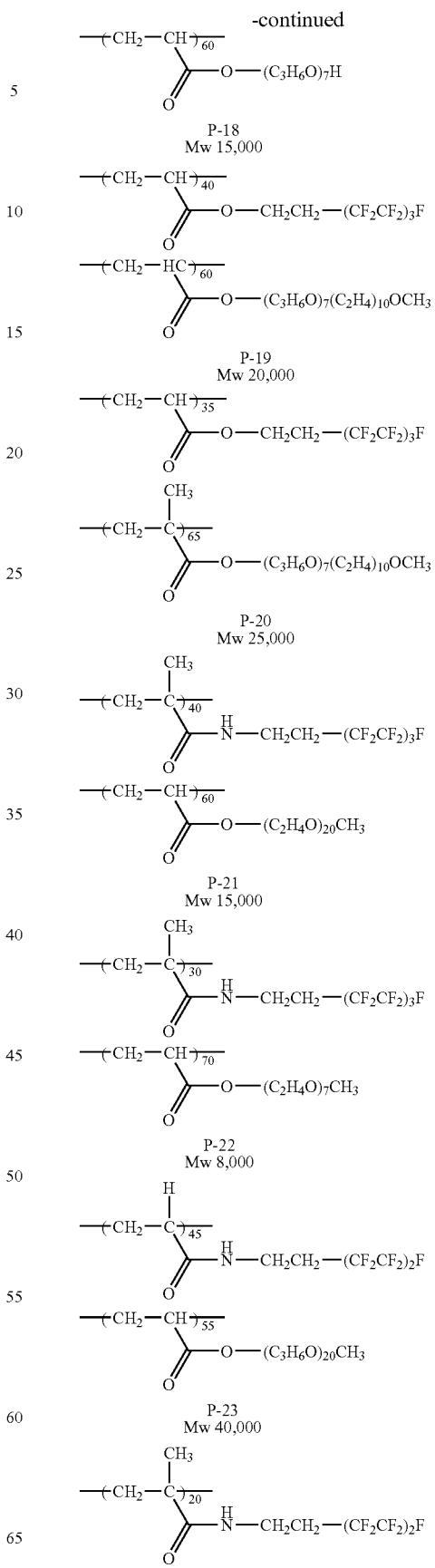

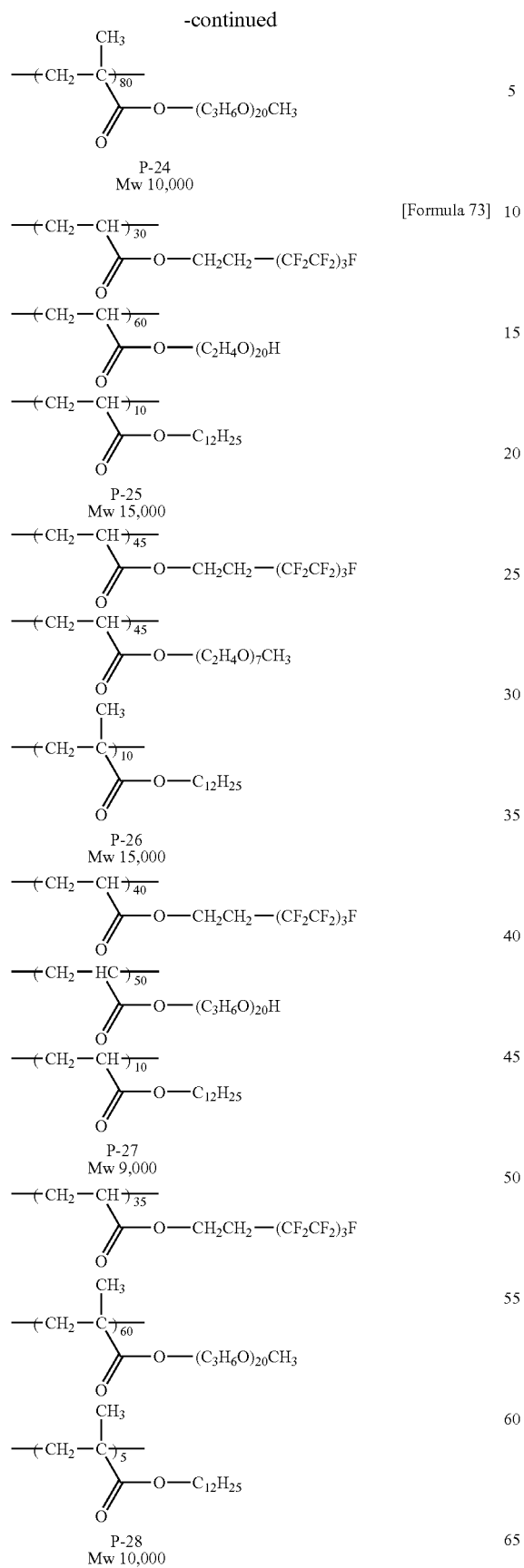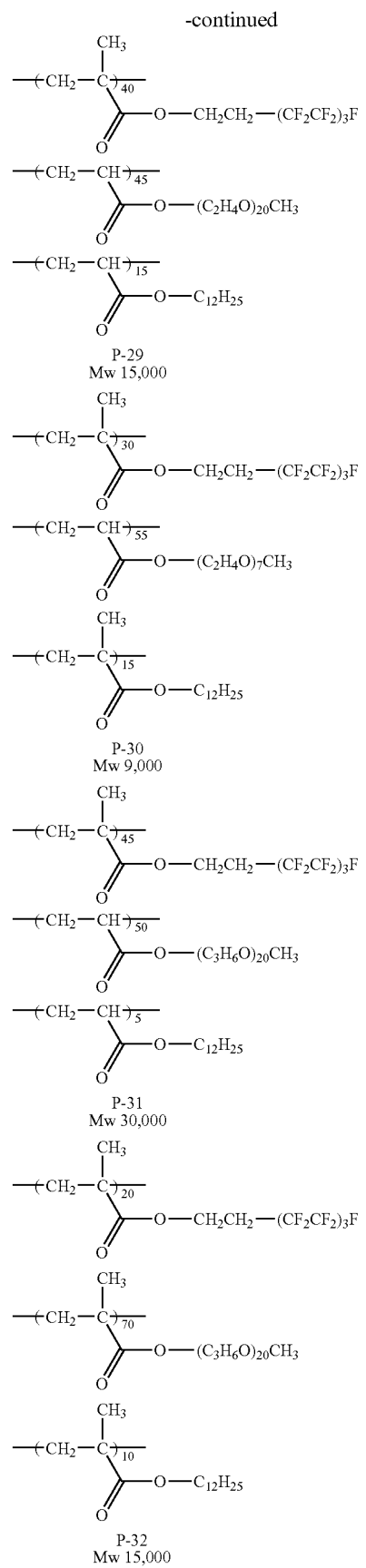

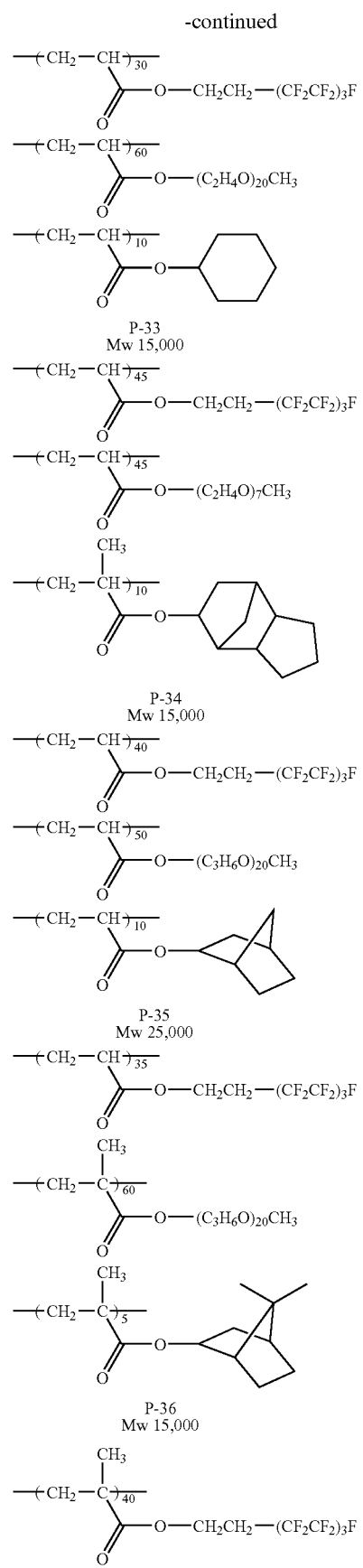
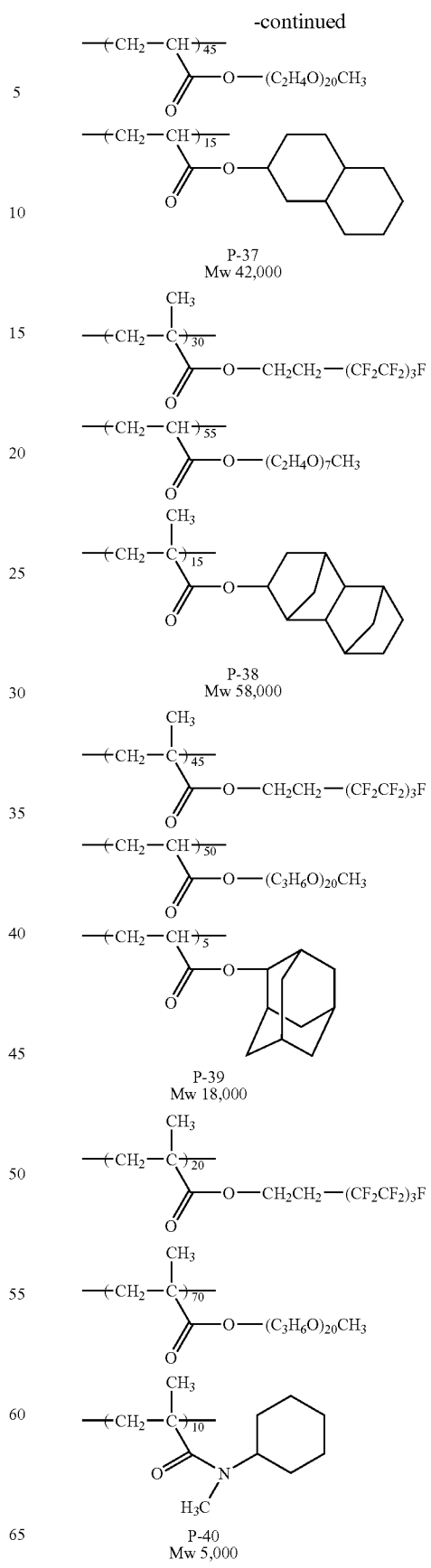

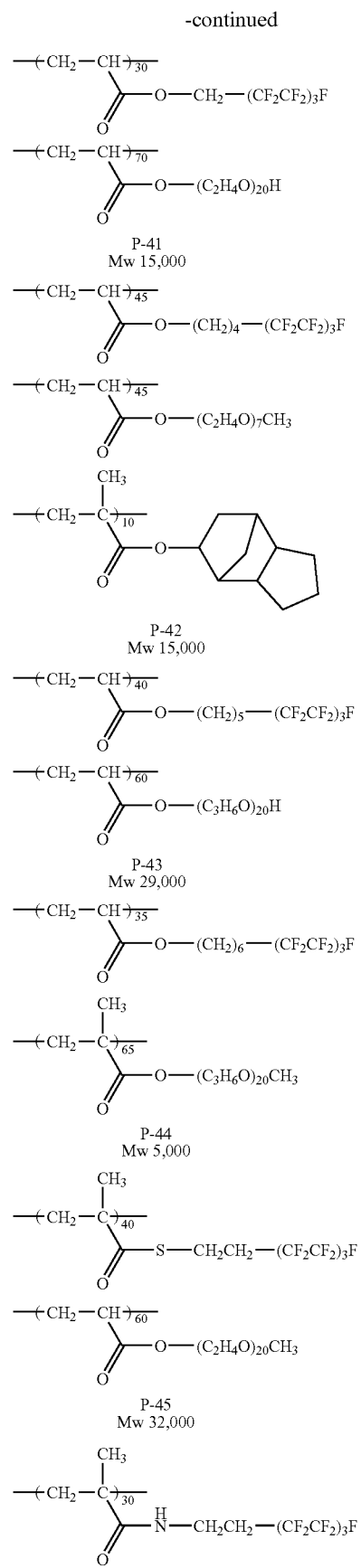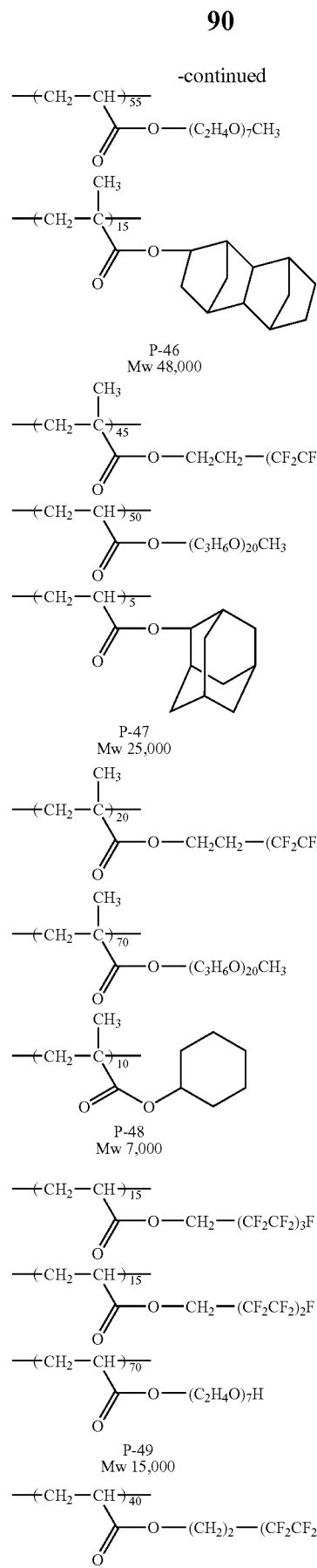

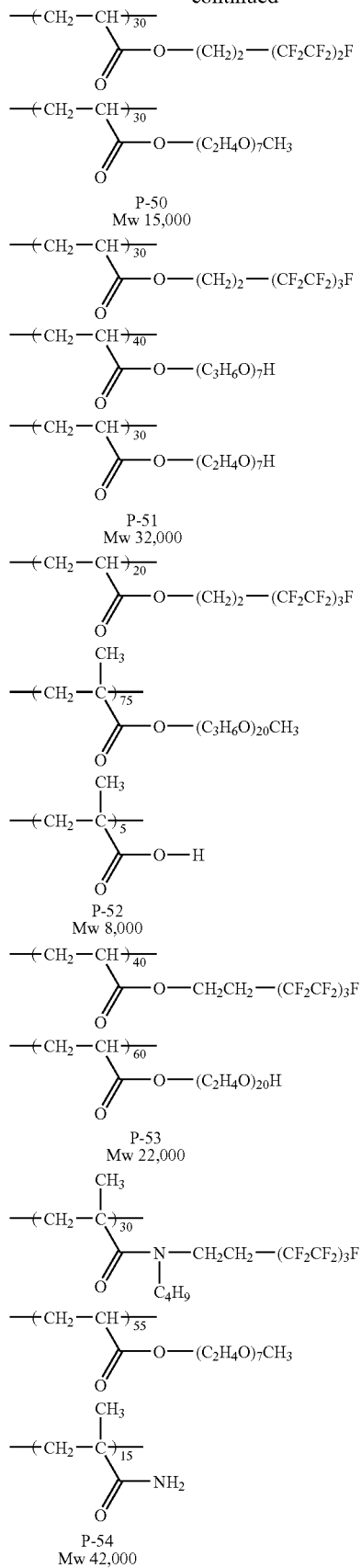
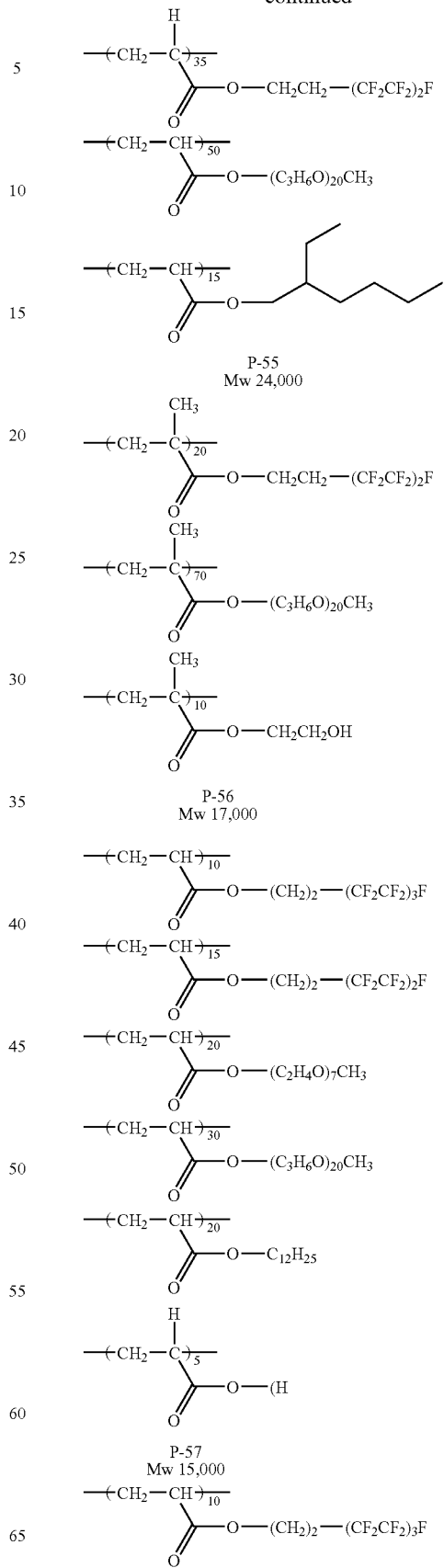

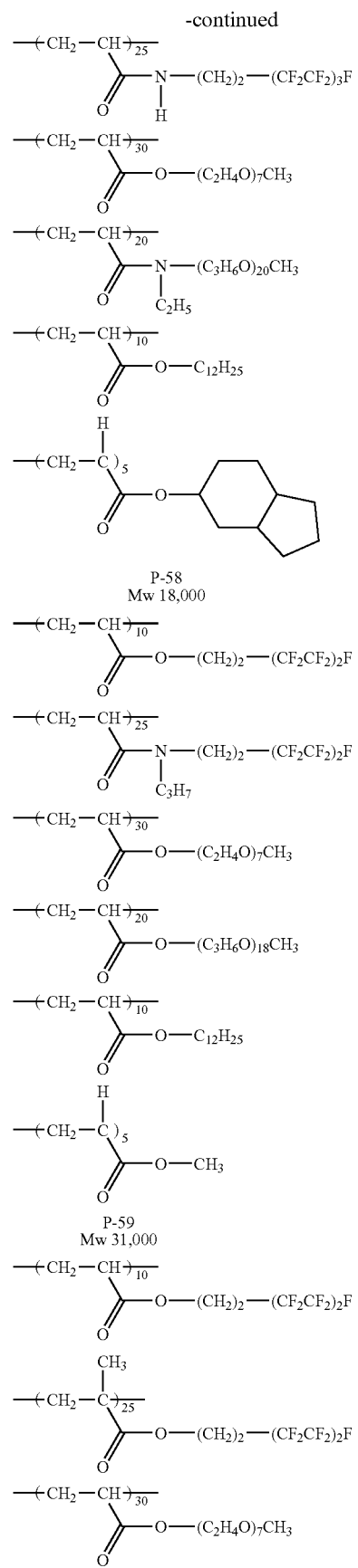
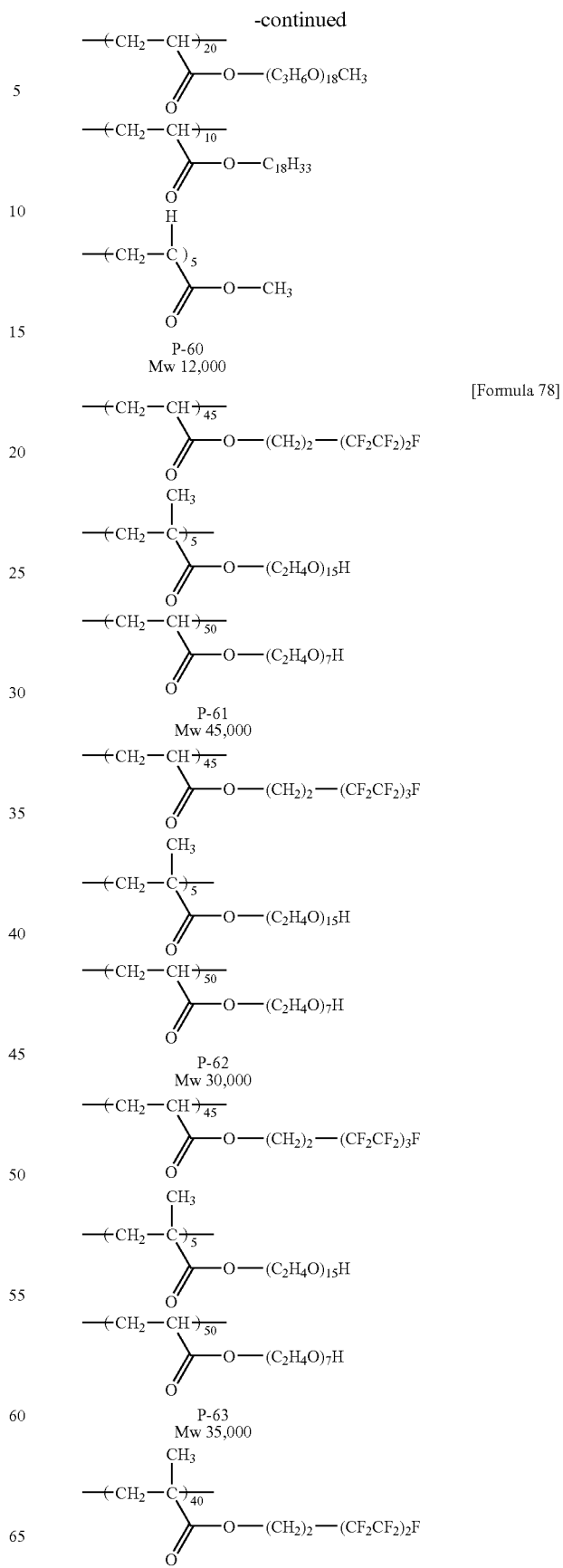

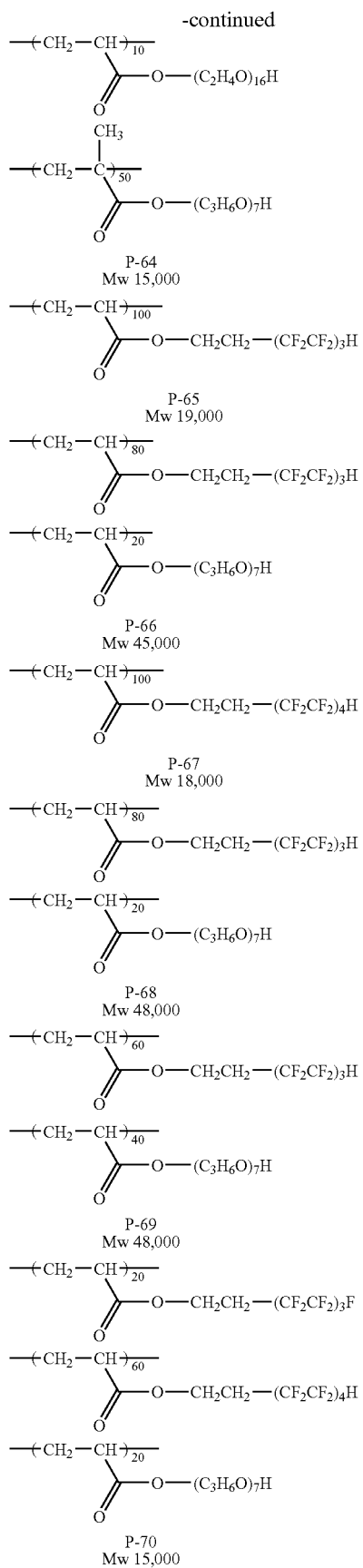
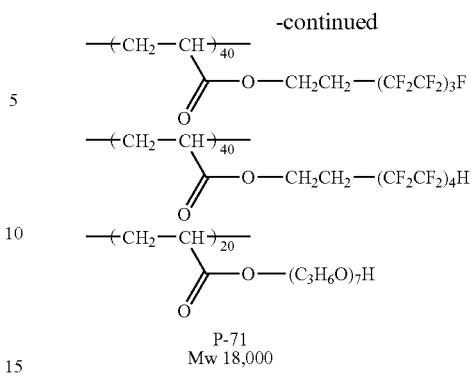

The polymer is desirably selected from polymers which can increase a viscosity of a coating liquid. Examples of the polymer include cellulose esters. Preferred examples of cellulose ester include those described in the column [0178] in TOKKAI No. 2000-155216. Avoiding inhibiting the alignment of the liquid-crystal compound, the amount of the polymer is desirably from 0.1 to 10 mass %, and more desirably from 0.1 to 8 mass %, with respect to the mass of the liquid-crystal compound.

《Preparation of Optically Anisotropic Layer》

The optically anisotropic layer may be prepared according to a process comprising preparing the composition of the present invention as a coating liquid, applying the composition to a surface of a substrate or the like, aligning rod-like liquid crystalline molecules vertically, and fixing them in an alignment. When the layer is formed on a temporary substrate, the layer may be transferred from on the temporary substrate to on a substrate. The second retardation region may be formed of a single layer or multiple layers. The whole laminated body of the optically anisotropic layer and the substrate supporting the layer may satisfy the properties required for the second retardation region.

The solvent to be used for preparing the coating liquid is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating liquids.

The coating liquid can be applied by known techniques (e.g., extrusion coating, direct gravure coating, reverse gravure coating and die coating).

After the rod-like liquid crystalline molecules are aligned vertically, the molecules may be fixed in an alignment state. Fixing may be carried out by polymerization of polymerizable groups included in rod-like crystalline molecules and/or polymerizable monomers. The polymerization reaction is desirably carried out according to photo-polymerization reaction employing photo-polymerization initiators. Irradiation for polymerization of rod-like liquid crystalline molecules is desirably conducted with ultraviolet radiation. The irradiation energy is desirably from 20 mJ/cm$^2$ to 50 J/cm$^2$, preferably from 100 to 800 mJ/cm$^2$. Irradiation may be conducted under heated conditions to promote the photo-polymerization reaction.

The optically anisotropic layer desirably has a thickness of 0.1 to 10 micrometers, preferably of 0.5 to 5 micrometers, and more preferably of 1 to 5 micrometers.

(Alignment Layer)

For preparing the optically anisotropic layer, alignment layers may be used. Alignment layers have a function of determine the alignment direction of rod-like liquid crystalline molecules. However, when rod-like liquid crystalline molecules are aligned homeotropically, there is no alignment in a plane, and, thus, alignment layers are not essential for the present invention. The composition of the present invention comprises an onium salt and an air-interface vertical alignment promoter, and, thus, rod-like liquid crystalline molecules may be stably aligned vertically even if no vertical alignment layer is used. Thus, according to the present invention, for preparing the optically alignment layer, vertical alignment layers are not necessary. Alignment layers may contribute to aligning liquid crystalline molecules uniformly or improving adhesion between the substrate and the optically anisotropic layer, and, thus, if necessary, can be used. The molecules fixed in an alignment state can keep the alignment without an alignment layer. Thus, after an optically anisotropic layer is formed on an alignment layer, only the optically anisotropic layer may be transferred from on the alignment layer to on another member such as a polarizing film, and in such case, the alignment layer is absent.

The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers may be rubbed if necessary. The polymers for preparing the alignment layers may basically have a molecular structure capable of aligning discotic liquid-crystal molecules.

According to the present invention, the polymer is desirably selected from polymers having such a molecular structure and further having a structural feature in which a main chain bounds to side chains containing a crosslinkable group (such as a double bonding); or polymers having a structural feature in which a main chain bounds to side chains containing a crosslinkable function group capable of aligning liquid-crystal molecules.

The polymers may be selected from polymers capable crosslinking themselves or polymers to be crosslinked by any crosslinkable agent, and such polymers may be used in any combination.

Examples of the polymer used for preparing an alignment layer include methacrylate copolymers described in the column [0022] in TOKKAI No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-solbule polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred. Using plural polyvinyl alcohols or modified polyvinyl alcohols, they have a different polymerization degree each other, is especially preferred.

The saponification degree of the polyvinyl alcohol is desirably from 70 to 100%, and more desirably from 80 to 100%. The polymerization degree of the polyvinyl alcohol is desirably from 100 to 5000.

In usual, the side chain having a function capable of aligning discotic liquid-crystal molecules may have a hydrophobic group as a function group. The types of the function group may be decided depending on various factors such as types of the liquid-crystal compounds or desired alignment state.

For example, the modified group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in TOKKAI No. 2000-155216 and those described in the columns [0018] to [0022] in TOKKAI No. 2002-62426.

It is possible to copolymerize a polymer in an alignment layer and a multi-functional monomer in an optically anisotropic layer, when the polymer in the alignment layer has a main chain bonding to side chains containing a crosslinkable functional group, or the polymer in the alignment layer has side chain being capable of aligning liquid-crystal molecules and containing a crosslinkable functional group. In such case, not only between the multi-functional monomers but also between the polymers in the alignment layer and the multi-functional monomers and the polymers in the alignment layer, the covalent bondings are formed and the bonding strengths are improved. Thus, in such case, the strength of the optical compensation sheet can be remarkably improved.

The polymer in the alignment layer desirably has crosslinkable functional group containing a polymerizable group. Specific examples include those described in the columns of [0080] to [0100] in TOKKAI No. 2000-155216.

The polymer in the alignment layer may be crosslinked by a crosslinkable agent.

Examples of the crosslinkable agent include aldehydes, N-methylol compounds, dioxane derivatives, compounds to act when being activated their carboxyl groups, active vinyl compounds, active halogen compounds, isoxazoles and dialdehyde starches. Single or plural type of crosslinkable agents may be used. Specific examples of the crosslinkable agent include the compounds described in the columns [0023] to [0024] in TOKKAI No. 2002-62426. Aldehydes having a high reaction-activity are preferred, and glutaraldehydes are more preferred.

The amount of the crosslinkable agent is desirable from 0.1 to 20 mass %, and more desirably 0.5 to 15 mass %, with respect to the mass of the polymer. The residual amount of the unreacted crosslinkable-agent in the alignment layer is desirably not greater than 1.0 mass %, and more desirably not greater than 0.5 mass %. When the residual amount falls within the range, the alignment layer has a sufficient durability, and even if the alignment is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the crosslinkable agent, to a surface of a transparent substrate, drying under heating (crosslinking), and performing a rubbing treatment. The crosslinking reaction may be carried out any time after applying the coating liquid. When a hydrophilic polymer such as polyvinyl alcohol is used for preparation of an alignment layer, the coating liquid is desirably prepared using a mixed solvent of an organic solvent such as methanol, exhibiting a deforming function, and water. The mass ratio of water to methanol is desirably from 0/100 to 99/1, and more desirably from 0/100 to 91/9. Using such a mixed solvent can prevent bubbles from generating, and can remarkably reduce defects in the surface of the alignment layer and the optically anisotropic layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set in a range from 4.5 to 5.5, and more desirably 5.

The alignment layer may be formed on a transparent substrate. The alignment layer can be obtained by applying a rubbing treatment to the surface of the polymer layer after crosslinking the polymer layer.

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a nylon fiber, polyester fiber or the like in a direction. Usually, the rubbing treatment may be carried out by rubbing a polymer layer with a fabric in which fibers having a uniform length and line thickness are implanted averagely at several times.

After the liquid-crystal molecules are aligned on the alignment layer, if necessary, the reaction between the polymers in the alignment layer and the multi-functional monomers in the optical compensatory film may be carried out, or the crosslinking reaction of the polymers in the alignment layer with a crosslinkable agent may be carried out. The thickness of the alignment layer is desirably from 0.1 to 10 micrometers.

[Substrate]

According to the present invention, the optically anisotropic layer may be formed on a substrate. The substrate is preferably transparent, and, in particular, preferably has a light transmission of not less than 80%. The substrate is preferably selected from polymer films having a small wavelength-dependence, and, in particular, preferably has a Re400/Re700 ratio of less than 1.2. The substrate supporting the optically anisotropic layer may be a component of the second retardation region, and may be a component or itself of the first retardation region. The substrate may also function as a protective film of a polarizing film.

The substrate desirably has a small optical anisotropy, and, in particular, the in-plane retardation (Re) of the substrate is preferably not greater than 20 nm, more preferably not greater than 10 nm, and much more preferably not greater than 5 nm. When the substrate is also used as the first retardation region, the Re of the substrate is preferably from 20 to 150 nm, more preferably from 40 to 115 nm and much more preferably from 60 to 95 nm. The Na value of the substrate is preferably from 1.5 to 7, more preferably from 2.0 to 5.5 and much more preferably from 2.5 to 4.5.

Examples of materials for the substrate, however not limited to them, include cellulose esters, polycarbonates, polysulfones, polyethersulfones, polyacrylates and polymethacrylates. Among these, cellulose esters are preferred, acetyl celluloses are more preferred and triacetyl celluloses are much more preferred. The substrate is preferably produced according to a solvent casting process. The thickness of the substrate is desirably from 20 to 500 micrometers, and more desirably from 50 to 200 micrometers. In order to improve adhesion between the substrate and a layer formed thereon (for example, an adhesion layer, a vertical alignment layer or a retardation layer), the polymer film may be subjected to surface treatment. Examples of surface treatments include corona discharge treatment, glow discharge treatment, flame treatment, acid treatment, alkali treatment and UV irradiation treatment. An adhesion layer (an undercoating layer) may be formed on the substrate. A polymer layer containing inorganic particles having an average particle diameter of 10 to 100 nm in an amount of 5 mass % to 40 mass % with respect to the total mass of all solid ingredients is desirably formed on one side of the substrate, especially a long substrate, by coating or co-flow casting method, in order to improve a slide ability of the substrate in a feeding step or to prevent an adhesion of the surface to the rear surface of the substrate after being rolled up.

[Protective Film of Polarizing Film]

The protective film of the first or second polarizing film desirably has no absorption in visible wavelength region, a light transmittance of not greater than 80% and a small retardation based on birefringence. In particular, the protective film desirably has the in-plane retardation, Re, from 0 to 30 nm, more desirably from 0 to 15 nm, and much more desirably from 0 to 5 nm. The protective film desirably has retardation in thickness-direction, Rth, from 0 to 40 nm, more desirably from 0 to 20 mm, and much more desirably from 0 to 10 nm. The polymer films having such properties are preferably used as a protective film. And, from the view of durability of the polarizing film, cellulose acylate films or norbornene based polymer films are more preferred. The methods for decreasing the Rth of cellulose acylate films are described in TOKKAI No. hei 11-246704, TOKKAI No. 2001-247717 and the description of Japanese Patent application No. 2003-379975. The Rth of cellulose acylate films can be decrease by decreasing the thicknesses of the films. The protective film of the first or the second polarizing film desirably has a thickness from 10 to 100 μm, more desirably from 10 to 60 μm and much more desirably from 20 to 45 μm.

The present invention also relates to an optical compensation film comprising an alignment layer comprising at least one polymer and at least one onium salt; and at least one optically anisotropic layer formed of a composition comprising at least one rod-like liquid crystalline compound and at least one compound selected from the formula (1) or the formula (2) shown below. The onium salt in the alignment layer may contribute to aligning rod-like liquid crystal molecules vertically at an alignment interface. Examples of the onium salts include pyridinium salts, ammonium salts, sulfonium salts and phosphonium salts. Among these, pyridinium salts are preferred. And it is more preferred that the alignment layer comprises only single or plural types of pyridinium salts and doesn't comprise any other onium salts.

The optically anisotropic layer may comprise or not comprise an onium salt.

[Formula 79]

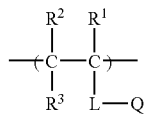

Formula (1)

In the formula, $R^1$, $R^2$, and $R^3$ each independently represents a hydrogen atom or a substituent; L represents a divalent linking group selected from Linking Group as follows:

(Linking Group)

a single bond, —O—, —CO—, —NR$^4$— (wherein $R^4$ represents a hydrogen atom, an alkyl group, an aryl group, or an aralkyl group), —S—, —SO$_2$—, —P(=O)(OR$^5$)— ($R^5$ represents an alkyl group, an aryl group, or an aralkyl group), an alkylene group, and an arylene group;

Q represents a carboxyl group (—COOH) or a salt thereof, a sulfo group (—SO$_3$H) or a salt thereof, or a phosphonoxy group {—OP(=O)(OH)$_2$} or a salt thereof.

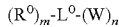　　　　　　　　　　　　　Formula (2)

In the formula, $R^0$ represents an alkyl group, an alkyl group containing a CF$_3$ group at the end thereof, or an alkyl group containing a CF$_2$H group at the end thereof; m represents an integer of 1 or more; plural $R^0$s may be the same or different, provided that at least one $R^0$ represents an alkyl group having a terminal CF$_3$ group or a terminal CF$_2$H group; $L^0$ represents a linking group having a valence of (m+n); W represents a carboxyl group (—COOH) or a salt thereof, a sulfo group (—SO$_3$H) or a salt thereof, a sulfate group (—OSO$_3$H) group or a salt thereof, or a phosphonoxy group {—OP(=O)(OH)$_2$} or a salt thereof; and n represents an integer of 1 or more.

The pyridinium salt is desirably selected from the group represented by the formula (3a) or the formula (3b) shown below.

[Formula 80]

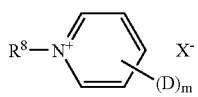　　　　　　　　　　　　　Formula (3a)

In the formula (3a), $R^8$ represents a substituted or non-substituted, alkyl group, alkenyl group, alkynyl group, aralkyl group, aryl group or heterocyclic group; D represents a group capable of hydrogen bonding; m represents an integer from 1 to 3; and X$^{--}$ represents an anion.

[Formula 81]

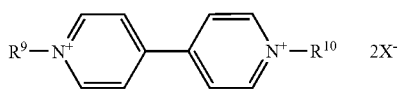　　　　　　　　　　　　　Formula (3b)

In the formula (3b), $R^9$ and $R^{10}$ respectively represent a substituted or non-substitute, alkyl group, alkenyl group, alkynyl group, aralkyl group, aryl group or heterocyclic group; and X$^-$ represents an anion.

[Formula 82]

The pyridinium salt represented by the formula (3a) is more desirably selected from the group represented by a formula (4).

Formula (4)

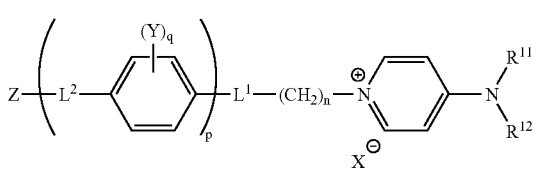

In the formula (4), $L^1$ and $L^2$ respectively represent a divalent linking group or a single bond; Y represents a substituent capable of binding to phenyl other than a hydrogen atom; Z represents a hydrogen atom, a substituted or non-substituted aliphatic hydrocarbon group or a substitute or non-substituted aryl group; $R^{11}$ and $R^{12}$ respectively represent a hydrogen atom, an alkyl group, an aryl group, an acyl group, a carboamyl group, a hydroxyl group or an amino group, and $R^{11}$ and $R^{12}$ may bind to each other to from a ring; n and p respectively represent an integer from 1 to 10, q is an integer from 0 to 4; and When p is 2 or more, $L^2$, Y or q included in each repeating unit may be same or different each other; X$^-$ represents an anion.

The preferred scopes and the specific examples of the formulae (1), (2), (3a), (3b) and (4) are same as those described foe the composition of the present invention.

The polymer used for producing the alignment layer is desirably selected, but not to be limited to, polyvinyl alcohol derivatives.

EXAMPLES

The characteristic features of the invention will be more specifically described below with reference to the following Examples and Comparative Examples. The materials, amounts of use, proportions, treatment contents, treatment procedures, and the like as shown in the following Examples and Comparative Examples can be properly changed so far as the gist of the invention is not deviated. Accordingly, it should not be construed that the scope of the invention is limited to the following specific examples.

<Preparation of IPS Mode Liquid Crystal Cell 1>

As shown in FIG. 1, electrodes (2 and 3 in FIG. 1) were disposed at a distance between the electrodes adjacent to each other of 20 μm on one sheet of a glass substrate, and a polyimide film was provided as an alignment layer thereon, followed by performing a rubbing treatment. The rubbing treatment was performed to the direction 4 as shown in FIG. 1. A polyimide film was provided on one surface of one sheet of a separately prepared glass substrate and subjected to a rubbing treatment to form an alignment layer. The two sheets of glass substrates were superimposed and stuck at a gap (d) between the substrates of 3.9 μm while facing the alignment layers each other such that the rubbing directions of the two sheets of glass substrates were parallel to each other, and a nematic liquid crystal composition having a refractive index anisotropy (Δn) of 0.0769 and a dielectric anisotropy (Δε) of +4.5 was then enclosed. A d·Δn value of the liquid crystal layer was 300 nm.

<Preparation of First Retardation Region 1, First Retardation Region 2 and First Retardation Region 3>

The following composition was charged in a mixing tank and stirred under heating to dissolve the respective components, thereby preparing a cellulose acetate solution. The subject solution was filtered under a pressure of not more than 0.5 MPa (5 kg/cm$^2$) by using filter paper (No. 63, manufactured by Advantec) having a retained particle size of 4 μm and a filtration time of 35 seconds.

| Composition of cellulose acetate solution | |
|---|---|
| Cellulose acetate having a degree of acetylation of 60.9% (degree of polymerization: 300, Mn/Mw = 1.5): | 100 parts by mass |
| Triphenyl phosphate (plasticizer): | 7.8 parts by mass |
| Biphenyldiphenyl phosphate (plasticizer): | 3.9 parts by mass |
| Methylene chloride (first solvent): | 300 parts by mass |
| Methanol (second solvent): | 54 parts by mass |
| 1-Butanol (third solvent): | 11 parts by mass |

In another mixing tank, 8 parts by mass of the following retardation enhancer A, 10 parts by mass of the following retardation enhancer B, 0.28 parts by mass of a silicon dioxide fine particle (mean particle size: 0.1 μm), 80 parts by mass of methylene chloride, and 20 parts by mass of methanol were charged and stirred under heating to prepare a retardation enhancer solution (also serving as a fine particle dispersion). With 474 parts by mass of the cellulose acetate solution, 40 parts by mass of the subject retardation enhancer solution was mixed, and the mixture was thoroughly stirred to prepare a dope.

[Formula 83]

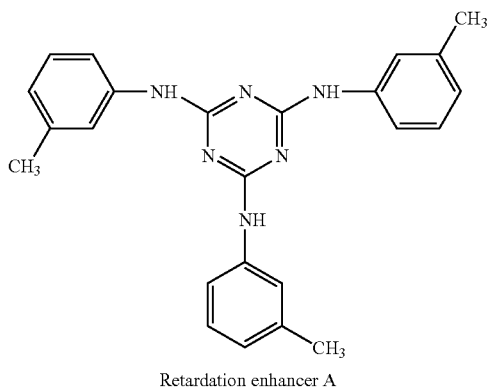

Retardation enhancer A

[Formula 84]

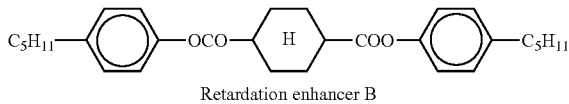

Retardation enhancer B

The resulting dope was cast by using a band casting machine. A film having a residual solvent amount of 15% by mass was transversally stretched in a stretching ratio of 20% under a condition at 130° C. by using a tenter and held at 50° C. for 30 seconds while keeping the width after stretching, and a clip was then eliminated to prepare a cellulose acetate film. At the time of completion of stretching, the residual solvent amount was 5% by mass. The film was further dried to prepare a film having a residual solvent amount of less than 0.1% by mass.

The thus obtained film (first retardation region 1) had a thickness of 80 μm. With respect to the thus prepared first retardation region 1, the light incident angle dependency of Re was measured by using an automatic birefringence analyzer (KOBRA-21 ADH, manufactured by Oji Scientific Instruments). As a result, Re was 70 nm, and Rth was 175 nm. Thus, it was noted that Nz was 3.0.

In another mixing tank, 16 parts by mass of the foregoing retardation enhancer A, 8 parts by mass of the foregoing retardation agent B, 0.28 parts by mass of a silicon dioxide fine particle (mean particle size: 0.1 μm), 80 parts by mass of methylene chloride, and 20 parts by mass of methanol were charged and stirred under heating to prepare a retardation enhancer solution (also serving as a fine particle dispersion). With 474 parts by mass of the cellulose acetate solution, 45 parts by mass of the subject retardation enhancer solution was mixed, and the mixture was thoroughly stirred to prepare a dope, followed by performing film formation in the same manner as in the foregoing first retardation region 1. The thus obtained film (first retardation region 2) had a thickness of 80 μm. With respect to the thus prepared first retardation region 2, the light incident angle dependency of Re was measured by using an automatic birefringence analyzer (KOBRA-21ADH, manufactured by Oji Scientific Instruments). As a result, Re was 60 nm, and Rth was 210 nm. Thus, it was noted that Nz was 4.0.

In another mixing tank, 18 parts by mass of the foregoing retardation enhancer A, 0.28 parts by mass of a silicon dioxide fine particle (mean particle size: 0.1 μm), 80 parts by mass of methylene chloride, and 20 parts by mass of methanol were charged and stirred under heating to prepare a retardation enhancer solution (also serving as a fine particle dispersion). With 474 parts by mass of the cellulose acetate solution, 25 parts by mass of the subject retardation enhancer solution was mixed, and the mixture was thoroughly stirred to prepare a dope, followed by performing film formation in the same manner as in the foregoing first retardation region 1 except for changing the stretching ratio to 23%. The thus obtained film (first retardation region 3) had a thickness of 80 μm. With respect to the thus prepared first retardation region 3, the light incident angle dependency of Re was measured by using an automatic birefringence analyzer (KOBRA-21ADH, manufactured by Oji Scientific Instruments). As a result, Re was 35 nm, and Rth was 135 nm. Thus, it was noted that Nz was 4.4.

<Preparation of Second Retardation Regions 1 to 9>

The surface of each of the thus prepared first retardation region 1, the first retardation region 2 and the first retardation region 3 was subjected to a saponification treatment, and a coating liquid for preparing an alignment layer having the following composition was coated in an amount of 20 mL/m² on this film by using a wire bar coater. The coated film was dried by warm air at 60° C. for 60 seconds and additionally by warm air at 100° C. for 120 seconds to form a film. Next, the formed film was subjected to a rubbing treatment in the direction parallel to the slow axis direction of the film to obtain an alignment layer.

| Composition of coating liquid for alignment layer | |
|---|---|
| Modified polyvinyl alcohol as described below: | 10 parts by mass |
| Water: | 371 parts by mass |
| Methanol: | 119 parts by mass |
| Glutaldehyde: | 0.5 parts by mass |

Modified polyvinyl alcohol
[Formula 85]

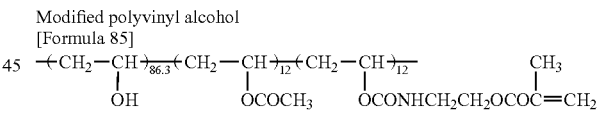

Next, 3.8 g of the following rod-like liquid crystalline compound, 0.06 g of a photopolymerization initiator (IRGACURE 907, manufactured by Ciba Speciality Chemicals), 0.02 g of a sensitizer (KAYACURE DETX, manufactured by Nippon Kayaku Co., Ltd.), 0.076 g of each of the following onium salts, and 0.002 g of each of the following vertically aligning agents at an air interface were dissolved in 9.2 g of methyl ethyl ketone to prepare solutions (coating liquids Nos. 2-1 to 2-9 as shown in Table 1). Each of these coating liquids was coated on the surface of the foregoing alignment layer by using a wire bars having a size number as shown in Table 2. The resulting film was stuck on a metallic frame and heated in a thermostat at 100° C. for 2 minutes, thereby aligning the rod-like liquid crystalline compound. Next, the rod-like liquid crystalline compound was crosslinked upon UV irradiation at 80° C. for 20 seconds by a high pressure mercury vapor lamp of 120 W/cm and then allowed to stand for cooling to room temperature, thereby preparing an optically anisotropic layer.

[Formula 86]

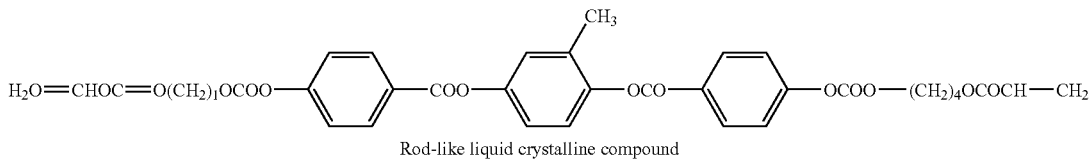

Rod-like liquid crystalline compound

[Formula 87]

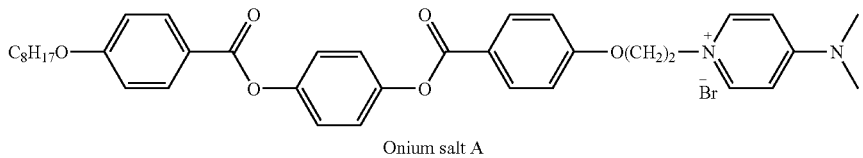

Onium salt A

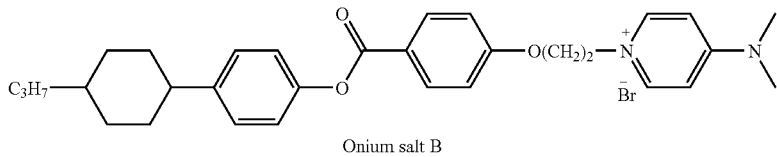

Onium salt B

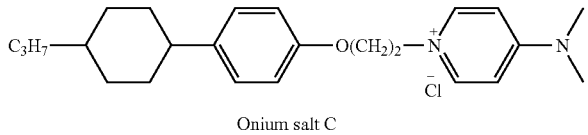

Onium salt C

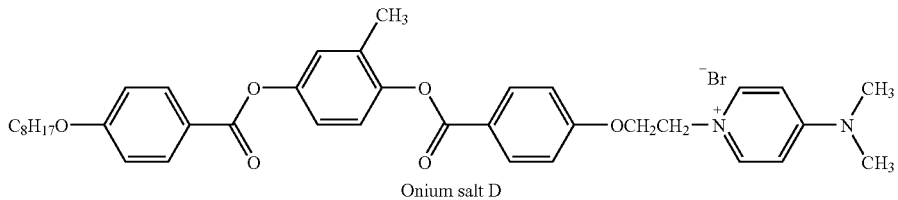

Onium salt D

[Formula 88]

Vertically aligning agent at an air interface (wherein a, b, and c are each a mass ratio)

TABLE 1

| Film No. | Coating liquid No. | Onium salt | Vertically aligning agent at an air interface |
|---|---|---|---|
| Second retardation region 1 | 2-1 | A | Compound P-27 |
| Second retardation region 2 | 2-2 | B | Compound I-48 |
| Second retardation region 3 | 2-3 | C | Compound P-27 |
| Second retardation region 4 | 2-4 | B | Compound I-48 |
| Second retardation region 5 | 2-5 | A | Compound P-27 |
| Second retardation region 6 | 2-6 | A | — |
| Second retardation region 7 | 2-7 | — | Compound P-27 |

TABLE 1-continued

| Second retardation region 8 | 2-8 | D | Compound P-27 |
|---|---|---|---|
| Second retardation region 9 | 2-9 | D | Compound P-22 |

P-27

$$-(CH_2-CH)_a-(CH_2-CH)_b-(CH_2-CH)_c-$$
$$\phantom{-(CH_2-}COOCH_2CH_2(CF_2)_6F \quad COO(C_3H_6O)_6H \quad COOH$$

$a = 40$ $b = 55$ $c = 5$

I-48

$$\begin{array}{c} SO_3H \\ \\ \\ O(CH_2)_2O(CH_2)_2C_6F_{13} \\ O(CH_2)_2O(CH_2)_2C_6F_{13} \end{array}$$

TABLE 2

| Film No. | Retardation layer formed of rod-like liquid crystal Second retardation region | Substrate First retardation region | Size number of wire bar |
|---|---|---|---|
| Retardation film 1 | Second retardation region 1 | First retardation region 1 | #4.5 |
| Retardation film 2 | Second retardation region 2 | First retardation region 1 | #3.6 |
| Retardation film 3 | Second retardation region 3 | First retardation region 2 | #6.0 |
| Retardation film 4 | Second retardation region 4 | First retardation region 1 | #3.4 |
| Retardation film 5 | Second retardation region 5 | First retardation region 3 | #6.0 |
| Retardation film 6 | Second retardation region 6 | First retardation region 3 | #6.0 |
| Retardation film 7 | Second retardation region 7 | First retardation region 3 | #6.0 |
| Retardation film 8 | Second retardation region 8 | First retardation region 1 | #4.5 |
| Retardation film 9 | Second retardation region 9 | First retardation region 1 | #4.5 |

The retardation films 6 and 7 did not exhibit an extinction position, and a schlieren defect was observed in each of the second retardation regions thereof. The second retardation regions 6 and 7 are each an optically anisotropic layer as formed by using a coating liquid in which either one of the onium salt or the vertically aligning agent at an air interface is not added. It was noted from this result that both the onium salt and the vertically aligning agent at an air interface are necessary for the vertical alignment of a rod-like liquid crystalline compound.

Incidentally, by measuring the light incident angle dependency of Re of the prepared film by using an automatic birefringence analyzer (KOBRA-21 ADH, manufactured by Oji Scientific Instruments) and subtracting a previously measured contribution part of the support therefrom, the optical characteristics of only the second retardation region were calculated. As a result, the second retardation region 1 had an Re of 0 nm and an Rth of −225 nm; the second retardation region 2 had an Re of 0 nm and an Rth of −180 nm; the second retardation region 3 had an Re of 0 nm and an Rth of −295 nm; the second retardation region 4 had an Re of 0 nm and an Rth of −170 nm; the second retardation region 5 had an Re of 0 nm and an Rth of −292 nm; the second retardation region 8 had an Re of 0 nm and an Rth of −226 nm; and the second retardation region 9 had an Re of 0 nm and an Rth of −297 nm, respectively. Thus, it was confirmed that the rod-like liquid crystal was aligned approximately vertically in all of the cases.

<Preparation of Polarizing Plate Protective Film 1>

The following composition was charged in a mixing tank and stirred under heating to dissolve the respective components, thereby preparing a cellulose acetate solution A.

| <Composition of cellulose acetate solution A> | |
|---|---|
| Cellulose acetate having a degree of substitution of 2.86: | 100 parts by mass |
| Triphenyl phosphate (plasticizer): | 7.8 parts by mass |
| Biphenyldiphenyl phosphate (plasticizer): | 3.9 parts by mass |
| Methylene chloride (first solvent): | 300 parts by mass |
| Methanol (second solvent): | 54 parts by mass |
| 1-Butanol (third solvent): | 11 parts by mass |

The following composition was charged in a separate mixing tank and stirred under heating to dissolve the respective components, thereby preparing an additive solution B-1.

| <Composition of additive solution B-1> | |
|---|---|
| Methylene chloride: | 80 parts by mass |
| Methanol: | 20 parts by mass |
| Retardation lowering agent as described below: | 40 parts by mass |

[Formula 89]
Retardation lowering agent

To 477 parts by mass of the cellulose acetate solution A, 40 parts by mass of the additive solution B-1 was added, and thoroughly stirred to prepare a dope. The dope was cast on a drum as cooled at 0° C. from a casting nozzle. The film was peeled off in the state that a solvent content was 70% by mass, and the both ends in the width direction of the film were fixed by a pin tenter (a pin tenter as described in FIG. 3 of TOKKAI No. hei 4-1009) and dried while keeping a gap such that the stretching ratio in the transversal direction (the vertical direction to the machine direction) became 3% in the state of a solvent content of from 3 to 5% by mass. Thereafter, the resulting film was further dried by delivering it between rolls of a heat treatment device, thereby preparing a polarizing plate protective film 1 having a thickness of 80 µm.

By using an automatic birefringence analyzer (KOBRA-21ADH, manufactured by Oji Scientific Instruments), the light incident angle dependency of Re was measured to calculate its optical characteristics. As a result, it could be confirmed that Re and Rth were 1 nm and 6 nm, respectively.

<Preparation of Polarizing Plate A>

Next, iodine was adsorbed on a stretched polyvinyl alcohol film to prepare a polarizing film, and a commercially available cellulose acetate film (FUJITAC TD80UF, manufactured by Fuji Photo Film Co., Ltd., Re=3 nm, Rth=45 µm) was subjected to a saponification treatment and stuck onto one surface of the polarizing film using a polyvinyl alcohol based adhesive, thereby forming a polarizing plate A.

<Preparation of Polarizing Plate B>

Iodine was adsorbed on a stretched polyvinyl alcohol film to prepare a polarizing film, and a commercially available cellulose acetate film (FUJITAC TD80UF, manufactured by Fuji Photo Film Co., Ltd.) was subjected to a saponification treatment and stuck onto the both surfaces of the polarizing film using a polyvinyl alcohol based adhesive, thereby forming a polarizing plate B.

<Preparation of Polarizing Plate C>

A polarizing film was prepared in the same manner, and a commercially available cellulose acetate film (FUJITAC TD80UF, manufactured by Fuji Photo Film Co.) was subjected to a saponification treatment and stuck onto one surface of the polarizing film using a polyvinyl alcohol based adhesive. In addition, the polarizing plate protective film 1 as prepared previously was stuck onto the other surface of the polarizing film in the same manner, thereby forming a polarizing plate C.

<Preparation of Polarizing Plate D>

A polarizing film was prepared in the same manner, and a commercially available cellulose acetate film (FUJITAC TD80UF, manufactured by Fuji Photo Film Co.) was subjected to a saponification treatment and stuck onto one surface of the polarizing film using a polyvinyl alcohol based adhesive. In addition, a commercially available cellulose acetate film (FUJITAC T40UZ, manufactured by Fuji Photo Film Co., Ltd., Re=1 nm, Rth=35 nm) was subjected to a saponification treatment and stuck onto the other surface of the polarizing film using a polyvinyl alcohol based adhesive in the same manner, thereby forming a polarizing plate D.

<Preparation of Polarizing Plate E>

A polarizing plate E was formed in the same manner as in the polarizing plate C, except for using ZEONOA ZF14 (manufactured by Zeon Corporation, Re=5 nm, Rth=5 nm) in place of the polarizing plate protective film 1.

Example 1

The retardation film 1 as prepared previously was stuck onto the polarizing plate A in the side of the polarizing film, onto which the cellulose acetate film was not stuck, using a polyvinyl alcohol based adhesive so that the first retardation region 1 was disposed at the polarizing film side and the transmission axis of the polarizing film and the slow axis of the first retardation region 1 were parallel to each other, thereby forming a polarizing plate 1.

This polarizing plate 1 was stuck onto one side of the IPS mode liquid crystal cell 1 as prepared previously so that the slow axis of the first retardation region 1 was parallel to the rubbing direction of the liquid crystal cell (namely, the slow axis of the first retardation region 1 was parallel to the slow axis of the liquid crystal molecules of the liquid crystal cell in a black state) and the second retardation region 1 was disposed at the liquid crystal cell side.

Subsequently, the polarizing plate C was stuck onto the other side of the IPS mode liquid crystal cell 1 so that the polarizing plate protective film 1 was disposed at the liquid crystal cell side and the polarizing plate C was disposed under cross nicols against the polarizing plate 1, thereby preparing a liquid crystal display device. Light leakage of the thus prepared liquid crystal display device was measured. When observed in the left oblique direction at 60°, the light leakage was 0.06%.

Example 2

The retardation film 2 as prepared previously was stuck onto the polarizing plate A in the side of the polarizing film, onto which the cellulose acetate film was not stuck, using a polyvinyl alcohol based adhesive so that the first retardation region 1 was disposed at the polarizing film side and the transmission axis of the polarizing film and the slow axis of the first retardation region 1 were parallel to each other, thereby forming a polarizing plate 2.

This polarizing plate 2 was stuck onto one side of the IPS mode liquid crystal cell 1 as prepared previously so that the slow axis of the first retardation region 1 was parallel to the rubbing direction of the liquid crystal cell (namely, the slow axis of the first retardation region 1 was parallel to the slow axis of the liquid crystal molecules of the liquid crystal cell in a black state) and the second retardation region 2 was disposed at the liquid crystal cell side.

Subsequently, the polarizing plate D was stuck onto the other side of the IPS mode liquid crystal cell 1 so that the film T40UZ was disposed at the liquid crystal cell side and the polarizing plate D was disposed under cross nicols against the polarizing plate 2, thereby preparing a liquid crystal display device. Light leakage of the thus prepared liquid crystal display device was measured. When observed in the left oblique direction at 60°, the light leakage was 0.07%.

Example 3

The retardation film 3 as prepared previously was stuck onto the polarizing plate B using an acrylic resin based adhesive so that the second retardation region 3 was disposed at the polarizing film side and the transmission axis of the polarizing film and the slow axis of the first retardation region 2 were orthogonal to each other, thereby forming a polarizing plate 3.

This polarizing plate 3 was stuck onto one side of the IPS mode liquid crystal cell 1 as prepared previously so that the slow axis of the first retardation region 2 was orthogonal to the rubbing direction of the liquid crystal cell (namely, the slow axis of the first retardation region 2 was orthogonal to the slow axis of the liquid crystal molecules of the liquid crystal cell in a black state) and the first retardation region 2 was disposed at the liquid crystal cell side.

Subsequently, the polarizing plate C was stuck onto the other side of the IPS mode liquid crystal cell 1 so that the polarizing plate protective film 1 was disposed at the liquid crystal cell side and the polarizing plate C was disposed under cross nicols against the polarizing plate 3, thereby preparing a liquid crystal display device. Light leakage of the thus prepared liquid crystal display device was measured. When observed in the left oblique direction at 60°, the light leakage was 0.08%.

Example 4

The film retardation 4 as prepared previously was stuck onto the polarizing plate C using an acrylic resin based adhesive so that the second retardation region 4 was disposed at the polarizing film side and the transmission axis of the polarizing film and the slow axis of the first retardation region 1 were orthogonal to each other, thereby forming a polarizing plate 4.

This polarizing plate 4 was stuck onto one side of the IPS mode liquid crystal cell 1 as prepared previously so that the slow axis of the first retardation region 1 was orthogonal to the rubbing direction of the liquid crystal cell (namely, the slow axis of the first retardation region 1 was orthogonal to the slow axis of the liquid crystal molecules of the liquid crystal cell in a black state) and the first retardation region 1 was disposed at the liquid crystal cell side.

Subsequently, the polarizing plate B was stuck onto the other side of the IPS mode liquid crystal cell 1 so that it was disposed under cross nicols against the polarizing plate 4, thereby preparing a liquid crystal display device. Light leakage of the thus prepared liquid crystal display device was measured. When observed in the left oblique direction at 60°, the light leakage was 0.10%.

Example 5

The retardation film 6 was stuck in the ZEONOA side of the polarizing plate E using an acrylic resin based adhesive so that the second retardation region 6 was disposed at the polarizing film side and the transmission axis of the polarizing film and the slow axis of the first retardation region 1 were orthogonal to each other, thereby forming a polarizing plate 6.

Using this polarizing plate 6, a liquid crystal display device was prepared in the same manner as in Example 4, and light leakage was measured. When observed in the left oblique direction at 60°, the light leakage was 0.15%.

Example 6

The first retardation region 3 was stuck onto the polarizing plate A using a polyvinyl alcohol based adhesive so that its slow axis was parallel to the transmission axis of the polarizing film. Next, the film retardation 5 was stuck onto the first retardation region 3 having the polarizing plate A stuck thereonto using an acrylic resin based adhesive so that the first retardation region 3 was disposed at the side of the stuck first retardation region 3 and the transmission axis of the polarizing film of the polarizing plate A and the slow axis of the first retardation region 3 were parallel to each other, thereby forming a polarizing plate 5. In this case, the first retardation region is composed of a laminate of two sheets of first retardation regions 3 (Re=35 nm, Rth=135 nm) and has optical characteristics of Re=70 nm, Rth=270 nm and Nz=4.4 as a retardation region.

This polarizing plate 5 was stuck onto one side of the IPS mode liquid crystal cell 1 as prepared previously so that the slow axis of the first retardation region 3 was parallel to the rubbing direction of the liquid crystal cell (namely, the slow axis of the first retardation region 3 was parallel to the slow axis of the liquid crystal molecules of the liquid crystal cell in a black state) and the second retardation region 3 was disposed at the liquid crystal cell side.

Subsequently, the polarizing plate D was stuck onto the other side of the IPS mode liquid crystal cell 1 so that the film T40UZ was disposed at the liquid crystal cell side and the polarizing plate D was disposed under cross nicols against the polarizing plate 2, thereby preparing a liquid crystal display device. Light leakage of the thus prepared liquid crystal display device was measured. When observed in the left oblique direction at 60°, the light leakage was 0.13%.

Example 7

A polarizing plate 7 was prepared in the same manner as in the preparation of the polarizing plate 1 as described in Example 1, except for using the retardation film 8 in the place of the retardation film 1. In addition, the polarizing plate 7 was stuck onto a liquid crystal cell in the same manner as described in Example 1, thereby preparing a liquid crystal display device. Leaked light of the thus prepared liquid crystal display device was measured. When observed in the left oblique direction at 60°, the light leakage was 0.05%.

Example 8

A polarizing plate 8 was prepared in the same manner as in the preparation of the polarizing plate 1 as described in Example 1, except for using the retardation film 9 in the place of the retardation film 1. In addition, the polarizing plate 8 was stuck onto a liquid crystal cell in the same manner as described in Example 1, thereby preparing a liquid crystal display device. Light leakage of the thus prepared liquid crystal display device was measured. When observed in the left oblique direction at 60°, the light leakage was 0.04%.

Comparative Example 1

A commercially available polarizing plate (HLC2-5618, manufactured by Sanritz Corporation) was stuck onto the both sides of the IPS mode liquid crystal cell 1 as prepared previously in the cross nicols disposition to prepare a liquid crystal display device. An optical compensation film was not used. In the foregoing liquid crystal display device, the polarizing plates were stuck in the same manner as in Example 1 so that the transposition axis of the upper polarizing plate was parallel to the rubbing direction of the liquid crystal cell. Light leakage of the thus prepared liquid crystal display device was measured. When observed in the left oblique direction at 60°, the light leakage was 0.55%.

Example 9

<Preparation of IPS Mode Liquid Crystal Cell 1-2>

As shown in FIG. 1, electrodes (2 and 3 in FIG. 1) were disposed at a distance between the electrodes adjacent to each other of 20 μm on one sheet of a glass substrate, and a polyimide film was provided as an alignment layer thereon, followed by performing a rubbing treatment. The rubbing treatment was performed to the direction 4 as shown in FIG. 1. A polyimide film was provided on one surface of one sheet of a separately prepared glass substrate and subjected to a rubbing treatment to form an alignment layer. The two sheets of glass substrates were superimposed and stuck at a gap (d) between the substrates of 3.9 μm while facing the alignment layers each other such that the rubbing directions of the two sheets of glass substrates were parallel to each other, and a nematic liquid crystal composition having a refractive index anisotropy (Δn) of 0.0769 and a dielectric anisotropy (Δε) of +4.5 was then enclosed. A d·Δn value of the liquid crystal layer was 300 nm.

<Preparation of First Retardation Film 1-2>

The following composition was charged in a mixing tank and stirred under heating to dissolve the respective components, thereby preparing a cellulose acetate solution. The subject solution was filtered under a pressure of not more than 5 kg/cm² by using filter paper (No. 63, manufactured by Advantec) having a retained particle size of 4 μm and a filtration time of 35 seconds.

| [Composition of cellulose acetate solution] | |
|---|---|
| Cellulose acetate having a degree of acetylation of 60.9% (degree of polymerization: 300, Mn/Mw = 1.5): | 100 parts by mass |
| Triphenyl phosphate (plasticizer): | 7.8 parts by mass |
| Biphenyldiphenyl phosphate (plasticizer): | 3.9 parts by mass |
| Methylene chloride (first solvent): | 300 parts by mass |
| Methanol (second solvent): | 54 parts by mass |
| 1-Butanol (third solvent): | 11 parts by mass |

In another mixing tank, 8 parts by mass of the following retardation enhancer A, 10 parts by mass of the following retardation enhancer B, 0.28 parts by mass of a silicon dioxide fine particle (mean particle size: 0.1 μm), 80 parts by mass of methylene chloride, and 20 parts by mass of methanol were charged and stirred under heating to prepare a retardation enhancer solution (also serving as a fine particle dispersion). With 474 parts by mass of the foregoing cellulose acetate solution, 40 parts by mass of the foregoing retardation enhancer solution was mixed, and the mixture was thoroughly stirred to prepare a dope.

[Formula 90]

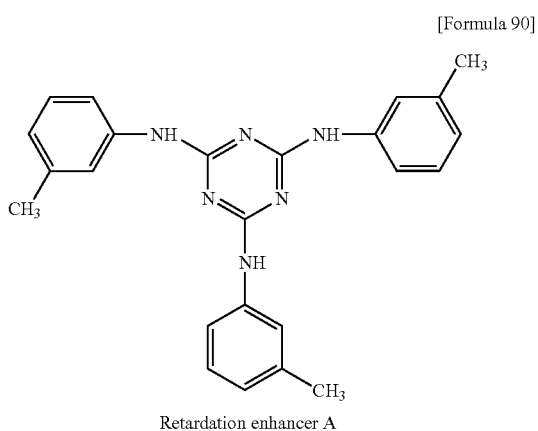

Retardation enhancer A

The resulting dope was cast by using a band casting machine. A film having a residual solvent amount of 15% by mass was transversally stretched in a stretching ratio of 20% under a condition at 130° C. by using a tenter and held at 50° C. for 30 seconds while keeping the width after stretching, and a clip was then eliminated to prepare a cellulose acetate film. At the time of completion of stretching, the residual solvent amount was 5% by mass. The film was further dried to prepare a film having a residual solvent amount of less than 0.1% by mass.

The thus obtained film (first retardation film 1-2) had a thickness of 80 μm. With respect to the thus prepared first retardation film 1, the light incident angle dependency of Re was measured by using an automatic birefringence analyzer (KOBRA-21ADH, manufactured by Oji Scientific Instruments). As a result, Re was 70 nm, and Rth was 175 nm. Thus, it was noted that Nz was 3.0.

<Preparation of Second Retardation Film 1-2>

The surface of the thus prepared first retardation film 1-2 was subjected to a saponification treatment, and a coating liquid for alignment layer having the following composition was coated in an amount of 20 mL/m² on this film by using a wire bar coater. The coated film was dried by warm air at 60° C. for 60 seconds and additionally by warm air at 100° C. for 120 seconds to form a film. Next, the formed film was subjected to a rubbing treatment in the direction parallel to the slow axis direction of the film to obtain an alignment layer.

| [Composition of coating liquid for alignment layer] | |
|---|---|
| Modified polyvinyl alcohol (AL-1) as described below: | 10 parts by mass |
| Pyridinium salt as described below: | 0.1 parts by mass |
| Water: | 371 parts by mass |
| Methanol: | 119 parts by mass |
| Glutaldehyde: | 0.5 parts by mass |

[Formula 92]
AL-1 (Modified polyvinyl alcohol)

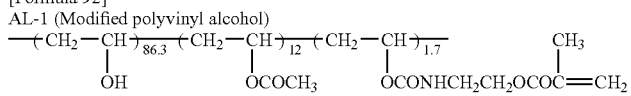

Pyridinium salt

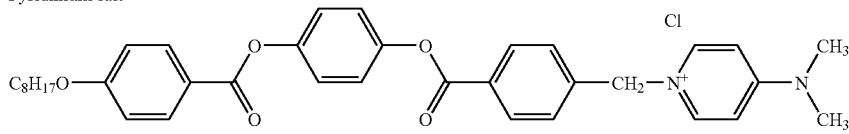

-continued

[Formula 91]

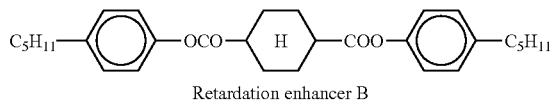

Retardation enhancer B

Next, 3.8 g of the following rod-like liquid crystalline compound A, 0.06 g of a photopolymerization initiator (IRGACURE 907, manufactured by Ciba Speciality Chemicals), 0.02 g of a sensitizer (KAYACURE DETX, manufactured by Nippon Kayaku Co., Ltd.), and 0.002 g of the following vertically aligning agent at an air interface were dissolved in 9.2 g of methyl ethyl ketone to prepare a solution. This solution was coated on the side of the alignment layer of the film having the foregoing alignment layer formed thereon by using a #4.5 wire bar. The resulting film was stuck on a metallic frame and heated in a thermostat at 100° C. for 2 minutes, thereby aligning the rod-like liquid crystalline compound. Next, the rod-like liquid crystalline compound was crosslinked upon UV irradiation at 80° C. for 20 seconds by a high pressure mercury vapor lamp of 120 W/cm and then allowed to stand for cooling to room temperature, thereby forming an optically anisotropic layer. There was thus obtained a retardation film 1-2 having the second retardation film formed on the first retardation film.

[Formula 93]

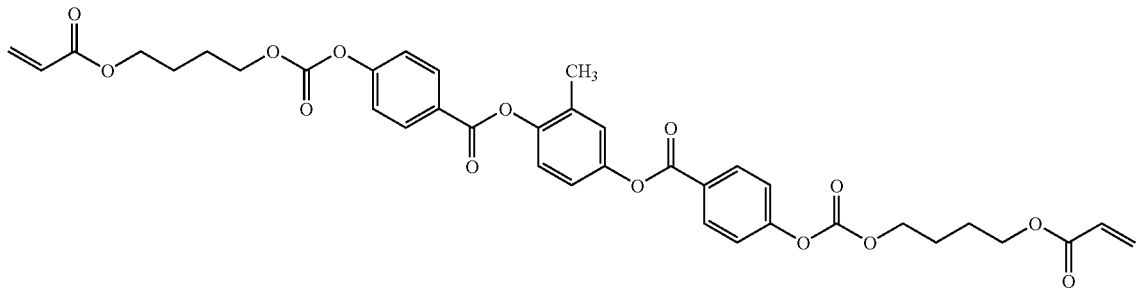

Rod-like liquid crystalline compound A

[Formula 94]

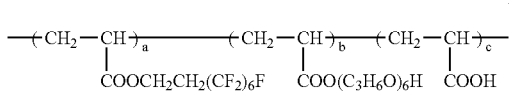

Vertically aligning agent at an air interface
a = 40
b = 55
c = 5

By measuring the light incident angle dependency of Re of the prepared film by using an automatic birefringence analyzer (KOBRA-21ADH, manufactured by Oji Scientific Instruments) and subtracting a previously measured contribution part of the support therefrom, the optical characteristics of only the second retardation film were calculated. As a result, the second retardation film 1-2 had an Re of 0 nm and an Rth of −218 nm. Thus, it was confirmed that the rod-like liquid crystal was aligned approximately vertically.

Also, the thus prepared second retardation film 1-2 was observed by a polarizing microscope to evaluate the alignment state and alignment defects. The number of alignment defects as formed in the optically anisotropic layer was examined through observation by an optical microscope. As a result, the number of point defects (average value within the range of 1.0 mm$^2$) was five within the range of 1.0 mm$^2$.

In addition, with respect to the evaluation of adhesion, a commercially available tape (PET) was stuck on the surface of the film and after 30 seconds, was peeled off, thereby observing the state. The evaluation was made by five grades according to the following criteria. As a result, the adhesion of the second retardation film 1 had a level of A.

A: Not peeled at all
B: 1 to 10% peeled
C: 10 to 30% peeled
D: 30 to 50% peeled
E: 50% or more peeled <Preparation of Polarizing Plate Protective Film 1-2>

The following composition was charged in a mixing tank and stirred under heating to dissolve the respective components, thereby preparing a cellulose acetate solution A.

[Composition of cellulose acetate solution A]

| | |
|---|---|
| Cellulose acetate having a degree of substitution of 2.86: | 100 parts by mass |

-continued

[Composition of cellulose acetate solution A]

| | |
|---|---|
| Triphenyl phosphate (plasticizer): | 7.8 parts by mass |
| Biphenyldiphenyl phosphate (plasticizer): | 3.9 parts by mass |
| Methylene chloride (first solvent): | 300 parts by mass |
| Methanol (second solvent): | 54 parts by mass |
| 1-Butanol (third solvent): | 11 parts by mass |

The following composition was charged in another mixing tank and stirred under heating to dissolve the respective components, thereby preparing an additive solution B-1.

[Composition of additive solution B-1]

| | |
|---|---|
| Methylene chloride: | 80 parts by mass |
| Methanol: | 20 parts by mass |
| Optical anisotropy lowering agent as described below: | 40 parts by mass |

[Formula 95]
Optical anisotropy lowering agent

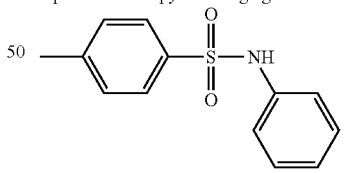

To 477 parts by mass of the cellulose acetate solution A, 40 parts by mass of the additive solution B-1 was added and thoroughly stirred to prepare a dope. The dope was cast on a drum as cooled at 0° C. from a casting nozzle. The film was peeled off in the state that a solvent content was 70% by mass, and the both ends in the width direction of the film were fixed by a pin tenter (a pin tenter as described in FIG. 3 of TOKKAI No. hei 4-1009) and dried while keeping a gap such that the stretching ratio in the transversal direction (the vertical direction to the machine direction) became 3% in the state of a solvent content of from 3 to 5% by mass. Thereafter, the resulting film was further dried by delivering it between rolls of a heat treatment device, thereby preparing a polarizing plate protective film 1-2 having a thickness of 80 μm.

By using an automatic birefringence analyzer (KOBRA-21ADH, manufactured by Oji Scientific Instruments), the light incident angle dependency of Re was measured to calculate its optical characteristics. As a result, it could be confirmed that Re and Rth were 1 nm and 6 nm, respectively (measurement wavelength λ: 589 nm).

<Preparation of Polarizing Plate A-2>

Next, iodine was adsorbed on a stretched polyvinyl alcohol film to prepare a polarizing film, and a commercially available cellulose acetate film (FUJITAC TD80UF, manufactured by Fuji Photo Film Co., Ltd., Re=3 nm, Rth=45 nm) was subjected to a saponification treatment and stuck onto one surface of the polarizing film using a polyvinyl alcohol based adhesive, thereby forming a polarizing plate A-2.

<Preparation of Polarizing Plate B-2>

A polarizing film was prepared in the same maimer, and a commercially available cellulose acetate film (FUJITAC TD80UF, manufactured by Fuji Photo Film Co.) was subjected to a saponification treatment and stuck onto one surface of the polarizing film using a polyvinyl alcohol based adhesive. In addition, the polarizing plate protective film 1 as prepared previously was stuck onto the other surface of the polarizing film in the same manner, thereby forming a polarizing plate B-2.

<Preparation of Liquid Crystal Display Device>

The retardation film 1-2 of the invention as prepared previously was stuck onto the polarizing plate A-2 in the side of the polarizing film, onto which the cellulose acetate film was not stuck, using a polyvinyl alcohol based adhesive so that the first retardation film 1-2 was disposed at the polarizing film side and the transmission axis of the polarizing film and the slow axis of the first retardation film 1-2 were parallel to each other, thereby forming a polarizing plate 1-2.

This polarizing plate 1-2 was stuck onto one side of the IPS mode liquid crystal cell 1-2 as prepared previously so that the slow axis of the first retardation film 1-2 was parallel to the rubbing direction of the liquid crystal cell (namely, the slow axis of the first retardation film 1-2 was parallel to the slow axis of the liquid crystal molecules of the liquid crystal cell in a black state) and the second retardation film 1-2 was disposed at the liquid crystal cell side.

Subsequently, the polarizing plate B-2 was stuck onto the other side of the IPS mode liquid crystal cell 1-2 so that the polarizing plate protective film 1-2 was disposed at the liquid crystal cell side and the polarizing plate B-2 was disposed under cross nicols against the polarizing plate 1-2, thereby preparing a liquid crystal display device. Light leakage of the thus prepared liquid crystal display device was measured. When observed in the left oblique direction at 60°, the light leakage was 0.1%. Incidentally, the leaked light as referred to in this description is one as measured in the following manner.

First of all, the liquid crystal cell 1-2 in the state that polarizing plates were not stuck was placed on a shaukasten unit set up in a dark room and measured as Luminance 1 by using a luminance meter which was set at the position which was in the left direction at the azimuth of 45° with respect to the rubbing direction of the liquid crystal cell and was far by one meter in the direction of 60° rotated from the normal direction of the liquid crystal cell.

Next, the liquid crystal display panel of Example 9 was similarly disposed on the same shaukasten unit and measured for Luminance 2 in the black state in the same manner. A percentage of a measured value, Luminance 2, to Luminance 1 was defined as light leakage.

Example 10

<Preparation of Second Retardation Films 2-2 to 7-2>

Second retardation films 2-2, 3-2 and 4-2 were prepared in the same manner as in the foregoing preparation of the second retardation film 1-2, except for adding the following specific examples (II-1), (II-29) and (41), respectively, to an alignment layer in the place of the foregoing pyridinium salt. Furthermore, as comparative examples, a second retardation film 5-2 was prepared in the same manner, except for not adding the pyridinium salt to the alignment layer; and a second retardation film 6-2 was prepared in the same manner, except for adding the following ammonium salt A in place of the pyridinium salt. In addition, a second retardation film 7-2 was prepared in the same manner as in the second retardation film 5-2, except for using the following vertical alignment layer (AL-2) as the alignment layer. The alignment direction of the rod-like liquid crystal, alignment defect and adhesion of each of the thus prepared retardation films were evaluated in the same manner as in the foregoing second retardation film 1-2. The results obtained are shown in the following Table 3.

[Formula 96]

Pyridinium salt

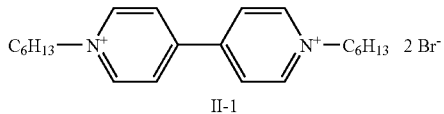

II-1

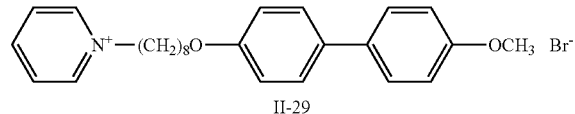

II-29

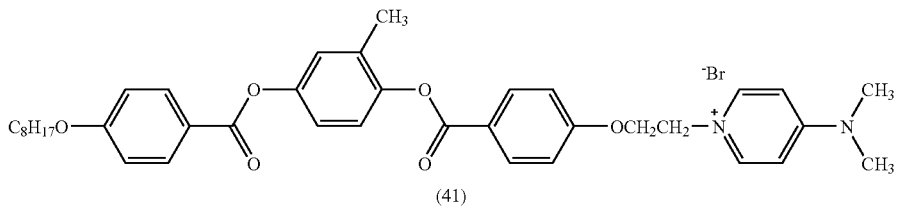

(41)

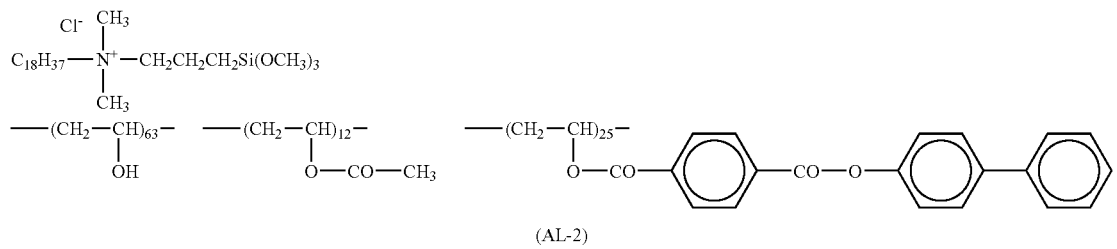

(AL-2)

TABLE 3

| Film No. | Second retardation region 1 | Alignment layer | Pyridinium salt | Alignment of rod-like liquid crystal | Number of alignment defects | Adhesion |
|---|---|---|---|---|---|---|
| Retardation film 1-2 | Second retardation region 1-2 | AL-1 | 28 | Vertically aligned | 5 | A |
| Retardation film 2-2 | Second retardation region 2-2 | AL-1 | II-1 | Vertically aligned | 15 | A |
| Retardation film 3-2 | Second retardation region 3-2 | AL-1 | 11-29 | Vertically aligned | 10 | A |
| Retardation film 4-2 | Second retardation region 4-2 | AL-1 | 41 | Vertically aligned | 2 | A |
| Retardation film 5-2 | Second retardation region 5-2 | AL-1 | — | Horizontally aligned | 5 | A |
| Retardation film 6-2 | Second retardation region 6-2 | AL-1 | Ammonium salt A | Vertically aligned | 30 | B |
| Retardation film 7-2 | Second retardation region 7-2 | AL-2 | — | Vertically aligned | 50 | E |

It is noted from the foregoing results that by using a pyridinium salt as a vertically aligning agent in the alignment layer and a vertically aligning agent at an air interface in the optically anisotropic layer, even when a special polymer is not used, it is possible to prepare a retardation film by using a modified polyvinyl alcohol having high industrial productivity and aligning the rod-like liquid crystal uniformly and vertically with less defects.

Example 11

Polarizing plates 2-2 to 7-2 were prepared in the same manner as in Example 9, except that in Example 9, the retardation films 2-2 to 5-2 of the invention and the comparative retardation films 6-2 and 7-2, prepared in Example 10 respectively, were used in the place of the retardation film 1-2 of the invention. Furthermore, by using these polarizing plates, liquid crystal display devices were prepared in the same manner as in Example 9, and light leakage as observed in the left oblique direction at 60° was measured. The results obtained are shown in the following Table 4.

TABLE 4

| Polarizing plate | Film No. | Second retardation region 1 | Light leakage | Remark |
|---|---|---|---|---|
| Polarizing plate 1-2 | Retardation film 1-2 | Second retardation region 1-2 | 0.10% | Invention |
| Polarizing plate 2-2 | Retardation film 2-2 | Second retardation region 2-2 | 0.12% | Invention |
| Polarizing plate 3-2 | Retardation film 3-2 | Second retardation region 3-2 | 0.11% | Invention |
| Polarizing plate 4-2 | Retardation film 4-2 | Second retardation region 4-2 | 0.08% | Invention |
| Polarizing plate 5-2 | Retardation film 5-2 | Second retardation region 5-2 | 0.55% | Comparison |
| Polarizing plate 6-2 | Retardation film 6-2 | Second retardation region 6-2 | 0.23% | Comparison |
| Polarizing plate 7-2 | Retardation film 7-2 | Second retardation region 7-2 | 0.15% | Comparison |

From the results as shown in Table 4, by using a pyridinium salt as a vertically aligning agent in the alignment layer and using a vertically aligning agent at an air interface in the optically anisotropic layer, it was possible to prepare a liquid crystal display device with less light leakage from the oblique direction.

EXPLANATION OF SIGNS

Figure 1:
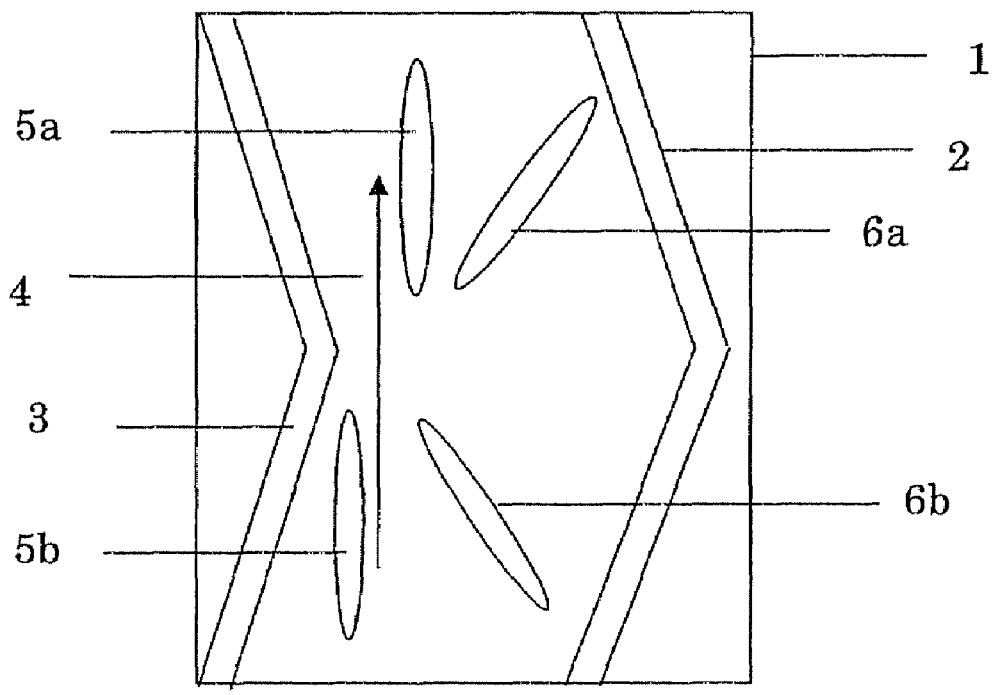
[FIG. 1] is an outline view to show an example of a pixel region of a liquid crystal display device of the invention.
Figure 2:
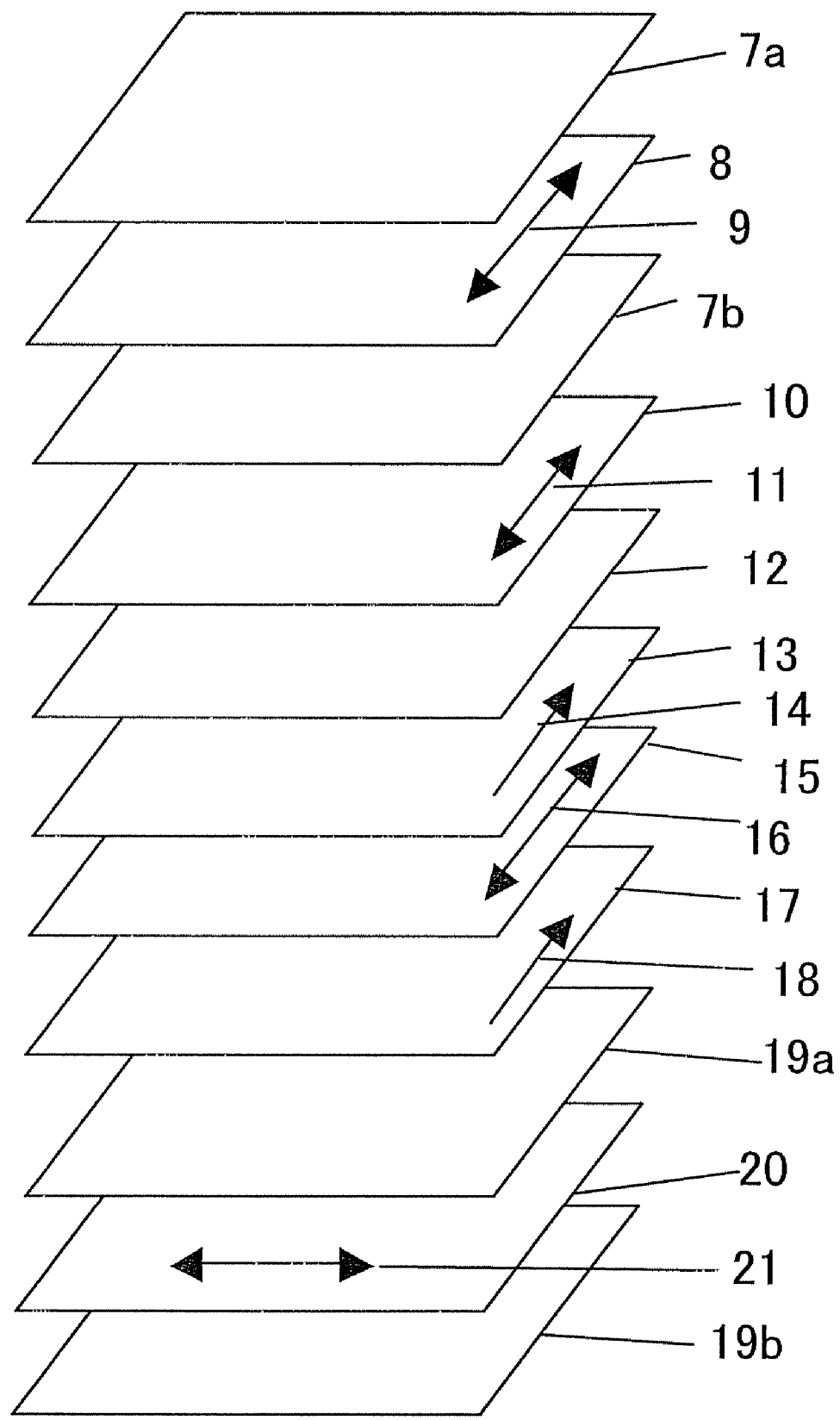
[FIG. 2] is an outline view to show one embodiment of a liquid crystal display device of the invention.
Figure 3:
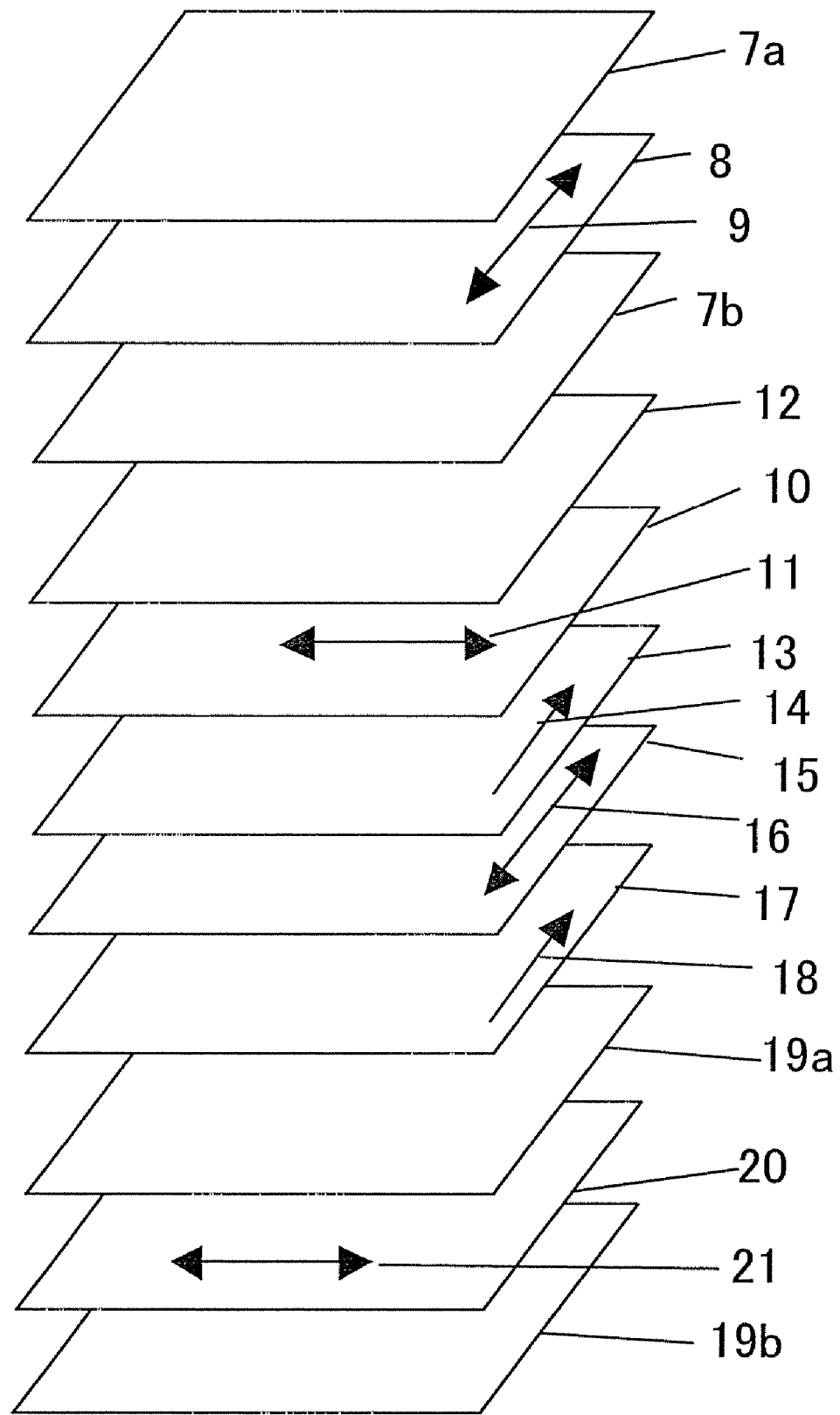
[FIG. 3] is an outline view to show another embodiment of a liquid crystal display device of the invention.

1 Pixel region of liquid crystal element
2 Pixel electrode
3 Display electrode
4 Rubbing direction 5a, 5b Director of liquid crystal compound in a black state
6a, 6b Director of liquid crystal compound at the time of white display
7a, 7b, 19a, 19b Protective film for polarizing film
8, 20 Polarizing film
9, 21 Polarizing transmission axis of polarizing film
10 First retardation region
11 Slow axis of first retardation region
12 Second retardation region
13, 17 Cell substrate
14, 18 Rubbing direction of cell substrate
15 Liquid crystal layer
16 Slow axis direction of liquid crystal layer This application claims benefit of priorities to Japanese Patent Application No. 2004-261898 filed Sep. 9, 2004, and Japanese Patent Application No. 2005-051076 filed Feb. 25, 2005.

The invention claimed is:

1. A liquid crystal composition comprising:
    at least one onium salt,
    at least one rod-like liquid crystalline compound, and
    at least one additive capable of promoting a vertical alignment of molecules of the rod-like liquid crystalline compound at an air interface.

2. The liquid crystal composition of claim 1, wherein the additive is a compound having a fluoroaliphatic group and at least one hydrophilic group selected from the group consisting of a carboxyl group (—COOH), a sulfo group (—SO$_3$H), a sulfate group (—OSO$_3$H), a phosphonoxy group {—OP(=O)(OH)$_2$}, and salts thereof.

3. The liquid crystal composition of claim 1, wherein the additive is a copolymer comprising at least one repeating unit derived from a fluoro-aliphatic group-containing monomer and at least one repeating unit represented by the following formula (1):

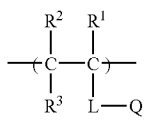

Formula (1)

wherein R$^1$, R$^2$, and R$^3$ each independently represents a hydrogen atom or a substituent; L represents a divalent linking group selected from Linking Group shown below or a divalent linking group consisting of two or more selected from Linking Group shown below;
(Linking Group)
a single bond, —O—, —CO—, —NR$^4$— where R$^4$ represents a hydrogen atom, an alkyl group, an aryl group or an aralkyl group, —S—, —SO$_2$—, —P(=O)(OR$^5$)— where R$^5$ represents an alkyl group, an aryl group or an aralkyl group, an alkylene group and an arylene group; and
Q represents a carboxyl group (—COOH) or a salt thereof, a sulfo group (—SO$_3$H) or a salt thereof, or a phosphonoxy group {—OP(=O)(OH)$_2$} or a salt thereof.

4. The liquid crystal composition of claim 1 wherein the additive is a compound represented by the following formula (2):

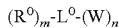

Formula (2)

wherein R$^0$ represents an alkyl group, an alkyl group having a terminal CF$_3$ group or an alkyl group having a terminal CF$_2$H group; m represents an integer of 1 or more; plural R$^0$s may be the same or different, provided that at least one R$^0$ represents an alkyl group having a terminal CF$_3$ group or a terminal CF$_2$H group; L$^0$ represents a linking group having a valence of (m+n); W represents a carboxyl group (—COOH) or a salt thereof, a sulfo group (—SO$_3$H) or a salt thereof, a sulfate group (—OSO$_3$H) group or a salt thereof, or a phosphonoxy group {—OP(=O)(OH)$_2$} or a salt thereof; and n represents an integer of 1 or more.

5. The liquid crystal composition of claim 1, wherein the onium salt is a quaternary ammonium salt.

6. The liquid crystal composition of claim 1, wherein the onium salt is a compound represented by the following formula (3a) or (3b):

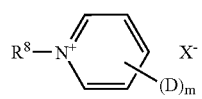

Formula (3a)

wherein R$^8$ represents a substituted or non-substituted alkyl, alkenyl, alkynyl, aralkyl, aryl or heterocyclic group; D represents a group capable of hydrogen bonding; m represents an integer of from 1 to 3; and X$^-$ represents an anion;

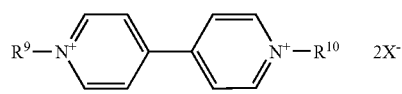

Formula (3b)

wherein R$^9$ and R$^{10}$ each represents a substituted or non-substituted alkyl, alkenyl, alkynyl, aralkyl, aryl or heterocyclic group; and X$^-$ represents an anion.

7. An optical compensation film comprising an optically anisotropic layer formed of a liquid crystal composition of claim 1.

8. The optical compensation film of claim 7, wherein molecules of the rod-like liquid crystalline compound are aligned substantially vertically in the optically anisotropic layer.

9. An optical compensation film comprising:
    an alignment layer comprising at least one polymer and at least one onium salt and
    an optically anisotropic layer formed of a composition comprising at least one rod-like liquid crystalline compound and at least one compound selected from compounds represented by a following formula (1) or a following formula (2):

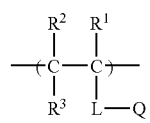

Formula (1)

wherein R$^1$, R$^2$, and R$^3$ each independently represents a hydrogen atom or a substituent; L represents a divalent linking group selected from Linking Group sown below or a divalent linking group consisting of two or more selected from Linking Group shown below;

(Linking Group)

a single bond, —O—, —CO—, —NR$^4$— where R$^4$ represents a hydrogen atom, an alkyl group, an aryl group or an aralkyl group, —S—, —SO$_2$—, —P(=O)(OR$^5$)— where R$^5$ represents an alkyl group, an aryl group or an aralkyl group, an alkylene group and an arylene group; and Q represents a carboxyl group (—COOH) or a salt thereof, a sulfo group (—SO$_3$H) or a salt thereof, or a phosphonoxy group {—OP(=O)(OH)$_2$} or a salt thereof;

$$(R^0)_m\text{-}L^0\text{-}(W)_n \qquad \text{Formula (2)}$$

wherein R$^0$ represents an alkyl group, an alkyl group having a terminal CF$_3$ group or an alkyl group having a terminal CF$_2$H group; m represents an integer of 1 or more; plural R$^0$s may be the same or different, provided that at least one R$^0$ represents an alkyl group having a terminal CF$_3$ group or a terminal CF$_2$H group; L$^0$ represents a linking group having a valence of (m+n); W represents a carboxyl group (—COOH) or a salt thereof, a sulfo group (—SO$_3$H) or a salt thereof, a sulfate group (—OSO$_3$H) group or a salt thereof, or a phosphonoxy group {—OP(=O)(OH)$_2$} or a salt thereof; and n represents an integer of 1 or more.

10. The optical compensation film of claim 9, wherein the onium salt is at least one compound selected from compounds represented by a formula (3a) or a following formula (3b):

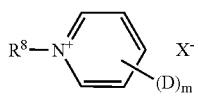

Formula (3a)

wherein R$^8$ represents a substituted or non-substituted alkyl, alkenyl, alkynyl, aralkyl, aryl or heterocyclic group; D represents a group capable of hydrogen bonding; m represents an integer of from 1 to 3; and X$^-$ represents an anion;

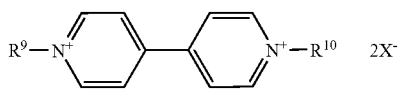

Formula (3b)

wherein R$^9$ and R$^{10}$ each represents a substituted or non-substituted alkyl, alkenyl, alkynyl, aralkyl, aryl or heterocyclic group; and X represents an anion.

11. The optical compensation film of claim 9, wherein the onium salt is a compound represented by the following formula (4):

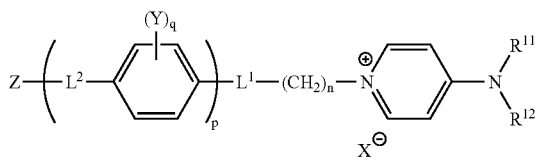

Formula (4)

wherein L$^1$ and L$^2$ respectively represent a divalent linking group or a single bond; Y represents a substituent capable of binding to phenyl other than a hydrogen atom; Z represents a hydrogen atom, a substituted or non-substituted aliphatic hydrocarbon group or a substituted or non-substituted aryl group; R$^{11}$ and R$^{12}$ respectively represent a hydrogen atom, an alkyl group, an aryl group, an acyl group, a carboamyl group, a hydroxyl group or an amino group, and R$^{11}$ and R$^{12}$ may bind to each other to form a ring; n and p respectively represent an integer from 1 to 10, q is an integer from 0 to 4, provided that when p is 2 or more, L$^2$s, Ys and qs in the respective repeating units may be the same or different; and X represents an anion.

12. The optical compensation film of claim 9, wherein molecules of the rod-like liquid crystalline compound are aligned substantially vertically with respect to a film plane of the optically anisotropic layer.

13. The optical compensation film of claim 9, wherein the alignment layer comprises a polyvinyl alcohol derivative as a major component.

14. A liquid crystal display device comprising at least:

a first polarizing film, a first retardation region, a second retardation region, and a liquid crystal cell comprising a liquid crystal layer interposed between a pair of substrates, in which liquid crystal molecules are aligned substantially parallel to the surfaces of the pair of substrates in a black state, wherein retardation Re (λ) of the first retardation region at a wavelength of λ nm is from 20 nm to 150 nm; and an Nz value of the first retardation region, as defined according to {Nz=(nx−nz)/(nx−ny)} by using in-plane refractive indexes nx and ny, wherein nx>ny, and a refractive index nz in the thickness direction, is from 1.5 to 7, in-plane refractive indexes nx and ny of the second retardation region are substantially equal to each other; nx is smaller than nz; retardation Rth (λ) of the second retardation region in the thickness direction at a wavelength of λ nm is from −80 nm to −400 nm; the second retardation region comprises an optically anisotropic layer formed of a liquid crystal composition of claim 1; and molecules of the rod-like liquid crystalline compound are aligned substantially vertically in the optically anisotropic layer, and a transmission axis of the first polarizing film is parallel to the slow axis direction of the liquid crystal molecules of the liquid crystal layer in a black state.

15. The liquid crystal display of claim 14, wherein the first polarizing film, the first retardation region, the second retardation region, and the liquid crystal cell are disposed in this order; and the slow axis of the first retardation region is substantially parallel to the transmission axis of the first polarizing film.

16. The liquid crystal display device of claim 14, wherein the first polarizing film, the second retardation region, the first retardation region, and the liquid crystal cell are disposed in this order, and the slow axis of the first retardation region is substantially orthogonal to the transmission axis of the first polarizing film.

17. The liquid crystal display device of claim 14, further comprising a second polarizing film having a transmission axis orthogonal to the transmission axis of the first polarizing film, wherein the first and second polarizing films are disposed so as to interpose the first retardation region, the second retardation region, and the liquid crystal cell therebetween.

18. The liquid crystal display device of claim 14, further comprising a pair of protective films disposed so as to interpose the first polarizing film and/or the second polarizing film therebetween, wherein one of the pair of protective films, which is disposed closer to the liquid crystal layer, has retardation Rth in the thickness direction of not greater than 40 nm.

19. The liquid crystal display device of claim 14, further comprising a pair of protective films disposed so as to interpose the first polarizing film and/or the second polarizing film therebetween, wherein one of the pair of protective films, which is disposed closer to the liquid crystal layer, is a cellulose acylate film or a norbornene based film.

* * * * *